(12) United States Patent
Kim et al.

(10) Patent No.: US 10,370,483 B2
(45) Date of Patent: Aug. 6, 2019

(54) POLY(PHENYLENE)-BASED ANION EXCHANGE POLYMERS AND METHODS THEREOF

(71) Applicants: National Technology & Engineering Solutions of Sandia, LLC, Albuquerque, NM (US); Los Alamos National Security, LLC, Los Alamos, NM (US)

(72) Inventors: Yu Seung Kim, Los Alamos, NM (US); Kwan-Soo Lee, Los Alamos, NM (US); Cy Fujimoto, Albuquerque, NM (US)

(73) Assignees: National Technology & Engineering Solutions of Sandia, LLC, Albuquerque, NM (US); Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 16/039,158

(22) Filed: Jul. 18, 2018

(65) Prior Publication Data

US 2019/0031821 A1 Jan. 31, 2019

Related U.S. Application Data

(62) Division of application No. 15/398,547, filed on Jan. 4, 2017, now Pat. No. 10,053,535.

(Continued)

(51) Int. Cl.
*C08J 5/22* (2006.01)
*C08G 61/10* (2006.01)
(Continued)

(52) U.S. Cl.
CPC ............ *C08G 61/10* (2013.01); *C08J 5/2256* (2013.01); *C08L 65/00* (2013.01); *C08G 2261/11* (2013.01); *C08G 2261/312* (2013.01); *C08G 2261/46* (2013.01); *C08G 2261/516* (2013.01); *C08G 2261/722* (2013.01);
(Continued)

(58) Field of Classification Search
CPC .......... C08G 18/0828; C08G 2261/516; C08G 2261/1452; C08G 2261/722; H01B 1/122; H01M 8/1025
See application file for complete search history.

(56) References Cited

U.S. PATENT DOCUMENTS

| | | | |
|---|---|---|---|
| 7,022,810 B1 | 4/2006 | Cornelius | |
| 7,301,002 B1 | 11/2007 | Cornelius et al. | |

(Continued)

FOREIGN PATENT DOCUMENTS

EP 1672961 B1 12/2014

OTHER PUBLICATIONS

Fujimoto C et al., "Backbone stability of quaternized polyaromatics for alkaline membrane fuel cells," *J. Membrane Sci.* 2012;(423-424):438-49.

(Continued)

*Primary Examiner* — Shane Fang
(74) *Attorney, Agent, or Firm* — Helen S. Baca

(57) ABSTRACT

The present invention relates to anionic exchange polymers including a poly(phenylene) structure. The structure can include any useful cationic moiety. Methods and uses of such structures and polymers are also described herein. In one instance, such polymers are employed to form a solid membrane.

20 Claims, 12 Drawing Sheets

Related U.S. Application Data

(60) Provisional application No. 62/274,592, filed on Jan. 4, 2016.

(51) Int. Cl.
    *C08L 65/00* (2006.01)
    *H01M 8/1023* (2016.01)
    *H01M 8/1039* (2016.01)

(52) U.S. Cl.
    CPC ........ *C08J 2365/02* (2013.01); *H01M 8/1023* (2013.01); *H01M 8/1039* (2013.01)

(56) References Cited

U.S. PATENT DOCUMENTS

| | | | |
|---|---|---|---|
| 7,582,683 | B2 | 9/2009 | Pivovar et al. |
| 7,781,625 | B2 | 8/2010 | Earle et al. |
| 7,816,482 | B1 | 10/2010 | Hibbs et al. |
| 7,846,980 | B2 | 12/2010 | Pivovar et al. |
| 7,875,101 | B2 | 1/2011 | Staiger et al. |
| 7,888,397 | B1 | 2/2011 | Hibbs et al. |
| 8,110,636 | B1 | 2/2012 | Fujimoto et al. |
| 8,227,147 | B2 | 7/2012 | Kim et al. |
| 8,492,049 | B2 | 7/2013 | Kim et al. |
| 8,530,109 | B2 | 9/2013 | Kim et al. |
| 8,809,483 | B1 | 8/2014 | Hibbs |
| 9,048,480 | B2 | 6/2015 | Kim et al. |
| 9,051,431 | B2 | 6/2015 | Kim et al. |
| 9,580,541 | B1 | 2/2017 | Fujimoto et al. |
| 2006/0269498 | A1 | 11/2006 | Malle et al. |
| 2011/0237789 | A1 | 9/2011 | Weber et al. |
| 2012/0225371 | A1 | 9/2012 | Kim et al. |
| 2014/0024728 | A1 | 1/2014 | Kim et al. |
| 2014/0356760 | A1 | 12/2014 | Tanabe et al. |
| 2015/0349269 | A1 | 12/2015 | Lee et al. |
| 2017/0190830 | A1 | 7/2017 | Fujimoto |

OTHER PUBLICATIONS

Fujimoto C et al., "Vanadium redox flow battery efficiency and durability studies of sulfonated Diels Alder poly(phenylene)s," *Electrochem. Commun.* 2012;20:48-51.

Fujimoto CH et al., "Ionomeric poly(phenylene) prepared by Diels-Alder polymerization: Synthesis and physical properties of a novel polyelectrolyte," *Macromolecules* 2005;38:5010-6.

Hibbs MR et al., "Synthesis and characterization of poly(phenylene)-based anion exchange membranes for alkaline fuel cells," *Macromolecules* 2009;42:8316-21.

Hibbs MR, "Alkaline stability of poly(phenylene)-based anion exchange membranes with various cations," *J. Polym. Sci. B* 2013;51:1736-42.

Hickner MA et al., "Transport in sulfonated poly(phenylene)s: Proton conductivity, permeability, and the state of water," *Polymer* 2006;47:4238-44.

Jakoby K et al., "Palladium-catalyzed phosphonation of polyphenylsulfone," *Macromol. Chem. Phys.* 2003;204:61-7.

Kim DS et al., "Resonance stabilized perfluorinated ionomers for alkaline membrane fuel cells," *Macromolecules* 2013;46(19):7826-33.

Kim YS et al., "Importance of polymer backbone stability of anion exchange polymer electrolytes," 227th ECS Meeting held on May 24, 2015-May 28, 2015 in Chicago, IL (MA2015-01), abstract No. 1231 (1 p.).

Lee KS et al., "An operationally flexible fuel cell based on quaternary ammonium-biphosphate ion pairs," *Nature Energy* 2016;2: art. No. 16120 (7 pp.).

Lee KS et al., "Resonance-stabilized guanidinium-tethered poly(phenylene)s," PRiME 2016/230th ECS Meeting held on Oct. 2, 2016-Oct. 7, 2016 in Honolulu, HI (MA2016-02), abstract No. 2572 (1 p.).

Li N et al., "Polymer electrolyte membranes derived from new sulfone monomers with pendent sulfonic acid groups," *Macromolecules* 2010;43:9810-20.

Lim Y et al., "Synthesis and properties of sulfonated poly(phenylene sulfone)s without ether linkage by Diels-Alder reaction for PEMFC application," *Electrochim. Acta* 2014;119:16-23.

Luo K et al., "Investigation of ionic conductivity, uptake and cation diffusion of perfluorsulfonate and sulfonated block copolymer ion exchange membrane in non-aqueous solvents," 231st ECS Meeting held on May 28, 2017-Jun. 1, 2017 in New Orleans, LA (MA2017-01), abstract No. 166 (2 pp.).

Maalouf M et al., "Factors enabling high mobility of protons and water in perfluorosulfonate membranes under low hydration conditions," *Int'l J. Hydrogen Energy* 2014;39:2795-800.

Maurya S et al., "Importance of resonance structure on alkaline stability," 231st ECS Meeting held on May 28, 2017-Jun. 1, 2017 in New Orleans, LA (MA2017-01), abstract No. 1456 (1 p.).

Merle G et al., "Anion exchange membranes for alkaline fuel cells: A review," *J. Membrane Sci.* 2011;377:1-35.

Mohanty AD et al., "Stable elastomeric anion exchange membranes based on quaternary ammonium-tethered polystyrene-b-poly(ethylene-cobutylene)-b-polystyrene triblock copolymers," *Macromolecules* 2015;48:7085-95.

Parcero E et al., "Phosphonated and sulfonated polyphenylsulfone membranes for fuel cell application," *J. Membr. Sci.* 2006;285:206-13.

Poppe D et al., "Carboxylated and sulfonated poly(arylene-co-arylene sulfone)s: thermostable polyelectrolytes for fuel cell applications," *Macromolecules* 2002;35:7936-41.

Skalski TJG et al., "Structurally-defined, sulfo-phenylated, oligophenylenes and polyphenylenes," *J. Am Chem. Soc.* 2015;137(38):12223-6.

Stanis RJ et al., "Evaluation of hydrogen and methanol fuel cell performance of sulfonated diels alder poly(phenylene) membranes," *J. Power Sci.* 2010;195:104-10.

Sun C-N et al., "Evaluation of Diels-Alder poly(phenylene) anion exchange membranes in all-vanadium redox flow batteries," *Electrochem. Commun.* 2014;43:63-6.

Tang Z et al., "Block copolymer SDAPP membranes for vanadium redox flow batteries-strategy to address transport and durability," PRiME 2016/230th ECS Meeting held on Oct. 2, 2016-Oct. 7, 2016 in Honolulu, HI (MA2016-02), abstract No. 19 (2 pp.).

International Search Report (Form PCT/ISA/210), for International application No. PCT/US17/12205 (filed Jan. 4, 2017), dated Apr. 13, 2017 (2 pp.).

Written Opinion of the International Searching Authority (Form PCT/ISA/237), for International application No. PCT/US17/12205 (filing date Jan. 4, 2017), dated Apr. 13, 2017 (10 pp.).

Sato H et al., "Rhodium(I) complexes with N-heterocyclic carbenes bearing a 2,3,4,5-tetraphenylphenyl and its higher dendritic frameworks," *Chem. Commun.* 2007;3:267-71.

POLY(PHENYLENE)-BASED ANION EXCHANGE POLYMERS AND METHODS THEREOF

CROSS-REFERENCE TO RELATED APPLICATION

This application is a divisional of U.S. patent application Ser. No. 15/398,547, filed Jan. 4, 2017, which in turn claims the benefit of U.S. Provisional Application No. 62/274,592, filed Jan. 4, 2016, each of which is hereby incorporated by reference in its entirety.

STATEMENT OF GOVERNMENT INTEREST

This invention was made with Government support under contract no. DE-AC52-06NA25396 awarded by the U.S. Department of Energy to Los Alamos National Security, LLC, as well as under Contract No. DE-NA0003525 awarded by the United States Department of Energy/National Nuclear Security Administration to the National Technology & Engineering Solutions of Sandia, LLC. The Government has certain rights in the invention.

FIELD OF THE INVENTION

The present invention relates to anionic exchange polymers including a poly(phenylene) structure. The structure can include any useful cationic moiety (e.g., any described herein). Methods and uses of such structures and polymers are also provided.

BACKGROUND OF THE INVENTION

Polymer electrolyte membrane fuel cell systems can employ any useful membrane to effectively conduct protons or anions. In particular, anion exchange membrane-based fuel cells (AEMFCs) have been garnering interest, due in part to possible use of less expensive catalysts while maintaining or improving electrochemical kinetics. Within the fuel cell, the anion exchange membrane is generally composed of a polymer having a functional group (e.g., a cationic group) capable of binding to anionic carriers (e.g., hydroxide or carbonate anions). Ideally, such a polymer should be capable of having both high anion conductivity and high chemical stability. Design and synthesis of such polymers can be challenging. Accordingly, there is a need for additional polymer structures having such desired chemical characteristics, as well as methods for making and using such polymers.

SUMMARY OF THE INVENTION

The present invention relates to polymer compounds and compositions having a poly(phenylene) structure in combination with one or more cationic moieties. In particular non-limiting embodiments, the cationic moieties are resonance stabilized, thereby providing enhanced stability, even under high pH conditions. Furthermore, the polymeric backbone includes a poly(phenylene) structure that imparts durability to the polymer. In this way, the polymer compounds of the invention include a combination of a durable backbone and a stabilized cationic moiety in order to improve pH-stability, anionic conductivity, and/or solubility.

Accordingly, in one aspect, the present invention features a composition (e.g., a molecule, a monomer, a polymer, an article, etc.) including the formula (II), having the formula (II), or including a structure having the formula (II):

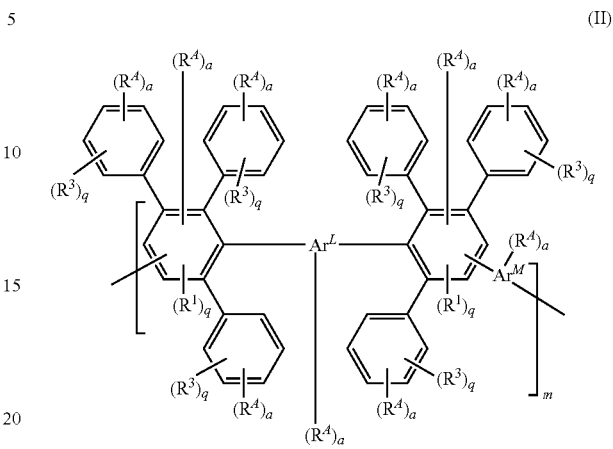

or a salt thereof or a form thereof including a counter ion. In some embodiments, the counter ion of the cationic moiety is hydroxide or an anionic salt, such as a chloride or a bromide. In particular embodiments, the structure includes a formula (IIA), (IIa)-(IIx), (II-1) to (II-13), or a salt thereof.

In some embodiments, each $R^4$ is independently, a cationic moiety (e.g., any described herein). In other embodiments, the cationic moiety includes an optionally substituted aryl, optionally substituted alkaryl, optionally substituted arylalkoxy, optionally substituted aryloxy, optionally substituted aryloxycarbonyl, optionally substituted aryloyl, optionally substituted arylcarbonylalkyl, optionally substituted arylsulfonyl, or optionally substituted arylsulfonylalkyl. In other embodiments, each and every $R^4$ includes a cationic moiety, which in turn includes an optionally substituted aryl group. In yet other embodiments, each $R^4$ includes one or more cationic functionalities $R^{41}$ (e.g., any described herein).

In some embodiments, $R^4$ is $-L^4-Ar^4$. In one instance, $Ar^4$ is an optionally substituted aryl (e.g., substituted with one or more cationic functionalities, such as any described herein) and $L^4$ is a linker (e.g., any herein). In another instance, $Ar^4$ is further substituted with one or more substituents selected from the group consisting of halo, cyano, optionally substituted haloalkyl, optionally substituted perfluoroalkyl, optionally substituted nitroalkyl, and optionally substituted alkyl.

In other embodiments, $R^4$ is

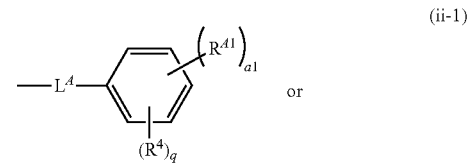

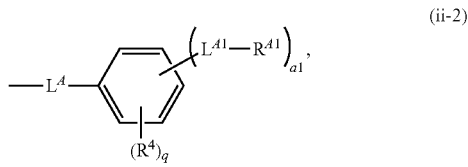

or a salt thereof or a form thereof including a counter ion. In some embodiments, each $L^A$ and $L^{A1}$ is any linker described herein (e.g., described for $L^A$). In other embodiments, each $R^4$ is, independently, H, halo, cyano, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$. In yet other embodiments, each $R^{A1}$ is, independently, a cationic functionality (e.g., any herein); each q is, independently, an integer of from 1 to 5; and/or each a1 is, independently, an integer of from 1 to 5.

In some embodiments, each $R^1$ and $R^3$ is, independently, H, halo, cyano, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$, where $R^S$ is an acidic moiety including a sulfonyl group, $R^P$ is an acidic moiety including a phosphoryl group, $R^C$ is an acidic moiety including a carbonyl group, and $R^F$ is an electron-withdrawing moiety; each $Ar^L$ is, independently, a bivalent linker including optionally substituted arylene; each $Ar^M$ is, independently, a bivalent linker including optionally substituted arylene; each q is, independently, an integer of from 0 to 5; each a is, independently, an integer of from 0 to 5, wherein at least one a is not 0; and m is an integer of from about 1 to 1000 (e.g., from 1 to 500). In further embodiments, at least one $R^1$ or $Ar^L$ in formula (II) includes $R^A$, $R^S$, $R^P$, $R^C$, or $R^F$. In some embodiments, q for $R^1$ is 1. In other embodiments, at least one $R^A$ includes an optionally substituted aryl group. In some embodiments, a for $Ar^L$ is an integer of from 0 to 5; and/or a for all other aryl groups is an integer of from 1 to 5. In some embodiments, each and every $R^3$ is, independently, $R^A$, $R^S$, $R^P$, $R^C$, or $R^P$.

In some embodiments, the composition includes a structure having any one of formulas (IIk) to (IIp) or (IIA), or a salt thereof or a form thereof including a counter ion. In other embodiments, each $Ar^A$ is, independently, an optionally substituted aryl group including one or more cationic moieties or cationic functionalities (e.g., any described herein) and $L^A$ is a linker (e.g., any described herein).

In some embodiments, the composition includes a structure having any one of formulas (IIq) to (IIx), or a salt thereof or a form thereof including a counter ion. In some embodiments, the composition includes a structure having any one of formulas (II-1) to (II-10), or a salt thereof or a form thereof including a counter ion. In some embodiments, each $R^{A1}$ is, independently, a cationic moiety; each $L^A$ and $L^{A1}$ is, independently, a linker (e.g., any described herein); and each a1 is, independently, an integer of from 0 to 5, where at least one a1 is not 0. In some embodiments, each $R^4$ and $R^{M1}$, if present, is, independently, H, halo, cyano, nitro, nitroso, azido, sulfo, carboxyaldehyde, carboxyl, hydroxyl, amino, amidino, amido, thioamido, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, optionally substituted $C_{1-12}$ alkoxy, $R^S$, $R^P$, $R^C$, or $R^F$.

In some embodiments, the composition includes a structure having any one of formulas (II-11) to (II-13), or a salt thereof or a form thereof including a counter ion. In some embodiment, each $R^7$ is, independently, H, halo, cyano, nitro, nitroso, azido, sulfo, carboxyaldehyde, carboxyl, hydroxyl, amino, amidino, amido, thioamido, dithiocarboxyamino, optionally substituted $C_{1-12}$ alkyl, optionally substituted $C_{3-12}$ cycloalkyl, optionally substituted $C_{1-12}$ alkanoyl, optionally substituted $C_{1-12}$ alkoxy, optionally substituted heterocyclyl, optionally substituted $C_{4-18}$ aryl, optionally substituted $C_{1-6}$ alk-$C_{4-18}$ aryl, or optionally substituted $C_{4-18}$ aryloxy; and each B and X is, independently, an anionic moiety (e.g., halide, hydroxide, etc.).

In another aspect, the present invention features a composition (e.g., a molecule, a monomer, a polymer, an article, etc.) including the formula (III), having the formula (III), or including a structure having the formula (III):

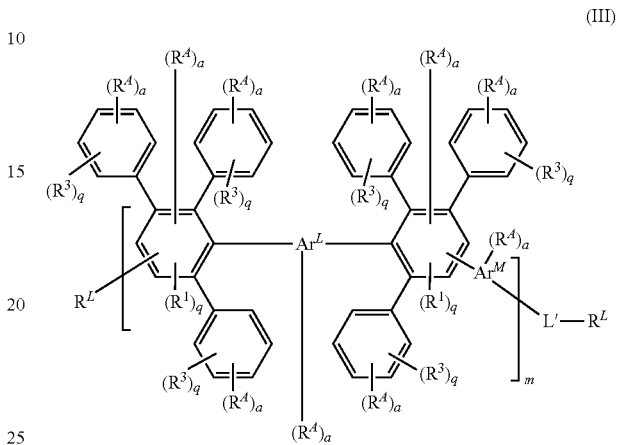

(III)

or a salt thereof or a form thereof including a counter ion. In some embodiments, each of $R^4$, $R^1$, $R^3$, $Ar^L$, $Ar^M$, q, a, m, L', and $R^L$ is, independently, any described herein. In some embodiments, each $R^L$ is, independently, an electrophilic reactive end group (e.g., any herein, such as optionally substituted $C_{5-19}$ or $C_{7-11}$ aryloyl or optionally substituted $C_{4-18}$ or $C_{6-18}$ aryl). In some embodiments, the composition includes a structure having the formula (IIIa) to (IIId) or a salt thereof.

In yet another aspect, the present invention features a composition (e.g., a molecule, a monomer, a polymer, an article, etc.) including the formula (IV), having the formula (IV), or including a structure having the formula (IV):

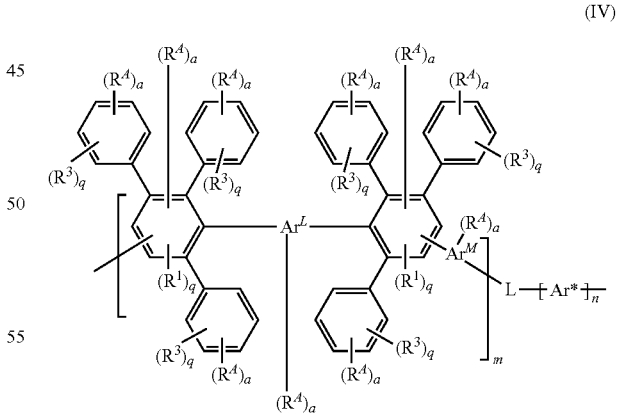

(IV)

or a salt thereof or a form thereof including a counter ion. In some embodiments, each of $R^4$, $R^3$, $Ar^L$, $Ar^M$, q, a, m, n, L, and Ar* is, independently, any described herein. In some embodiments, each of m and n is, independently, an integer of from about 1 to 1000; L is a linking segment (e.g., such as any linker described herein); and Ar* is a hydrophobic segment. In further embodiments, at least one $R^I$ or $Ar^L$ in formula (IV) includes $R^A$, $R^S$, $R^P$, $R^C$, or $R^F$.

In yet another aspect, the present invention features a composition (e.g., a molecule, a monomer, a polymer, an article, etc.) including the formula (V), having the formula (V), or including a structure having the formula (V):

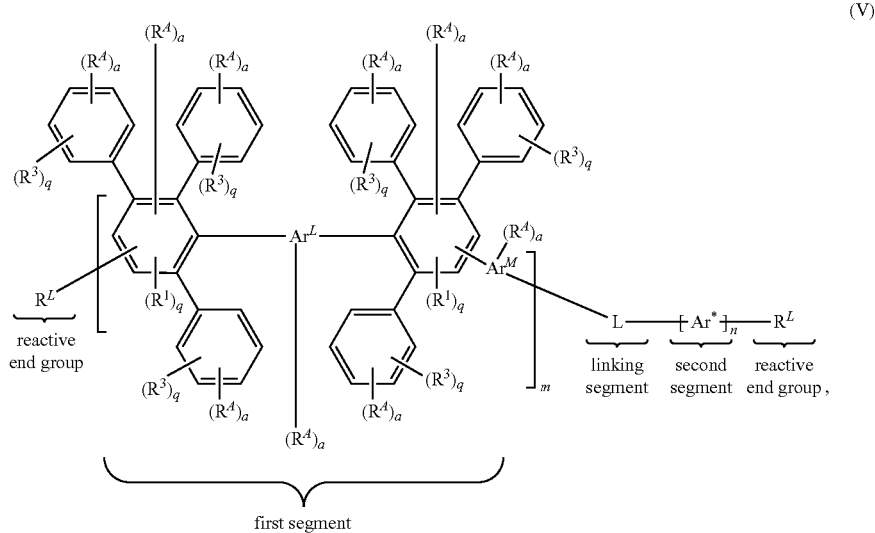

(V)

or a salt thereof or a form thereof including a counter ion. In some embodiments, each of $R^A$, $R^3$, $R^L$, $Ar^L$, $Ar^M$, q, a, m, n, L, and Ar* is, independently, any described herein. In some embodiments, each of m and n is, independently, an integer of from about 1 to 1000; L is a linking segment (e.g., such as any linker described herein); and Ar* is a hydrophobic segment. In further embodiments, at least one $R^L$ or $Ar^L$ in formula (V) includes $R^A$, $R^S$, $R^P$, $R^C$, or $R^F$.

In some embodiments, formula (V) includes a structure of formula (Va):

integer of from about 1 to 1000; L is a linking segment; and Ar* is a hydrophobic segment. In further embodiments, at least one $R^1$ or $Ar^L$ in formula (Va) includes $R^A$, $R^H$, $R^S$, $R^P$, $R^C$, or $R^F$.

In any embodiment herein, $R^S$ is —$SO_2$—OH, —$SO_2$—$R^{S1}$, —$R^{SA}$—$SO_2$—$R^{S1}$, —$SO_2$—$R^{Ar}$, —$R^{SA}$—$SO_2$—$R^{Ar}$, —$SO_2NR^{N1}R^{N2}$, —N($R^{N1}$)—$SO_2$—$R^{S3}$, —$SO_2$—$NR^{N1}$—$R^{S2}$, or —$SO_2$—$NR^{N1}$—$SO_2$—$R^{S3}$ (e.g., where each of $R^{S1}$, $R^{S2}$, $R^{S3}$, $R^{Ar}$, $R^{SA}$, $R^{N1}$, and $R^{N2}$ is any described herein).

In any embodiment herein, $R^C$ is —$CO_2H$, —C(O)—$R^{C1}$, or —$R^{CA}$—C(O)—$R^{C1}$ (e.g., where each of $R^{C1}$ and $R^{CA}$ is any described herein).

In any embodiment herein, $R^P$ is —P(O))(OH)$_2$, —O—PO(OH)$_2$, —P(O))HR$^{P1}$, —P(O))<R$^{P1}$R$^{P2}$, —P(O)

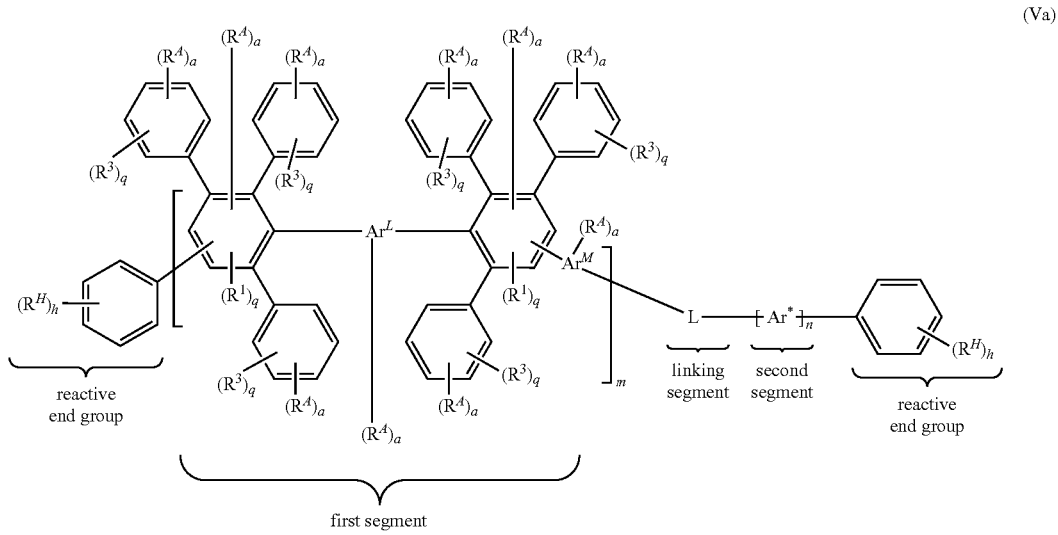

(Va)

or a salt thereof or a form thereof including a counter ion. In some embodiments, each of $R^A$, $R^H$, $R^L$, $R^3$, $Ar^L$, $Ar^M$, q, a, h, m, n, L, and Ar* is, independently, any described herein. In some embodiments, each of m and n is, independently, an <R$^{Ar}$R$^{P2}$, —P(O)<R$^{Ar}$R$^{Ar}$, —R$^{PA}$—P(O)<R$^{P1}$R$^{P2}$, —R$^{PA}$—P(O)<R$^{Ar}$R$^{P2}$, —R$^{PA}$—P(O)<R$^{Ar}$R$^{Ar}$, —O—P(O))<R$^{P1}$R$^{P2}$, —O—P(O))<R$^{Ar}$R$^{P2}$, or —O—P(O))<R$^{Ar}$R$^{Ar}$ (e.g., where each of R$^{P1}$, R$^{P2}$, R$^{Ar}$, and R$^{PA}$ is any described herein, and where each R$^{Ar}$ can be the same or different).

In any embodiment herein, $R^H$ is H, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, halo, optionally substituted $C_{1-12}$ perfluoroalkyl, optionally substituted aryl, optionally substituted alkaryl, optionally substituted arylalkoxy, optionally substituted aryloxy, optionally substituted aryloxycarbonyl, optionally substituted aryloyl, optionally substituted arylcarbonylalkyl, optionally substituted arylsulfonyl, or optionally substituted arylsulfonylalkyl. In some embodiments, $R^H$ is -$L^H$-$Ar^H$. In other embodiments, $R^H$ is -$L^H$-$Ak^H$. In one instance, $Ar^H$ is an optionally substituted aryl (e.g., substituted with one or more substituents selected from the group of halo, cyano, optionally substituted haloalkyl, optionally substituted perfluoroalkyl, optionally substituted nitroalkyl, and optionally substituted alkyl). In another instance, $Ak^H$ is an optionally substituted alkyl or optionally substituted heteroalkyl (e.g., substituted with one or more substituents selected from the group of halo, cyano, optionally substituted haloalkyl, optionally substituted perfluoroalkyl, optionally substituted nitroalkyl, and optionally substituted alkyl).

In any embodiment herein, $R^F$ is optionally substituted $C_{5-19}$ or $C_{7-11}$ aryloyl, optionally substituted $C_{4-18}$ or $C_{6-18}$ aryl, carboxyaldehyde, optionally substituted $C_{2-7}$ alkanoyl, optionally substituted $C_{1-12}$ alkyl, optionally substituted $C_{1-12}$ haloalkyl, optionally substituted $C_{2-7}$ alkoxycarbonyl, nitro, nitroso, cyano, sulfo, carboxyl, and quaternary ammonium (e.g., any described herein). In other embodiments, $R^F$ includes or is substituted by perfluoroalkyl (e.g., $C_{1-12}$ perfluoroalkyl).

In any embodiment herein, the linker (e.g., $L^A$ or $L^{A1}$ or L or L' or $L^H$) is a covalent bond, carbonyl (—C(O)—), oxy (—O—), thio (—S—), azo (—N=N—), phosphonoyl (—P(O)H—), phosphoryl (—P(O))<, sulfonyl (—S(O)$_2$—), sulfinyl (—S(O)—), sulfonamide, imino (—NH—), imine (e.g., —$CR^{L1}$=N—, where $R^{L1}$ is H or optionally substituted alkyl), phosphine (e.g., —$PR^{L3}$— group, where $R^{L3}$ is H or optionally substituted alkyl), nitrilo (e.g., —$NR^{L3}$—, where $R^{L3}$ is H, optionally substituted alkyl, optionally substituted haloalkyl, optionally substituted alkoxy, optionally substituted alkaryl, optionally substituted aryl, or halo), optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy (e.g., —$(CR_{L1}R^{L2})_{La}$—, —C(O)$NR^{L3}$—, —$NR^{L3}$C(O)—, —SO$_2NR^{L3}$—, —$NR^{L3}$SO$_2$—, —$(CR^{L1}R^{L2})_{La}$—C(O)—$(CR^{L1}R^{L2})_{Lb}$—, —$(CR^{L1}R^{L2})_{La}$—SO$_2$—$(CR^{L1}R^{L2})_{Lb}$—, —$(CR^{L1}R^{L2})_{La}$—C(O)$NR^{L3}$—$(CR^{L1}R^{L2})_{Lb}$—, —$(CR^{L1}R^{L2})_{La}$—$NR^{L3}$C(O)—$(CR^{L1}R^{L2})_{Lb}$—, —$(CR^{L1}R^{L2})_{La}$—SO$_2NR^{L3}$—$(CR^{L1}R^{L2})_{Lb}$—, or —$(CR^{L1}R^{L2})_{La}$—$NR^{L3}$SO$_2$—$(CR^{L1}R^{L2})_{Lb}$—, where each of $R^{L1}$, $R^{L2}$, and $R^{L3}$ is, independently, H, halo, optionally substituted $C_{1-12}$ alkyl, optionally substituted $C_{1-12}$ haloalkyl, optionally substituted $C_{1-12}$ alkoxy, optionally substituted $C_{4-18}$ aryl, or optionally substituted $C_{1-6}$ alk-$C_{4-18}$ aryl; and where each of La and Lb is, independently, an integer of from 0 to 10, wherein at least one of La or Lb is not 0). In some embodiments, the linker (e.g., for L') includes an optionally substituted polyphenylene or a structure of formula (II). In yet other embodiments, L or L' includes a structure of formula (II) and Ar* (e.g., any subunits described herein for Ar*).

In any embodiment herein, Ar* or L or L' includes a structure of formula (II), a sulfone subunit, an arylene sulfone subunit, an ether sulfone subunit, an arylene ether subunit, a perfluoroalkyl subunit, or a perfluoroalkoxy subunit.

In any embodiment herein, each of $Ar^L$, $Ar^M$, and Ar* is optionally substituted phenylene, optionally substituted naphthylene, optionally substituted phenanthrylene, a sulfone subunit, an arylene sulfone subunit, an ether sulfone subunit, an arylene ether subunit, a perfluoroalkyl subunit, a perfluoroalkoxy subunit, or any described herein (e.g., any aryl group described herein). In further embodiments, the optional substitution is $R^A$, $R^H$, $R^S$, $R^P$, $R^C$, $R^F$, or a label (e.g., fluorine or another NMR detectable label).

In any embodiment herein, m is less than n. In some embodiments, m is greater than n.

DEFINITIONS

As used herein, the term "about" means +/−10% of any recited value. As used herein, this term modifies any recited value, range of values, or endpoints of one or more ranges.

The term "acyl," or "alkanoyl," as used interchangeably herein, represent an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group.

By "alkaryl" is meant an aryl group, as defined herein, attached to the parent molecular group through an alkylene group, as defined herein. Similarly, by the term "alkheteroaryl" is meant a heteroaryl group, as defined herein, attached to the parent molecular group through an alkylene group. Other groups preceded by the prefix "alk-" are defined in the same manner. The alkaryl group can be substituted or unsubstituted. For example, the alkaryl group can be substituted with one or more substitution groups, as described herein for alkyl and/or aryl. Exemplary unsubstituted alkaryl groups are of from 7 to 16 carbons ($C_{7-16}$ alkaryl), as well as those having an alkylene group with 1 to 6 carbons and an aryl group with 4 to 18 carbons (i.e., $C_{1-6}$ alk-$C_{4-18}$ aryl).

By "alkcycloalkyl" is meant a cycloalkyl group, as defined herein, attached to the parent molecular group through an alkylene group, as defined herein. The alkcycloalkyl group can be substituted or unsubstituted. For example, the alkcycloalkyl group can be substituted with one or more substitution groups, as described herein for alkyl.

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl.

By "alkheterocyclyl" represents a heterocyclyl group, as defined herein, attached to the parent molecular group through an alkylene group, as defined herein. Exemplary unsubstituted alkheterocyclyl groups are of from 2 to 14 carbons.

By "alkoxy" is meant OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkoxycarbonyl" is meant an alkoxy group, as defined herein, that is attached to the parent molecular group through a carbonyl group. In some embodiments, an unsubstituted alkoxycarbonyl group is a $C_{2-7}$ alkoxycarbonyl group.

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy; (2) $C_{1-6}$ alkylsulfinyl; (3) $C_{1-6}$ alkylsulfonyl; (4) amino; (5) aryl; (6) arylalkoxy; (7) aryloyl; (8) azido; (9) cyano; (10) carboxaldehyde; (11) $C_{3-8}$ cycloalkyl; (12) halo; (13) heterocyclyl; (14) heterocyclyloxy; (15) heterocyclyloyl; (16) hydroxyl; (17) N-protected amino; (18) nitro; (19) oxo; (20) $C_{3-8}$ spirocyclyl; (21) $C_{1-6}$ thioalkoxy; (22) thiol; (23) —$CO_2R^A$, where $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (24) —$C(O)NR^BR^C$, where each of $R^B$ and $R^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —$SO_2R^D$, where $R^D$ is selected from the group consisting of (a) $C_{1-6}$ alkyl, (b) $C_{4-18}$ aryl, and (c) $C_{1-6}$ alk-$C_{4-18}$ aryl; (26) —$SO_2NR^ER^F$, where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —$NR^GR^H$, where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a bivalent form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "alkyleneoxy" is meant an alkylene group, as defined herein, attached to the parent molecular group through an oxygen atom.

By "alkylsulfate" is meant an alkyl group, as defined herein, attached to the parent molecular group through an —O—($SO_2$) group. An exemplary alkylsulfate group is —O—$SO_2$-Ak, where each Ak is, independently, optionally substituted alkyl.

By "alkylsulfinyl" is meant an alkyl group, as defined herein, attached to the parent molecular group through an —S(O)— group. In some embodiments, the unsubstituted alkylsulfinyl group is a $C_{1-6}$ or $C_{1-12}$ alkylsulfinyl group.

By "alkylsulfinylalkyl" is meant an alkyl group, as defined herein, substituted by an alkylsulfinyl group. In some embodiments, the unsubstituted alkylsulfinylalkyl group is a $C_{2-12}$ or $C_{2-24}$ alkylsulfinylalkyl group (e.g., $C_{1-6}$ alkylsulfinyl-$C_{1-6}$ alkyl or $C_{1-12}$ alkylsulfinyl-$C_{1-12}$ alkyl).

By "alkylsulfonyl" is meant an alkyl group, as defined herein, attached to the parent molecular group through an —$SO_2$— group. In some embodiments, the unsubstituted alkylsulfonyl group is a $C_{1-6}$ or $C_{1-12}$ alkylsulfonyl group. In other embodiments, the alkylsulfonyl group is —$SO_2$—$R^{S1}$, where $R^{S1}$ is an optionally substituted $C_{1-12}$ alkyl (e.g., as described herein, including optionally substituted $C_{1-12}$ haloalkyl or perfluoroalkyl).

By "alkylsulfonylalkyl" is meant an alkyl group, as defined herein, substituted by an alkylsulfonyl group. In some embodiments, the unsubstituted alkylsulfonylalkyl group is a $C_{2-12}$ or $C_{2-24}$ alkylsulfonylalkyl group (e.g., $C_{1-6}$ alkylsulfonyl-$C_{1-6}$ alkyl or $C_{1-12}$ alkylsulfonyl-$C_{1-12}$ alkyl). An exemplary alkylsulfonylalkyl group is —C—($SO_2$-Ak)$_3$, where each Ak is, independently, optionally substituted alkyl.

By "alkylsulfonylamide" is meant an amino group, as defined herein, substituted by an alkylsulfonyl group. In some embodiments, the unsubstituted alkylsulfonylamide group is —$NR^{N1}R^{N2}$, in which each of $R^{N1}$ and $R^{N2}$ is, independently, H, $C_{1-12}$ alkyl, or $C_{1-24}$ alkylsulfonyl group (e.g., $C_{1-6}$ alkylsulfonyl or $C_{1-12}$ alkylsulfonyl), where at least one of $R^{N1}$ and $R^{N2}$ includes a sulfonyl group. An exemplary alkylsulfonylamide group is —N—($SO_2$-Ak)$_2$ or —N(Ak)($SO_2$-Ak), where each Ak is, independently, optionally substituted alkyl.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl.

By "amidino" is meant —$C(NR^{N3})NR^{N1}R^{N2}$, where each of $R^{N1}$, $R^{N2}$, and $R^{N3}$ is, independently, H, optionally substituted alkyl, or optionally substituted aryl; or where a combination of $R^{N1}$ and $R^{N2}$, taken together with the nitrogen atom to which each are attached, form a heterocyclyl group, as defined herein.

By "amido" is meant —$C(O)NR^{N1}R^{N2}$, where each of $R^{N1}$ and $R^{N2}$ is, independently, H, optionally substituted alkyl, or optionally substituted aryl; or where a combination of $R^{N1}$ and $R^{N2}$, taken together with the nitrogen atom to which each are attached, form a heterocyclyl group, as defined herein.

By "amino" is meant —$NR^{N1}R^{N2}$, where each of $R^{N1}$ and $R^{N2}$ is, independently, H, optionally substituted alkyl, optionally substituted alkaryl, or optionally substituted aryl; or where a combination of $R^{N1}$ and $R^{N2}$, taken together with the nitrogen atom to which each are attached, form a heterocyclyl group, as defined herein.

By "aminoalkyl" is meant an alkyl group, as defined herein, substituted by an amino group, as defined herein.

By "aryl" is meant a group that contains any carbon-based aromatic group including, but not limited to, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl; (2) $C_{1-6}$ alkyl; (3) $C_{1-6}$ alkoxy; (4) $C_{1-6}$ alkoxy-$C_{1-6}$ alkyl; (5) $C_{1-6}$ alkylsulfinyl; (6) $C_{1-6}$ alkylsulfinyl-$C_{1-6}$ alkyl; (7) $C_{1-6}$ alkylsulfonyl; (8) $C_{1-6}$ alkylsulfonyl-$C_{1-6}$ alkyl; (9) aryl; (10) amino; (11) $C_{1-6}$ aminoalkyl; (12) heteroaryl; (13) $C_{1-6}$ alk-$C_{4-18}$ aryl; (14) aryloyl; (15) azido; (16) cyano; (17) $C_{1-6}$ azidoalkyl; (18) carboxyaldehyde; (19) carboxyaldehyde-$C_{1-6}$ alkyl; (20) $C_{3-8}$ cycloalkyl; (21) $C_{1-6}$ alk-$C_{3-8}$ cycloalkyl; (22) halo; (23) $C_{1-6}$ haloalkyl; (24) heterocyclyl; (25) heterocyclyloxy; (26) heterocyclyloyl; (27) hydroxyl; (28) $C_{1-6}$ hydroxyalkyl; (29) nitro; (30) $C_{1-6}$ nitroalkyl; (31) N-protected amino; (32) N-protected amino-$C_{1-6}$ alkyl; (33) oxo; (34) $C_{1-6}$ thioalkoxy; (35) thio-$C_{1-6}$ alkoxy-$C_{1-6}$ alkyl; (36) —$(CH_2)_rCO_2R^A$, where r is an integer of from zero to four, and $R^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (37) —$(CH_2)_rCONR^BR^C$, where r is an integer of from zero to four and where each $R^B$ and $R^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) $(CH_2)_rSO_2R^D$, where r is an integer of from zero to four and where $R^D$ is selected from the group consisting of (a) $C_{1-6}$ alkyl, (b) $C_{4-18}$ aryl, and (c) $C_{1-6}$ alk-$C_{4-18}$ aryl; (39) —$(CH_2)_rSO_2NR^ER^F$, where r is an integer of from zero to four and where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) $(CH_2)_rNR^GR^H$, where r is an integer of from zero to four and where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl; (43) perfluoroalkoxy; (44) aryloxy; (45) cycloalkoxy; (46) cycloalkylalkoxy; and (47) arylalkoxy. In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylcarbonylalkyl" is meant an alkyl group, as defined herein, substituted by an aryloyl group, as defined herein. In some embodiments, the arylcarbonylalkyl group is Ar—C(O)-Ak-, in which Ar is an optionally substituted aryl group and Ak is an optionally substituted alkyl or optionally substituted alkylene group. In particular embodiments, an unsubstituted arylcarbonylalkyl group is a $C_{4-20}$ aryl-C(O)—$C_{1-12}$ alkyl group or a $C_{4-12}$ aryl-C(O)—$C_{1-6}$ alkyl group or a $C_{4-18}$ aryl-C(O)—$C_{1-6}$ alkyl group.

By "arylene" is meant a bivalent form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "arylalkoxy" is meant an alkaryl group, as defined herein, attached to the parent molecular group through an oxygen atom.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloxycarbonyl" is meant an aryloxy group, as defined herein, that is attached to the parent molecular group through a carbonyl group. In some embodiments, an unsubstituted aryloxycarbonyl group is a $C_{5-19}$ aryloxycarbonyl group.

By "aryloyl" is meant an aryl group that is attached to the parent molecular group through a carbonyl group. In some embodiments, an unsubstituted aryloyl group is a $C_{5-19}$ or a $C_{7-11}$ aryloyl group.

By "arylsulfonyl" is meant an aryl group, as defined herein, attached to the parent molecular group through an —$SO_2$— group.

By "arylsulfonylalkyl" is meant an alkyl group, as defined herein, substituted by an arylsulfonyl group. In some embodiments, the arylcarbonylalkyl group is Ar—$SO_2$-Ak, in which Ar is an optionally substituted aryl group and Ak is an optionally substituted alkyl or optionally substituted alkylene group. In particular embodiments, the unsubstituted arylsulfonylalkyl group is a $C_{4-20}$ aryl-$SO_2$—$C_{1-12}$ alkyl group or a $C_{4-12}$ aryl-$SO_2$—$C_{1-6}$ alkyl group or a $C_{4-18}$ aryl-$SO_2$—$C_{1-6}$ alkyl group.

By "azido" is meant an —$N_3$ group.

By "azo" is meant an —N=N— group.

By "azidoalkyl" is meant an azido group attached to the parent molecular group through an alkyl group, as defined herein.

By "carbonyl" is meant a —C(O)— group, which can also be represented as >C=O.

By "carboxyaldehyde" is meant a —C(O)H group.

By "carboxyaldehydealkyl" is meant a carboxyaldehyde group, as defined herein, attached to the parent molecular group through an alkylene group, as defined herein.

By "carboxyl" is meant a —$CO_2H$ group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "dithiocarboxyamino" is meant —NR$^{N1}$C(S)SR$^{S1}$, where each of R$^{N1}$ and R$^{S1}$ is, independently, H or optionally substituted alkyl; or where a combination of R$^{N1}$ and R$^{S1}$, taken together with the nitrogen atom to which each are attached, form a heterocyclyl group, as defined herein.

By "halo" is meant F, Cl, Br, or I.

By "haloalkyl" is meant an alkyl group, as defined herein, substituted with one or more halo.

By "heteroalkyl" is meant an alkyl group, as defined herein, containing one, two, three, or four non-carbon heteroatoms (e.g., independently selected from the group consisting of nitrogen, oxygen, phosphorous, sulfur, or halo).

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, or halo).

By "heteroalkyleneoxy" is meant a heteroalkylene group, as defined herein, attached to the parent molecular group through an oxygen atom.

By "heteroaryl" is meant a subset of heterocyclyl groups, as defined herein, which are aromatic, i.e., they contain 4n+2 pi electrons within the mono- or multicyclic ring system.

By "heterocyclyl" is meant a 5-, 6-, or 7-membered ring, unless otherwise specified, containing one, two, three, or four non-carbon heteroatoms (e.g., independently selected from the group consisting of nitrogen, oxygen, phosphorous, sulfur, or halo). The 5-membered ring has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, homopiperidinyl, pyrazinyl, piperazinyl, pyrimidinyl, pyridazinyl, oxazolyl, oxazolidinyl, isoxazolyl, isoxazolidiniyl, morpholinyl, thiomorpholinyl, thiazolyl, thiazolidinyl, isothiazolyl, isothiazolidinyl, indolyl, quinolinyl, isoquinolinyl, benzimidazolyl, benzothiazolyl, benzoxazolyl, furyl, thienyl, thiazolidinyl, isothiazolyl, isoindazoyl, triazolyl, tetrazolyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like.

By "heterocyclyloxy" is meant a heterocyclyl group, as defined herein, attached to the parent molecular group through an oxygen atom.

By "heterocyclyloyl" is meant a heterocyclyl group, as defined herein, attached to the parent molecular group through a carbonyl group.

By "hydroxyl" is meant —OH.

By "hydroxyalkyl" is meant an alkyl group, as defined herein, substituted by one to three hydroxyl groups, with the proviso that no more than one hydroxyl group may be attached to a single carbon atom of the alkyl group and is exemplified by hydroxymethyl, dihydroxypropyl, and the like.

By "imine" is meant —CR$^{L1}$=N—, where R$^{L1}$ is H or optionally substituted alkyl.

By "imino" is meant —NH—.

By "nitrilo" is meant —N<. Exemplary nitrilo groups include where R$^{L3}$ is H, optionally substituted alkyl, optionally substituted haloalkyl, optionally substituted alkoxy, optionally substituted alkaryl, optionally substituted aryl, or halo.

By "nitro" is meant an —NO$_2$ group.

By "nitroalkyl" is meant an alkyl group, as defined herein, substituted by one to three nitro groups.

By "nitroso" is meant an —NO group.

By "oxo" is meant an =O group.

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "perfluoroalkylene" is meant an alkylene group, as defined herein, having each hydrogen atom substituted with a fluorine atom. Exemplary perfluoroalkylene groups include difluoromethylene, tetrafluoroethylene, etc.

By "perfluoroalkyleneoxy" is meant a perfluoroalkylene group, as defined herein, having an oxy group attached to either end of the perfluoroalkylene group. Exemplary perfluoroalkylene groups include, e.g., —OC$_f$F$_{2f}$— or —C$_f$F$_{2f}$O—, where f is an integer from about 1 to 5, and 2f is an integer that is 2 times f (e.g., difluoromethyleneoxy, tetrafluoroethyleneoxy, etc.).

By "perfluoroalkoxy" is meant an alkoxy group, as defined herein, having each hydrogen atom substituted with a fluorine atom.

By "phosphine" is meant a —PR$^{L3}$— group, where R$^{L3}$ is H or optionally substituted alkyl.

By "phosphono" is meant a —P(O)(OH)$_2$— group.

By "phosphonoyl" is meant a —P(O))H— group.

By "phosphoric ester" is meant a —O—PO(OH)$_2$ group.

By "phosphoryl" is meant a —P(O))< group.

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P. G. M. Wuts and T. W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkylsulfonate with reactive group O), such as —SO$_2$—R$^{S1}$, where R$^{S1}$ is optionally substituted C$_{1-12}$ alkyl, such as mesyl or benzylsulfonyl; an optionally substituted arylsulfonyl group (e.g., forming an arylsulfonate with reactive group O), such as —SO$_2$—R$^{S4}$, where R$^{S4}$ is optionally substituted C$_{4-18}$ aryl, such as tosyl or phenylsulfonyl; an optionally substituted alkoxycarbonyl or aryloxycarbonyl group (e.g., forming a carbonate with reactive group O), such as —C(O)—OR$^{T1}$, where R$^{T1}$ is optionally substituted C$_{1-12}$ alkyl or optionally substituted C$_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as —Si—(R$^{T2}$)$_3$, where each R$^{T2}$ is, independently, optionally substituted $C_{1-12}$ alkyl or optionally substituted $C_{4-18}$ aryl, such as trimethylsilyl, t-butyldimethylsilyl, or t-butyldiphenylsilyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful reagent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," *J. Pharm. Sci.* 1977 January; 66(1):1-19; and in "Handbook of Pharmaceutical Salts: Properties, Selection, and Use," Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Yet other cationic groups (e.g., resonance stabilized cationic groups) include imidazolium, benzimidazolium, amidinium, guanidinium, phosphazinium, phosphazenium, pyridinium, etc., as well as other cationic groups described herein.

By "spirocyclyl" is meant an alkylene diradical, both ends of which are bonded to the same carbon atom of the parent group to form a spirocyclyl group and also a heteroalkylene diradical, both ends of which are bonded to the same atom.

By "sulfinyl" is meant an —S(O)— group.

By "sulfo" is meant an —S(O)$_2$OH group.

By "sulfone" is meant R'—S(O)$_2$—R", where R' and R" is an organic moiety. Exemplary groups for R' and R" include, independently, optionally substituted alkyl, alkenyl, alkynyl, alkaryl, alkheterocyclyl, alkcycloalkyl, alkanoyl, alkoxy, alkoxyalkyl, alkoxycarbonyl, alkylsulfinyl, alkylsulfonyl, alkylsulfinylalkyl, alkylsulfonylalkyl, aminoalkyl, aryl, arylalkoxy, aryloxy, aryloxycarbonyl, aryloyl, aryl sulfonyl, arylsulfonylalkyl, azidoalkyl, carboxyaldehyde, carboxyaldehydealkyl, carboxyl, cyano, cycloalkyl, cycloalkoxy, haloalkyl, heteroaryl, heterocyclyl, heterocyclyloxy, heterocyclyloyl, hydroxyalkyl, nitroalkyl, perfluoroalkyl, perfluoroalkoxy, spirocyclyl, thioalkaryl, thioalkheterocyclyl, or thioalkoxy, as defined herein. The sulfone can be unsubstituted or substituted. For example, the sulfone can be substituted with one or more substitution groups, as described herein for alkyl and/or aryl.

By "sulfonyl" is meant an —S(O)$_2$— group.

By "sulfonamide" is meant an —S(O)$_2$—NR$^{L3}$— or an —NR$^{L3}$—S(O)$_2$— group, in which R$^{L3}$ is any useful moiety. Exemplary R$^{L3}$ groups include H, optionally substituted alkyl, optionally substituted haloalkyl, optionally substituted alkoxy, optionally substituted alkaryl, optionally substituted aryl, or halo.

By "thio" is meant an —S— group

By "thioalkaryl" is meant a thioalkoxy group, as defined herein, substituted with an aryl group, as defined herein.

By "thioalkheterocyclyl" is meant a thioalkoxy group, as defined herein, substituted with a heterocyclyl group, as defined herein.

By "thioalkoxy" is meant an alkyl group, as defined herein, attached to the parent molecular group through a sulfur atom. Exemplary unsubstituted thioalkoxy groups include $C_{1-6}$ thioalkoxy.

By "thioamido" is meant —C(S)NR$^{N1}$R$^{N2}$, where each of R$^{N1}$ and R$^{N2}$ is, independently, H or optionally substituted alkyl; or where a combination of R$^{N1}$ and R$^{N2}$, taken together with the nitrogen atom to which each are attached, form a heterocyclyl group, as defined herein.

By "thiol" is meant an —SH group.

By "triflate" is meant an —OSO$_2$—CF$_3$ or —OTf group.

By "triflimide" is meant an —N(SO$_2$—CF$_3$)$_2$ or —NTf$_2$ group.

By "trifyl" or "Tf" is meant an —SO$_2$—CF$_3$ group.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates to polymer structures having various cationic moieties $R^4$. In particular non-limiting embodiments, such cationic moieties $R^4$ can include an aryl group $Ar^4$ (e.g., an uncharged, optionally substituted aryl group) attached to one or more cationic functionalities $R^{41}$, which bear a cationic charge. Alternatively, the cationic moiety $R^4$ itself can be a cationically charged, optionally substituted aryl group. Described herein are structures for such polymers having cationic moieties, as well as methods for making and functionalizing such polymers.

Polymers

The present invention encompasses polymers, including copolymers. Exemplary polymer include any described herein, such as non-limiting generic structure provided in formulas (II), (IIA), (IIa), (IIb), (IIc), (IId), (IIe), (IIf), (IIg), (IIh), (IIi), (IIj), (IIk), (IIl), (IIm), (IIn), (IIo), (IIp), (IIq), (IIr), (IIs), (IIt), (IIu), (IIv), (IIw), (IIx), (II), (IIIa), (IIIb), (IIIc), (IIId), (IV), (V), and (Va), as well as particular structures provided as structures (II-1), (II-2), (II-3), (II-4), (II-5), (II-6), (II-7), (II-8), (II-9), (II-10), (II-11), (II-12), and (II-13), including salts thereof (e.g., anionic salts thereof, such as halide (e.g., chloride), sulfate, bisulfate, sulfite, bisulfite, carbonate, bicarbonate, hypochlorite, perchlorate, chlorate, phosphate, monohydrogen phosphate, acetate, formate, oxalate, etc.) or forms thereof including a counter ion (e.g., hydroxide).

Of these, formulas (III), (IIIa), (IIIb), (IIIc), (IIId), (V), and (Va) are considered to be reagents having one or more reactive end groups. Formula (IV) is considered to be a copolymer. In particular embodiments, the copolymer of the invention includes a first segment, a second segment, and at least one linking segment connecting at least one first segment with at least one second segment. The second segment can be a hydrophilic segment or a hydrophobic segment. The first segment can include at least one cationic moiety $R^4$.

Figure 1A:
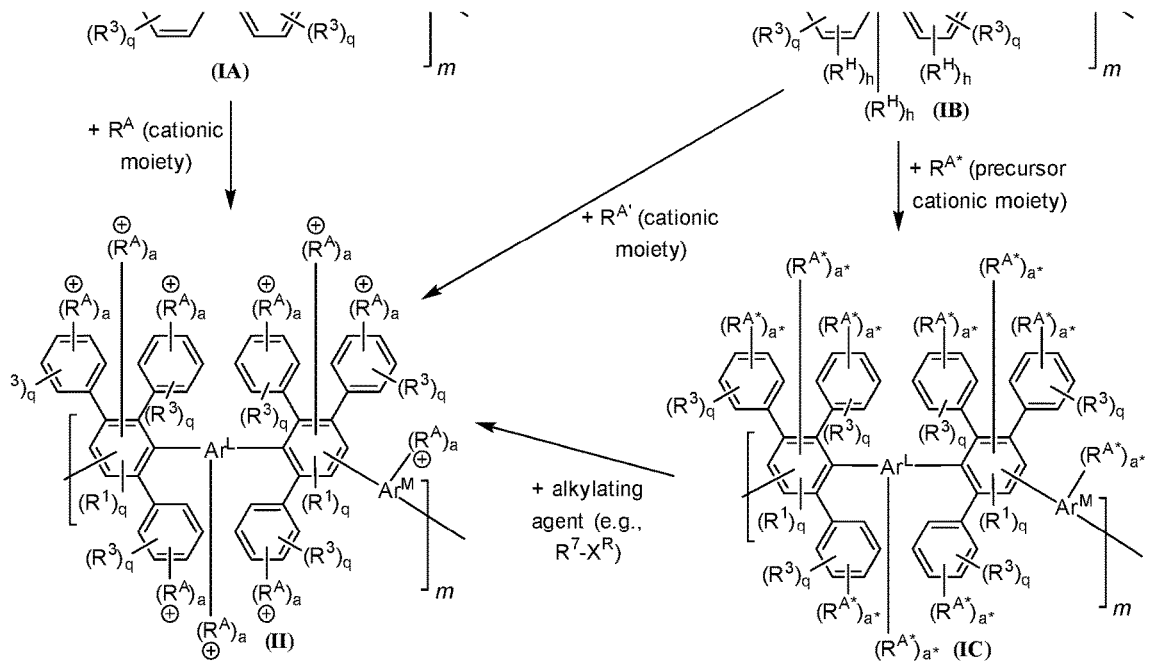
FIG. 1A-1B shows exemplary structures having formula (II) or (IIA). Provided is (A) an exemplary reaction scheme for reacting an initial polymer structure having formula (IA) in the presence of one or more reactive handles (R$^H$), thereby providing a polymer structure having formula (IB). Each of initial polymer structures having formula (IA) or (IB) can then be reacted with one or more cationic moieties (R$^A$ or R$^{A'}$) to provide a polymer structure having formula (II). Alternatively, the initial polymer structure having formula (IB) can be reacted with one or more precursor cationic moieties (R$^{A*}$), which in turn can be reacted (e.g., with one or more alkylating reagents, such as $R^7$—$X^R$) to provide a cationic moiety ($R^4$) bearing a positive charge. Also provided is (B) a structure having formula (IIA), in which pendent aryl groups (labeled Ar1 to Ar6), backbone aryl groups (labeled Ar7 to Ar9), and aryl groups configured to support a cationic moiety $R^4$ or a cationic functionality $R^{41}$ (labeled $Ar^4$).

In one embodiment, a polymer includes the structure of formula (II), including salts thereof. As can be seen in FIG. 1A, formula (II) is a generic structure encompassing other structures (e.g., formula (IIa)). The polymer can include any useful number of cationic moieties $R^4$ disposed on pendent aryl groups and/or backbone aryl groups. The polymer can include any useful type of cationic moieties (e.g., cationic moieties $R^4$ or cationic functionalities $R^{41}$), as well as any useful number of such moieties (e.g., a moieties, where a can be 1, 2, 3, 4, or 5).

As further seen in FIG. 1A, various initial polymers can be employed to arrive at a polymer including the structure of formula (II). In one non-limiting instance, an initial DAPP polymer having formula (IA) can include one or more pendent substituents $R^3$ and backbone substituents $R^1$. Then, one or more cationic moieties $R^4$ can be installed on the pendent and/or backbone groups of the DAPP polymer to provide formula (II). In another instance, one or more reactive handles $R^H$ are installed on one or more pendent or backbone groups of the DAPP polymer to provide a further polymer having formula (IB). Then, this further polymer (IB) can be reacted with reagents having one or more cationic moieties $R^{A'}$, in which $R^A$ is —$R^{H*}$—$R^{A'}$, where $R^{H*}$ is derived from $R^H$ and is formed after reacting with $R^{A'}$.

In yet another instance, polymer (IB) is reacted with a precursor cationic moiety $R^{A*}$ to form a polymer having formula (IC). Then, the $R^{A*}$ can be reacted with an alkylating reagent (e.g., $R^7$—$X^R$) to form a moiety having a cationic charge, in which $R^A$ is —$R^{A*'}$—$R^7$, where $R^{A*'}$ is derived from $R^{A*}$ and is formed after reacting with $R^7$. In one example, the precursor cationic moiety $R^{A*}$ includes a tertiary amine, and use of an alkylating reagent forms a moiety including a quaternary amine that has a cationic charge. Accordingly, any useful synthetic scheme can be employed to install cationic moieties or precursor cationic moieties on the DAPP polymers.

Figure 1B:
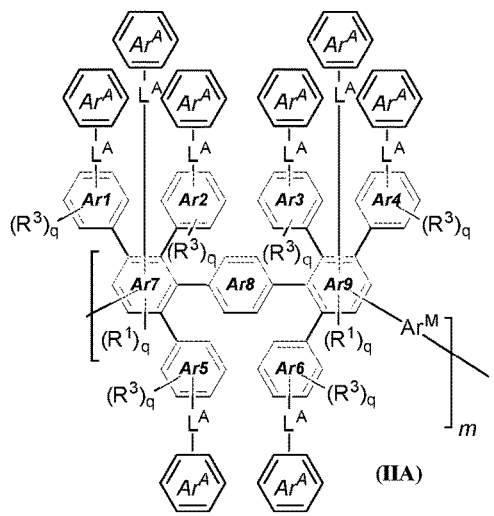

FIG. 1B provides structural characteristics of an exemplary polymer of the invention. As can be seen, formula (IIA) includes various aryl groups. Of these, the pendent aryl groups are labeled Ar1 to Ar6, and the backbone aryl groups are labeled Ar7 to Ar9. In some instances, the polymer includes further aryl groups $Ar^4$ connected to the pendent and/or backbone aryl groups (e.g., by way of one or more linkers $L^4$), where $Ar^4$ is an optionally substituted aryl group including one or more cationic functionalities or cationic moieties. In one instance, $Ar^4$ is, substituted with one or more -$L^{A1}$-$R^{A1}$ in which $L^{A1}$ is a linker and $R^{A1}$ is a cationic functionality (e.g., any described herein). In another instance, $Ar^4$ includes a cationic moiety $R^A$ (e.g., any described herein).

The polymer can include any useful type of pendent substituents (e.g., pendent substituents $R^A$ and/or $R^3$), as well as any useful number of such substituents on each aryl group (e.g., a substituents for $R^A$ and/or q substituents for $R^3$, where each of a and q is, independently, 0, 1, 2, 3, 4, or 5). For any structure described herein, each $R^3$ is, independently, a cationic moiety ($R^A$), a precursor cationic moiety ($R^{A*}$, which upon reaction with any useful reagent provides the cationic moiety $R^A$), a cationic functionality ($R^{A1}$), a precursor cationic functionality ($R^{A1*}$, which upon reaction with any useful reagent provides the cationic functionality $R^{A1}$), a reactive handle ($R^H$), an acidic moiety (e.g., $R^S$, $R^P$, $R^C$, or any described herein), an electron-withdrawing moiety (e.g., $R^F$ or any described herein), or an inert substituent (e.g., H, halo, optionally substituted alkyl, optionally substituted alkoxy, etc.). In some embodiments, each and every $R^3$ is, independently, $R^A$, $R^{A*}$, $R^{A1}$, $R^{A1*}$, $R^H$, $R^S$, $R^P$, $R^C$, or $R^F$. In some embodiments, fully substituted pendent groups (e.g., $R^3$ is not H) can provide polymers with enhanced proton conduction and durability characteristics.

The polymer can also include any useful backbone structure. For instance, in formula (II), the backbone includes three groups, i.e., two $R^1$-substituted aryl groups and a bridging group $Ar^L$ optionally including a cationic moiety $R^A$. The polymer can include any useful type of backbone substituents (e.g., backbone substituents $R^1$ or $R^A$ disposed on a backbone aryl group), as well as any useful number of such substituents on each group (e.g., a substituents for $R^A$ and/or q substituents for $R^1$, where each of a and q is, independently, 0, 1, 2, 3, 4, or 5). For any structure described herein, each $R^1$ is, independently, a cationic moiety ($R^A$), a precursor cationic moiety ($R^{A*}$), a cationic functionality ($R^{A1}$), a precursor cationic functionality ($R^{A1*}$), a reactive handle ($R^H$), an acidic moiety (e.g., $R^S$, $R^P$, $R^C$, or any described herein), an electron-withdrawing moiety (e.g., $R^F$ or any described herein), or an inert substituent (e.g., H, halo, optionally substituted alkyl, optionally substituted alkoxy, etc.). In some embodiments, each and every $R^1$ is, independently, $R^A R^{A*}$, $R^H R^S$, $R^P$, $R^C$, or $R^F$.

Each of bridging group $Ar^L$ and connecting group $Ar^M$ can be any useful bivalent linker. In particular embodiments, each of $Ar^L$ and $Ar^M$ is, independently, includes an optionally substituted arylene group. In some embodiments, each of $Ar^L$ and $Ar^M$ is, independently, an optionally substituted arylene group. In other embodiments, each of $Ar^L$ and $Ar^M$ is, independently, substituted with 1, 2, 3, or 4 $R^A$ substituent(s), $R^{A*}$ substituent(s), $R^{A1}$ substituent(s), $R^{A1*}$ substituent(s), $R^H$ substituent(s), $R^S$ substituent(s), $R^P$ substituent(s), $R^C$ substituent(s), $R^F$ substituent(s), or label(s). Exemplary labels include a detectable label, such as an NMR label (e.g., fluorine, such as $^{19}F$; nitrogen, e.g., $^{15}N$; or oxygen, e.g., $^{17}O$), a spin label, an isotopic label, a mass label, a fluorescent label, a dye, etc.

In yet other embodiments, each of $Ar^L$ and $Ar^M$ is, independently, configured to reduce meta linkages. Thus, in some instances, each of $Ar^L$ and $Ar^M$ is, independently, a bivalent linker formed by removing a hydrogen atom from opposite faces of an aryl group. Examples of such linkers include 1,4-benzenediyl (or 1,4-phenylene), 2,7-phenanthrylene (or 2,7-phenanthrenediyl), 1,5-naphthylene (or 1,5-napthalenediyl), etc. For example, the polymer can include a structure of Formula (IId) having $Ar^L$ as a $R^1$-substituted 1,4-phenylene and $Ar^M$ as an $R^2$-substituted, $R^A$-substituted 1,4-phenylene.

A polymer can include any useful number of structures of formula (II). In some embodiments, the polymer includes m structures, where m is an integer of from about 1 to 1000 (e.g., 1 to 500).

Cationic moieties $R^A$ can be present on the same polymer or on the same segment of the polymer with any other different type of substitutions, e.g., $R^H$ substitutions, acidic substitutions (e.g., $R^S$, $R^P$, and/or $R^C$, as well as combinations thereof), and/or $R^F$ substitutions. In one instance, cationic moieties could be installed in a strategic manner to provide resonance-stabilized cationic groups capable of binding and transporting anions.

In particular, the use of acidic moieties and electron-withdrawing moieties could provide orthogonal chemistries to control and optimize performance (e.g., by employing acidic moieties to control ion conduction) and durability (e.g., by employing electron-withdrawing moieties to reduce oxidation). Further, the presence of a reactive handle $R^H$ allows the polymer to be further functionalized (e.g., with one or more functional groups, which can be any groups described herein, including those described for $R^A$, $R^{A*}$, $R^{A1}$, $R^{A1*}$, $R^S$, $R^P$, $R^C$, and/or $R^F$). In one instance, each pendent aryl group is substituted with an $R^A$, an $R^{A*}$, an $R^{A1}$, an $R^{A1*}$, an $R^H$, an $R^S$, an $R^P$, an $R^C$, and/or an $R^F$. Optionally, one or more backbone aryl groups can be further substituted with an $R^A$, an $R^{A*}$, an $R^{A1}$, an $R^{A1*}$, an $R^H$, an $R^S$, an $R^P$, an $R^C$, and/or an $R^F$.

Figure 2A:
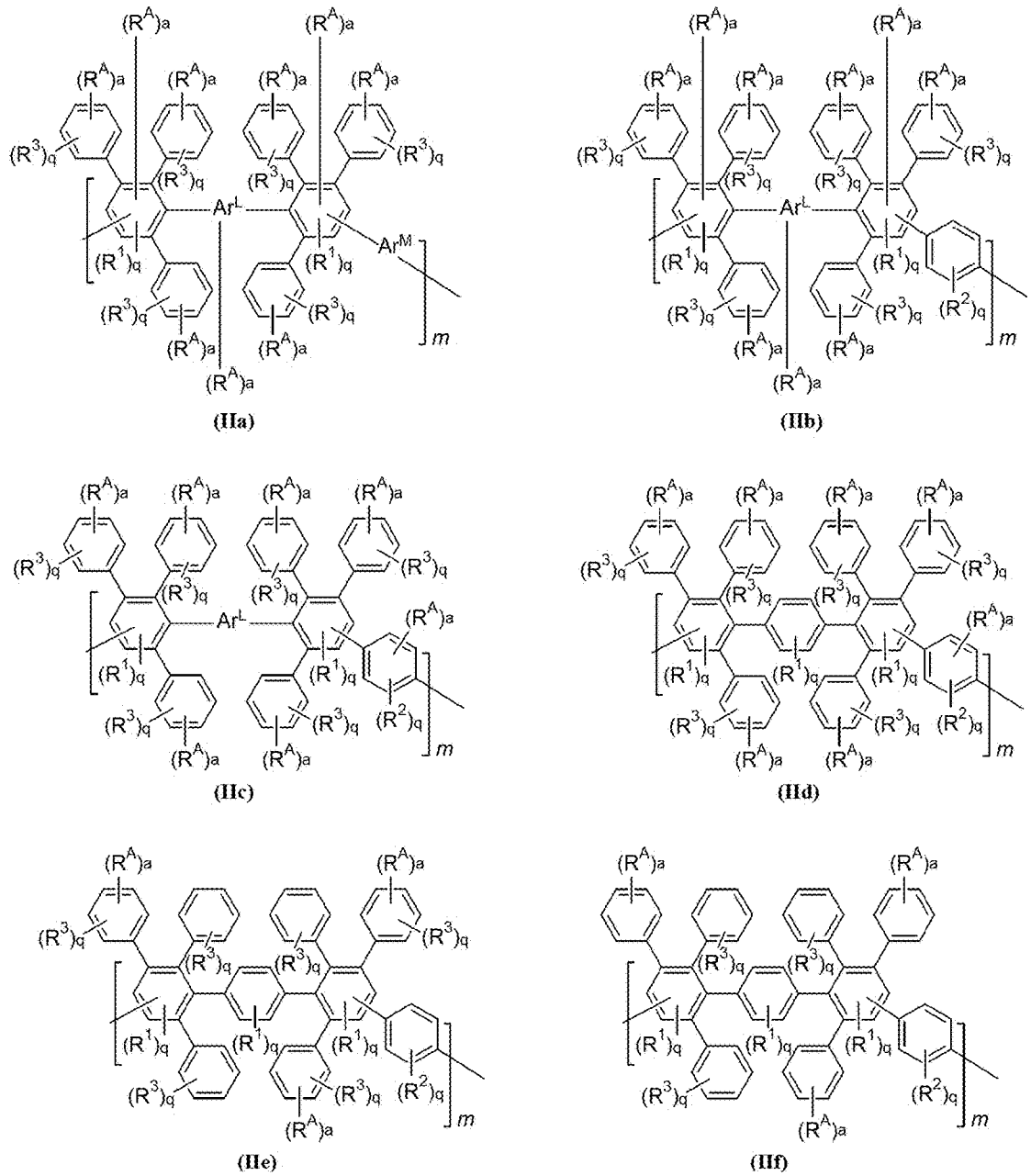
FIG. 2A-2B shows schematics of exemplary polymer structures having one or more cationic moieties ($R^4$). Provided are exemplary polymer structures (A) having formulas (IIa) to (IIf) and (B) having formulas (IIg) to (IIj).

As seen in FIG. 2A, formulas (IIa) to (IIf) provide polymers having various combinations of structures for the bridging group $Ar^L$ and the connecting group $Ar^M$, as well as having various substitution patterns including an a number of $R^A$ groups. For example, formula (IIa) includes a connecting group $Ar^M$; formula (In) includes a connecting group that is a $R^2$-substituted 1,4-phenylene group; formula (IIc) includes a connecting group that is a $R^2$-substituted, $R^A$-substituted 1,4-phenylene group; formula (IId) includes a bridging group that is a $R^1$-substituted 1,4-phenylene group and a connecting group that is a $R^2$-substituted 1,4-phenylene group; formula (IIe) includes a bridging group that is a $R^1$-substituted 1,4-phenylene group, a connecting group that is a $R^2$-substituted, $R^4$-substituted 1,4-phenylene group, and a substitution pattern including $R^4$ on three pendent aryl groups; and formula (III) includes a bridging group that is a $R^1$-substituted 1,4-phenylene group, a connecting group that is a $R^2$-substituted 1,4-phenylene group, and a substitution pattern including exclusively $R^4$ or $R^3$ on the pendent aryl groups.

Figure 2B:
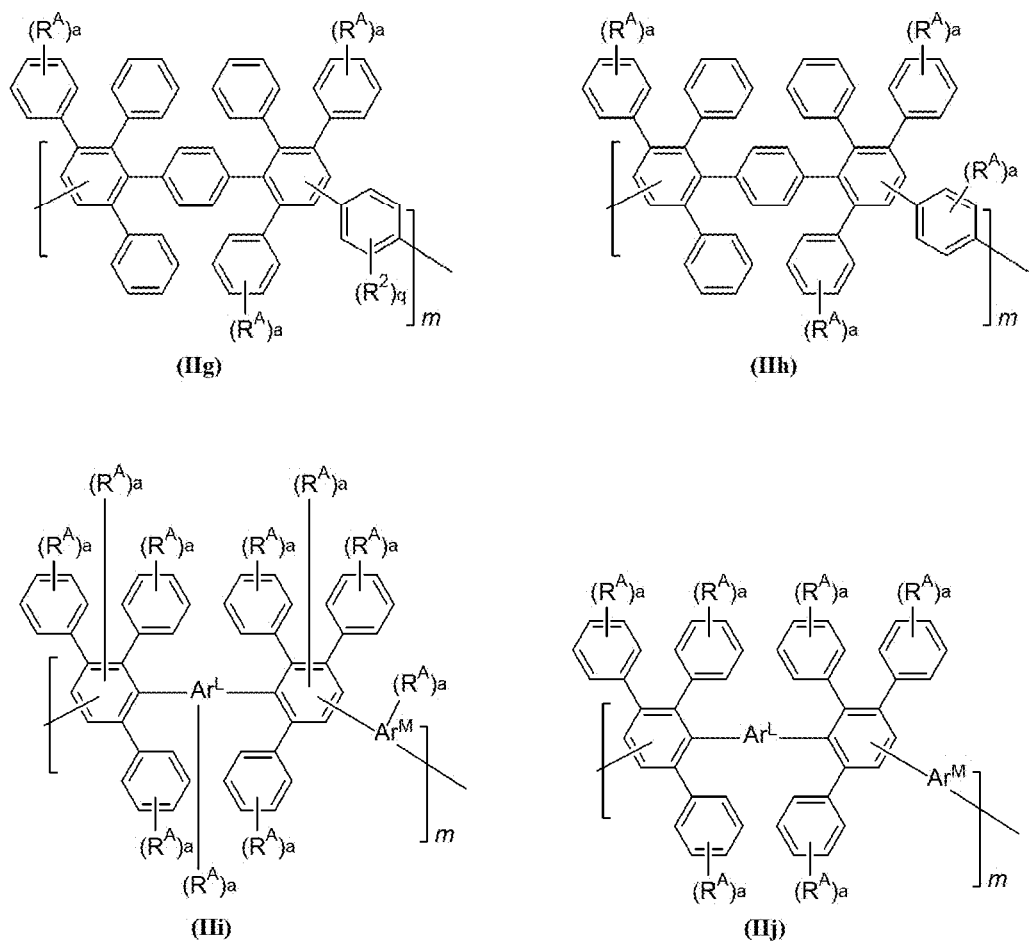

As seen in FIG. 2B, formulas (IIg) to (IIj) provide polymers having various $R^4$ substituents on pendent aryl groups, bridging group, and/or connecting group. For instance, formula (IIg) provides a polymer having $R^4$ substituents on some of the pendent aryl groups but $R^2$ substituents on the connecting group, whereas formula (IIh) provides a polymer having $R^4$ substituents on both the pendent aryl groups and the connecting group. In other instances, formulas (IIg) to (IIj) provide polymers having various levels of $R^4$ substitution. As can be seen, formulas (IIg) and (IIh) include $R^4$ substituents on three of the pendent aryl groups. In another instance, formula (IIi) includes $R^4$ substituents on all pendent and backbone aryl groups, whereas formula (IIj) includes $R^4$ substituents on all pendent aryl groups. The present invention encompasses any useful substitution pattern of one or more $R^4$ substituents on pendent, backbone, bridging, and/or connecting aryl groups.

Polymer Reagents

The present invention also includes reagents having any useful polymer segment described herein. For instance, the reagent can include a polymer segment disposed between two reactive end groups, where each end group can be the same or different. The polymer segment can be any described herein (e.g., a structure provided in formula (II), (IIa), (IIb), (IIc), (IId), (IIe), (IIf), (IIg), (IIh), (IIi), (IIj), (IIk), (III), (IIm), (IIn), (IIo), (IIp), (IIq), (IIr), (IIs), (IIt), (IIu), (IIv), (IIw), and (IIx), as well as particular structures provided as structures (II-1), (II-2), (II-3), (II-4), (II-5), (II-6), (II-7), (II-8), (II-9), (II-10), (II-11), (II-12), and (II-13), as well as salts of any of these). In addition, the polymer segment can include a second segment (e.g., Ar*), such as any described herein.

Optionally, a sublink L' can be present between the polymer segment and a reactive end group. The sublink L' can be composed of any useful linkage, such as any described herein (e.g., those described for linking segment L or $L^4$).

The reactive end group can be any useful group configured to react with a second reactive end group. In this way, ordered copolymer block structures can be synthesized by selectively placing reactive end groups on the ends of blocks or segments to form polymer reagents, and then reacting that polymer reagent to place the segments in an end-to-end fashion in the copolymer. A skilled artisan would understand how to place reactive end groups in a polymer reagent in order to form a copolymer with the desired configuration or order.

The reactive end group $R^L$ is usually placed on the ends of a first polymer reagent, as well as on the ends of the second polymer reagent. Then, a first reactive end group on the first polymer reagent reacts with the second reactive end group on a second polymer reagent. The first and second reactive end groups can be chosen from a pair of co-reactive groups. For example, such pairs of co-reactive groups include (i) a nucleophile for use with (ii) an electrophile; (i) an optionally substituted aryl group (e.g., having a —C(O)$R^I$ group, where $R^I$ is an aryl group having one or more halo) for use with (ii) an optionally substituted aryl group (e.g., having a —O$R^{Pr}$ group, where $R^{Pr}$ is H or an O-protecting group that can be deprotected prior to conducting a reaction); (i) an optionally substituted aryl group (e.g., having a —C(O)$R^I$ group, where $R^I$ is an aryl group having one or more halo) for use with (ii) an optionally substituted alkoxy group (e.g., such as —O$R^{Pr}$, where $R^{Pr}$ is H or an O-protecting group that can be deprotected prior to conducting a reaction); (i) an optionally substituted aryl group for use with (ii) an optionally substituted alkoxy group (e.g., such as O$R^{Pr}$, where $R^{Pr}$ is H or an O-protecting group that can be deprotected prior to conducting a reaction); (i) an optionally substituted alkynyl group for use with (ii) an optionally substituted azido group, which can participate in a Huisgen 1,3-dipolar cycloaddition reaction; as well as (i) an optionally substituted diene having a $4\pi$ electron system for use with (ii) an optionally substituted dienophile or an optionally substituted heterodienophile having a $2\pi$ electron system, which can participate in a Diels-Alder reaction. For the co-reactive groups above, reagent (i) reacts with reagent (ii) in each pair. In one instance, the reactive group is $R^H$ (e.g., any described herein).

Figure 3A:
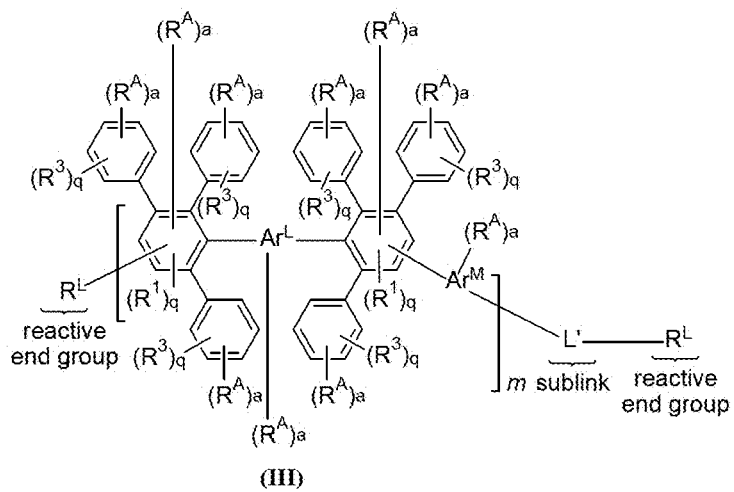
FIG. 3A-3C shows schematics of exemplary reagents having one or more reactive end groups (e.g., $R^L$ or an aryl group including $R^H$). Provided are exemplary reagent structures (A) having formula (III), (B) having formula (IIIa) or (IIIb), and (C) having formula (IIIc) or (IIId).

An exemplary polymer reagent is provided as structure (III) in FIG. 3A. As can be seen, polymer reagent (III) includes a two reactive end groups $R^L$ with a polymer segment (in brackets) placed between the reactive end groups. For this exemplary reagent, the optional sublink L' is located between the polymer segment and one of the reactive end groups. For reagent (III), the polymer segment is that of formula (II), but any formula or structure herein can be employed for this polymer segment.

Figure 3B:
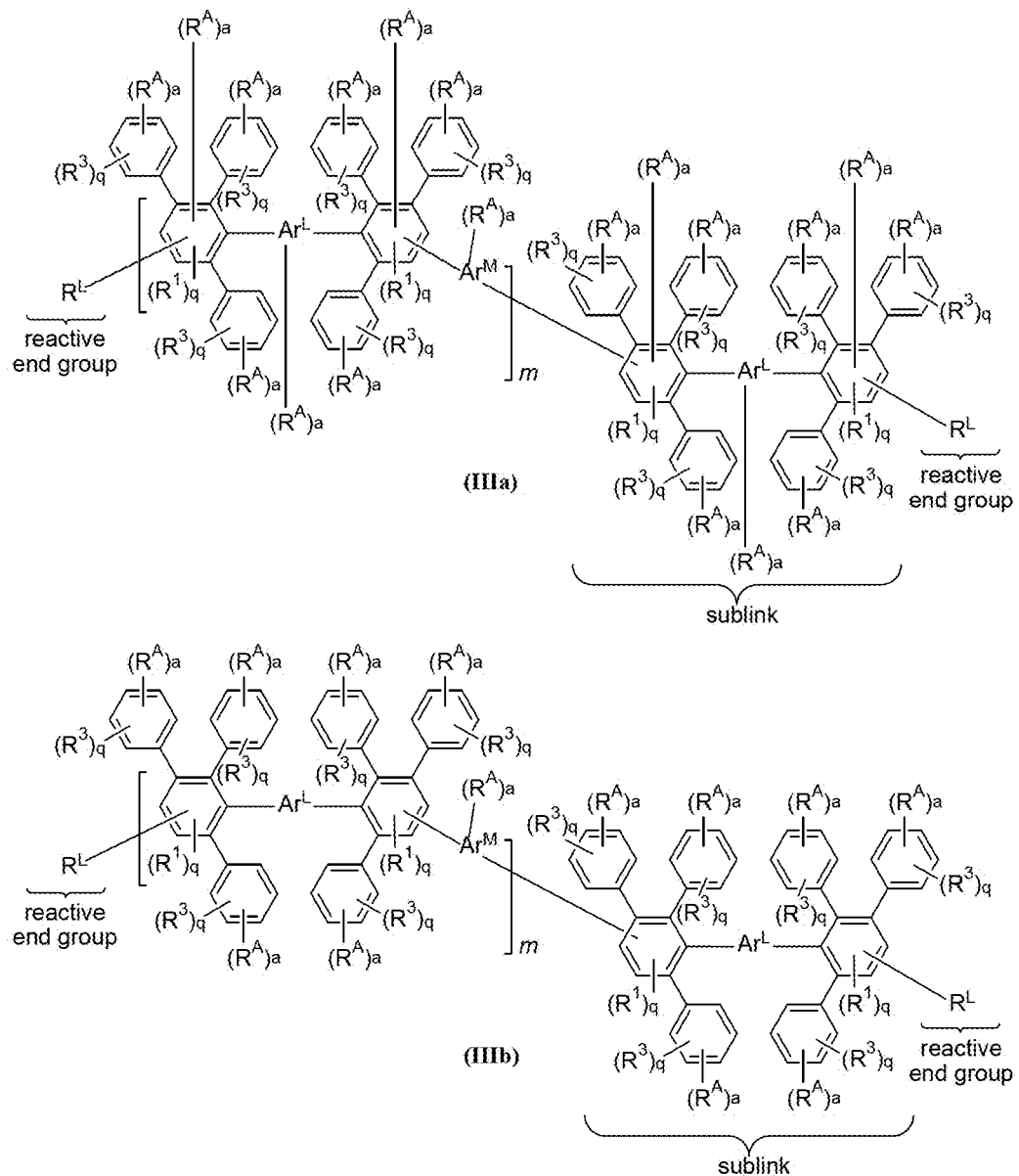
Figure 3C:
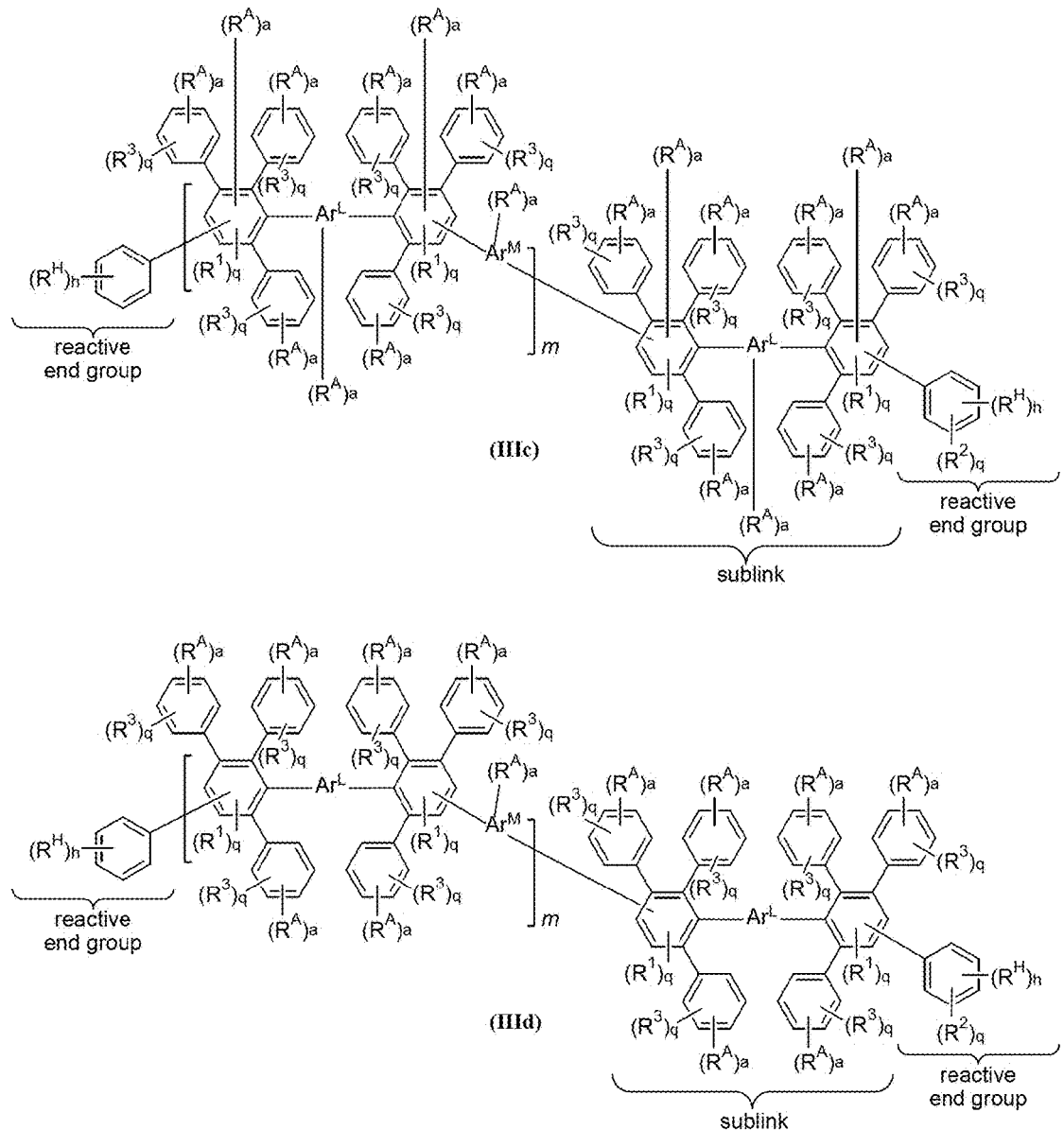

Further exemplary polymer reagents are provided as structure (IIIa) to (IIId) in FIG. 3B-3C. Exemplary reagents include a polymer having structure (IIIa) to (IIId), which includes a sublink having a structure similar to that of Formula (II) but lacking aryl group $Ar^M$.

Copolymers

Figure 4A:
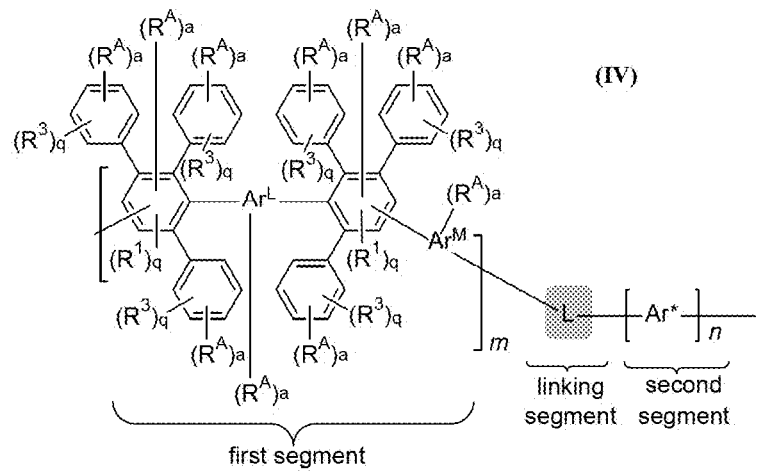
FIG. 4A-4C shows schematics of exemplary copolymer structures having a first segment, a linking segment, and a second segment. Provided are exemplary polymer structures (A) having formula (IV), (B) having formula (V), and (C) having formula (Va).

The present invention also includes copolymers. In one embodiment, the copolymer includes the structure of formula (IV), including salts thereof or forms thereof including a counter ion. As can be seen in FIG. 4A, formula (IV) is a generic structure. Similar to formula (II) described above, the copolymer structure includes $R^4$-substituted pendent and/or backbone aryl groups, backbone substituents $R^1$, pendent substituents $R^3$, bridging group $Ar^L$, connecting group $Ar^M$, and m units. Thus, the description for these substituents provided for formula (II) applies equally to formula (IV). In some embodiments, each of $Ar^L$ and $Ar^M$ is, independently, an optionally substituted phenylene. In other embodiments, each of $Ar^L$ and $Ar^M$ is, independently, an optionally substituted 1,4-phenylene, e.g., $Ar^L$ as a $R^1$-substituted 1,4-phenylene and/or $Ar^M$ as an $R^2$-substituted 1,4-phenylene.

Figure 4B:
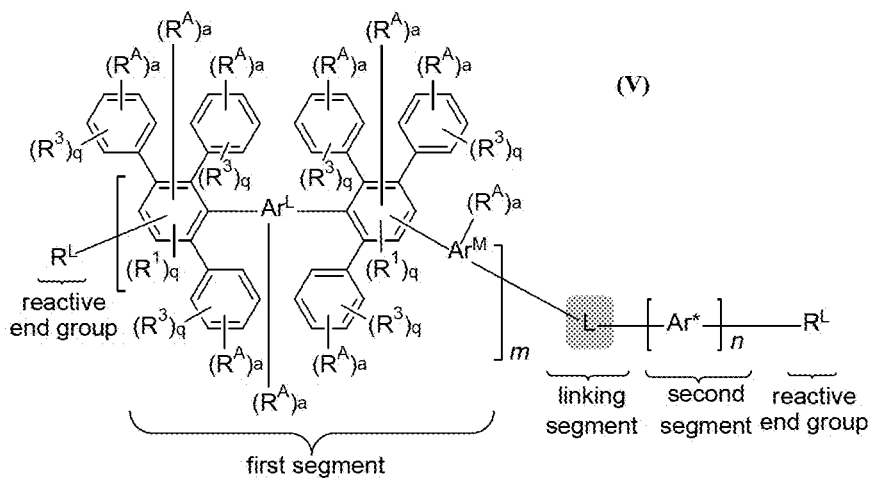
Figure 4C:
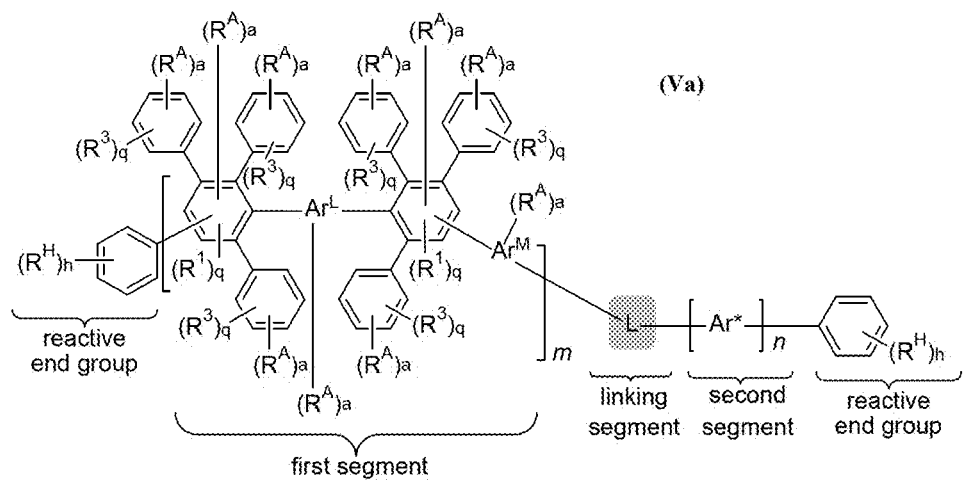

FIG. 4B provides formula (V), which is another generic structure including a first segment, a linking segment, a second segment, and two reactive end groups $R^L$. The first segment can be any described herein (e.g., a structure having formula (II)). The reactive end group $R^L$ can be any described herein. As seen in FIG. 4C, the structure of formula (Va) includes a reactive end group $R^L$ that is an optionally substituted aryl group (e.g., an aryl group having h number of $R^H$ groups).

Formulas (IV) and (V) also include additional groups, including a linking segment L and a second segment Ar* of n units. The linking segment L can be any useful linkage (e.g., any herein), including those to form a covalent bond between the two segments. In some embodiments, the linking segment includes those composed of structures, or a portion of such structures, in the first segment and/or the second segment. Exemplary linking segments L include a covalent bond, an optionally substituted alkylene, an optionally substituted heteroalkylene, an optionally substituted alkyleneoxy, an optionally substituted heteroalkyleneoxy, an optionally substituted arylene, an optionally substituted aryleneoxy, an Ar* unit, or a structure of formula (II).

The copolymer having formulas (IV) and (V) can have any useful second segment Ar*. In some embodiments, Ar* includes a structure of formula (II) (e.g., where each $R^3$ is H, optionally substituted alkyl, $R^A$, $R^{A*}$, $R^{A1}$, $R^{A1*}$, $R^F$, $R^S$, and/or $R^P$ substituents); a hydrophobic subunit; a sulfone subunit (e.g., a subunit including an —$SO_2$— group); an arylene sulfone subunit (e.g., —$(Ar)_a$—$SO_2$—$(Ar)_b$, where Ar is an optionally substituted arylene group, as defined herein, and each a and b is an integer of about 0 to 10 and at least one of a orb is 1 or more); an ether sulfone subunit (e.g., —$(X^1)_a$—$SO_2$—$(X^2)_b$—O— or $X^1$—O—$X^2$—$SO_2$—, where each $X^1$ and $X^2$ is, independently, any useful group, such as optionally substituted arylene or optionally substituted alkylene, and each a and b is an integer of about 0 to 10 and at least one of a orb is 1 or more); an arylene ether subunit (e.g., —$(Ar)_a$—O—$(Ar)_b$—, where Ar is an optionally substituted arylene group, as defined herein, and each a and b is an integer of about 0 to 10 and at least one of a or b is 1 or more); an arylene ketone subunit (e.g., —$(Ar)_a$—C(O)—$(Ar)_b$, where Ar is an optionally substituted arylene group, as defined herein, and each a and b is an integer of about 0 to 10 and at least one of a or b is 1 or more); a perfluoroalkyl subunit (e.g., —$(CF_2)_{f1}$—, where f1 is an integer of 1 to about 16); or a perfluoroalkoxy subunit (e.g., —$O(CF_2)_{f1}$, —$(CF_2)_{f1}O$—, —$O(CF_2)_{f1}CF(CF_3)O(CF_2)_{f2}$—, >$CFO(CF_2)_{f1}CF(CF_3)O(CF_2)_{f2}$—, where each f1 and f2 is, independently, an integer of 1 to about 16).

In some embodiments, formulas (IV) and (V) include a second segment Ar* that is a hydrophobic segment. In some embodiments, the second segment Ar* is a hydrophobic segment having one or more electron-withdrawing moieties (e.g., $R^F$). In particular embodiments, each pendent aryl group in the polymer or a segment thereof is substituted with an $R^F$ substitution, where each substitution may be the same or different. In other embodiments, both pendent and backbone aryl groups are each, independently, substituted with an $R^F$ substitution.

In other embodiments, formulas (IV) and (V) include a second segment Ar* that is a hydrophilic segment. In some embodiments, the second segment Ar* is a hydrophilic segment that includes the two R'-substituted aryl groups and a bridging group $Ar^L$. Thus, in some embodiments, at least one substituent in this hydrophilic segment (e.g., substituents $R^1$, $R^2$, or $R^3$) is a hydrophilic moiety (e.g., a cationic moiety $R^A$, an acidic moiety, such as any $R^S$, $R^P$, and/or $R^C$ described herein, or any moiety including a sulfonyl group or a phosphoryl group). In some embodiments, the hydrophilic segment includes one or more cationic moieties $R^A$, acidic moieties (e.g., $R^S$, $R^P$, and/or $R^C$, as well as combinations thereof) on only the pendent aryl groups. Exemplary hydrophilic segments include those having $R^S$-substituted pendent aryl groups, $R^P$-substituted pendent aryl groups, and $R^1$-substituted backbone aryl groups.

A copolymer can include any useful number or ratio of first and second segments (e.g., hydrophilic and hydrophobic segments). In some embodiments, formulas (IV) and (V) include m number of first segments (e.g., hydrophilic segments) and n number of second segments (e.g., hydrophobic segments), where each of m and n is, independently, an integer of from about 1 to 1000. In other embodiments, the m (the number of first segments) is minimized in order to minimize swelling of the copolymer. For example, in some instances, m<n. In other instance, n is at least about 5 times greater than m (e.g., n is about 10 times greater than m, or n is about 20 times greater than m). In yet other instances, m is of from about 1 to 100, and n is of from about 5 to 500 (e.g., m is of from about 1 to 50, and n is of from about 5 to 500; m is of from about 1 to 50, and n is of from about 10 to 100; m is of from about 1 to 10, and n is of from about 5 to 500; m is of from about 1 to 20, and n is of from about 20 to 400; and m is of from about 1 to 10, and n is of from about 100 to 200). In some instances, m can be about 5.6 and n can be about 60.7 or 121.4. In other instances, m is of from about 1 to 20, and n is of from about 20 to 400.

For any polymer herein, including any copolymer herein, each and every $R^1$ can be independently, $R^A$, $R^{A*}$, $R^{A1}$, $R^{A1*}$, $R^H$, $R^S$, $R^P$, $R^C$, and/or $R^F$. For instance, in some embodiments, each aryl group in the polymer or a segment thereof is substituted with an $R^A$, an $R^{A*}$, an $R^{A1}$, an $R^{A1*}$, an $R^H$, an $R^S$, an $R^P$, and/or an $R^C$ substitution, where each substitution may be the same or different. Cationic moieties $R^A$ can be present on the same polymer or on the same segment of the polymer with any other different type of substitutions, e.g., $R^H$ substitutions, acidic substitutions (e.g., $R^S$, $R^P$, and/or $R^C$, as well as combinations thereof), and $R^F$ substitutions. In particular, the use of acidic moieties and electron-withdrawing moieties could provide orthogonal chemistries to control and optimize performance (e.g., by employing acidic moieties to control ion conduction) and durability (e.g., by employing electron-withdrawing moieties to reduce oxidation). Further, the presence of a reactive handle $R^H$ allows the polymer to be further functionalized (e.g., with one or more functional groups $R^A$, $R^{A*}$, $R^{A1}$, $R^{A1*}$, $R^S$, $R^P$, $R^C$, and/or $R^P$). In one instance, each pendent aryl group is substituted with an $R^A$, an $R^{A*}$, an $R^{A1}$, an $R^{A1*}$, an $R^H$, an $R^S$, an $R^P$, an $R^C$, and/or an $R^F$. Optionally, one or more backbone aryl groups can be further substituted with an $R^A$, an $R^{A*}$, an $R^{A1}$, an $R^{A1*}$, an $R^H$, an $R^S$, an $R^P$, an $R^C$, and/or an $R^F$.

Cationic Moiety and Cationic Functionality

In some embodiments, the polymers herein include the use of a cationic moiety that provides a substructure to support a cationic functionality, in which this cationic functionality actually includes a cationic charge. For example, an exemplary cationic moiety can include an optionally substituted phenyl group including a cationic functionality that is a quaternary ammonium (e.g., —$NH_3^+$) supporting a cationic charge. Exemplary cationic functionalities include an ammonium derivative (e.g. —$NR^{N1}R^{N2}R^{N3}$ or =$NR^{N1}R^{N2}$ or >$NR^{N1}R^{N2}$ or =$NR^{N1}$— or >$NR^{N1}$— or ≡$NR^{N1}$, where each of $R^{N1}$ and $R^{N2}$ and $R^{N3}$ is, independently, H, optionally substituted alkyl, optionally substituted alkaryl, or optionally substituted aryl; or where $R^{N1}$ and $R^{N2}$ or where $R^{N2}$ and $R^{N3}$ taken together with the nitrogen atom to which each are attached, form a heterocyclyl group, as defined herein); a sulfonium derivative (e.g., —$SR^{S1}R^{S2}$, where each of $R^{S1}$ and $R^{S2}$ is, independently, H, optionally substituted alkyl, optionally substituted alkaryl, optionally substituted aryl, or optionally substituted amino (e.g., any described herein)); a sulfoxonium derivative (e.g., —S(=O)$R^{S1}R^{S2}$, where each of $R^{S1}$ and $R^{S2}$ is, independently, H, optionally substituted alkyl, optionally substituted alkaryl, optionally substituted aryl, or optionally substituted amino (e.g., any described herein)); a phosphonium derivative (e.g., —$PR^{P1}R^{P2}R^{P3}$ or —$NR^{N1}PR^{P1}R^{P2}R^{P3}$, where $R^{N1}$ is H, optionally substituted alkyl, optionally substituted alkaryl, or optionally substituted aryl, and where each of $R^{P1}$ and $R^{P2}$ and $R^{P3}$ is, independently, H, optionally substituted alkyl, optionally substituted alkoxy, optionally substituted alkcycloalkyl, optionally substituted alkaryl, optionally substituted aryl, or optionally substituted amino (e.g., any described herein)); a phosphazenium derivative; or an iminium derivative (e.g., —NR$^{N1}$=CR$^{C1}$R$^{C2}$, where each of R$^{N1}$ and R$^{C1}$ and R$^{C2}$ is, independently, H, optionally substituted alkyl, optionally substituted alkaryl, or optionally substituted aryl).

In particular embodiments, the cationic functionality or the cationic moiety includes or is a heterocyclyl having a cationic charge. Exemplary cationic functionalities or cationic moieties include an optionally substituted isoxazolium, optionally substituted oxazolium, optionally substituted thiazolium, optionally substituted pyrrolium, optionally substituted furanium, optionally substituted thiophenium, optionally substituted imidazolium, optionally substituted pyrazolium, optionally substituted isothiazolium, optionally substituted triazolium, optionally substituted tetrazolium, optionally substituted furazanium, optionally substituted pyridinium, optionally substituted pyrimidinium, optionally substituted pyrazinium, optionally substituted triazinium, optionally substituted tetrazinium, optionally substituted pyridazinium, optionally substituted oxazinium, optionally substituted pyrrolidinium, optionally substituted pyrazolidinium, optionally substituted imidazolinium, optionally substituted isoxazolidinium, optionally substituted oxazolidinium, optionally substituted piperazinium, optionally substituted piperidinium, optionally substituted morpholinium, optionally substituted azepanium, optionally substituted azepinium, optionally substituted indolium, optionally substituted isoindolium, optionally substituted indolizinium, optionally substituted indazolium, optionally substituted benzimidazolium, optionally substituted isoquinolinum, optionally substituted quinolizinium, optionally substituted dehydroquinolizinium, optionally substituted quinolinium, optionally substituted isoindolinium, optionally substituted benzimidazolinium, and optionally substituted purinium, or salts thereof (e.g., anionic salts thereof).

In some embodiments, the cationic functionality or the cationic moiety is selected from the group consisting of:

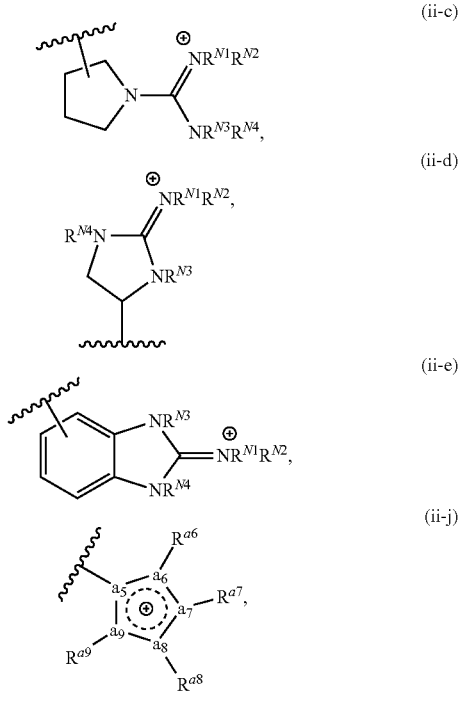

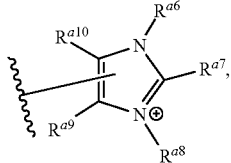

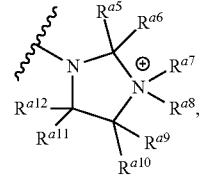

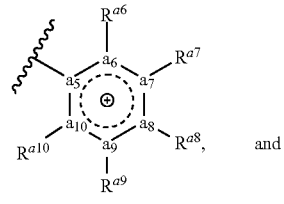

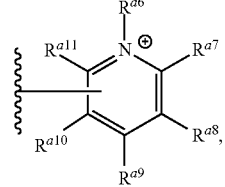

or a salt thereof (e.g., an anionic salt thereof) or a form thereof including a counter ion. In some embodiments, each of R$^{N1}$, R$^{N2}$, R$^{N3}$, and R$^{N4}$ is, independently, H, halo, cyano, nitro, nitroso, azido, sulfo, carboxyaldehyde, carboxyl, hydroxyl, amino, amidino, amido, thioamido, dithiocarboxyamino, optionally substituted C$_{1-12}$ alkyl, optionally substituted C$_{3-12}$ cycloalkyl, optionally substituted C$_{1-12}$ alkanoyl, optionally substituted C$_{1-12}$ alkoxy, optionally substituted heterocyclyl, optionally substituted C$_{4-18}$ aryl, optionally substituted C$_{1-6}$ alk-C$_{4-18}$ aryl, or optionally substituted C$_{4-18}$ aryloxy, where a combination of R$^{N1}$ and R$^{N2}$, a combination of R$^{N1}$ and R$^{N3}$, a combination of R$^{N1}$ and R$^{N4}$, or a combination of R$^{N3}$ and R$^{N4}$, taken together with the nitrogen atom to which each are attached, can form a heterocyclyl group.

In other embodiments, each of R$^{a5}$, R$^{a6}$, R$^{a7}$, R$^{a8}$, R$^{a9}$, R$^{a10}$, R$^{a11}$, and R$^{a12}$ is, independently, absent, a covalent bond, H, or optionally substituted alkyl, where a combination of R$^{a6}$ and R$^{a7}$, a combination of R$^{a7}$ and R$^{a8}$, a combination of R$^{a8}$ and R$^{a9}$, a combination of R$^{a9}$ and R$^{a10}$, a combination of R$^{a10}$ and R$^{a11}$, or a combination of R$^{a11}$ and R$^{a12}$, taken together with the parent atom to which each are attached, can form a heterocyclyl group or an aryl group. In yet other embodiments, each of as, u, u, as, u, and am is, independently, C, N, O, or S, in which at least one of a5, a6, a7, a8, a9, and a10 within a five-membered ring is N, O, or S and at least one of a5, a6, a7, a8, a9, and a10 within a six-membered ring is N, O, or S. In some embodiments, the cationic functionality or the cationic moiety includes or is a cationic heteroaryl group. In yet other embodiments, each of R$^{a5}$, R$^{a6}$, R$^{a7}$, R$^{a8}$, R$^{a9}$, R$^{a10}$, R$^{a11}$, and R$^{a12}$ is, independently, any functional group described herein for R$^7$, R$^{N1}$, R$^{N2}$, R$^{N3}$, or R$^{N4}$.

The cationic functionality or cationic moiety may include an amidinium derivative or a guanidium derivative. In some embodiments, the cationic functionality or the cationic moiety is selected from the group consisting of:

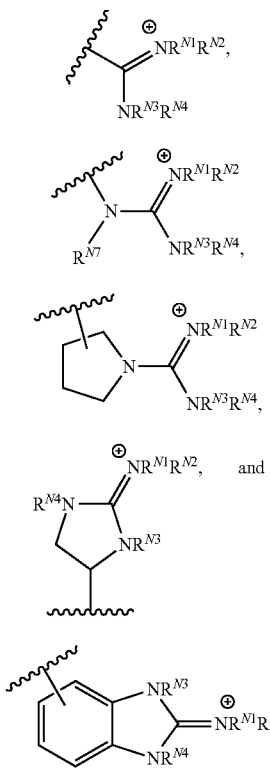

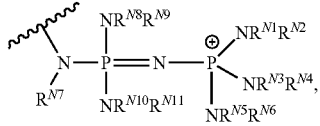

or a salt thereof (e.g., an anionic salt thereof) or a form thereof including a counter ion. In particular embodiments, each of $R^{N1}$, $R^{N2}$, $R^{N3}$, $R^{N4}$, $R^{N5}$, $R^{N6}$, $R^{N7}$, $R^{N8}$, $R^{N9}$, $R^{10}$, and $R^{N11}$ is, independently, H, halo, cyano, nitro, nitroso, azido, sulfo, carboxyaldehyde, carboxyl, hydroxyl, amino, amidino, amido, thioamido, dithiocarboxyamino, optionally substituted $C_{1-12}$ alkyl, optionally substituted $C_{3-12}$ cycloalkyl, optionally substituted $C_{1-12}$ alkanoyl, optionally substituted $C_{1-12}$ alkoxy, optionally substituted heterocyclyl, optionally substituted $C_{4-18}$ aryl, optionally substituted $C_{1-6}$ alk-$C_{4-18}$ aryl, or optionally substituted $C_{4-18}$ aryloxy, where a combination of $R^{N1}$ and $R^{N2}$, a combination of $R^{N1}$ and $R^{N3}$, a combination of $R^{N1}$ and $R^{N4}$, a combination of $R^{N3}$ and $R^{N4}$, or a combination of $R^{N5}$ and $R^{N6}$, taken together with the nitrogen atom to which each are attached, can form a heterocyclyl group.

In another instance, the cationic functionality or cationic moiety may include a sulfur-containing derivative (e.g., a sulfonium derivative or a sulfoxonium derivative). In one non-limiting instance, the cationic functionality or the cationic moiety is selected from the group consisting of:

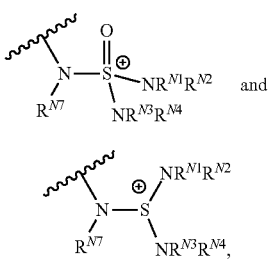

or a salt thereof (e.g., an anionic salt thereof) or a form thereof including a counter ion. In particular embodiments, each of $R^{N1}$, $R^{N2}$, $R^{N3}$, $R^{N4}$, and $R^{N7}$ is, independently, H, halo, cyano, nitro, nitroso, azido, sulfo, carboxyaldehyde, carboxyl, hydroxyl, amino, amidino, amido, thioamido, dithiocarboxyamino, optionally substituted $C_{1-12}$ alkyl, optionally substituted $C_{3-12}$ cycloalkyl, optionally substituted $C_{1-12}$ alkanoyl, optionally substituted $C_{1-12}$ alkoxy, optionally substituted heterocyclyl, optionally substituted $C_{4-18}$ aryl, optionally substituted $C_{1-6}$ alk-$C_{4-18}$ aryl, or optionally substituted $C_{4-18}$ aryloxy, where a combination of $R^{N1}$ and $R^{N2}$, a combination of $R^{N1}$ and $R^{N3}$, a combination of $R^{N1}$ and $R^{N4}$, or a combination of $R^{N3}$ and $R^{N4}$, taken together with the nitrogen atom to which each are attached, can form a heterocyclyl group.

or a salt thereof (e.g., an anionic salt thereof) or a form thereof including a counter ion. In particular embodiments, each of $R^{N1}$, $R^{N2}$, $R^{N3}$, and $R^{N4}$ is, independently, H, halo, cyano, nitro, nitroso, azido, sulfo, carboxyaldehyde, carboxyl, hydroxyl, amino, amidino, amido, thioamido, dithiocarboxyamino, optionally substituted $C_{1-12}$ alkyl, optionally substituted $C_{3-12}$ cycloalkyl, optionally substituted $C_{1-12}$ alkanoyl, optionally substituted $C_{1-12}$ alkoxy, optionally substituted heterocyclyl, optionally substituted $C_{4-18}$ aryl, optionally substituted $C_{1-6}$ alk-$C_{4-18}$ aryl, or optionally substituted $C_{4-18}$ aryloxy, where a combination of $R^{N1}$ and $R^{N2}$, a combination of $R^{N1}$ and $R^{N3}$, a combination of $R^{N1}$ and $R^{N4}$, or a combination of $R^{N3}$ and $R^{N4}$, taken together with the nitrogen atom to which each are attached, can form a heterocyclyl group.

Other atoms may be employed to support a cationic charge (e.g., other atoms such as phosphorous or sulfur). The cationic functionality or cationic moiety may include a phosphazenium derivative. In one non-limiting instance, the cationic functionality or the cationic moiety is selected from the group consisting of:

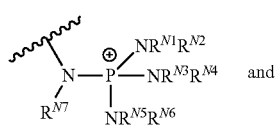

In some embodiments, the cationic moiety $R^A$ includes -$L^A$-$Ar^A$, in which $Ar^A$ is an optionally substituted aryl. In particular embodiments $L^A$ is any useful covalent bond or any useful linker (e.g., any described herein). In some embodiments, $Ar^A$ includes one or more cationic functionalities (e.g., any described herein, such as a structure including formula (ii-a) to (ii-n) or (iii-a) to (iii-n); and/or such as an ammonium derivative, a sulfonium derivative, a sulfoxonium derivative, a phosphonium derivative, or an iminium derivative) and can further be substituted with one or more substituents selected from the group of halo, cyano, optionally substituted haloalkyl, optionally substituted perfluoroalkyl, optionally substituted nitroalkyl, and optionally substituted alkyl. In some embodiments, the cationic moiety or the cationic functionality is selected from the group consisting of:

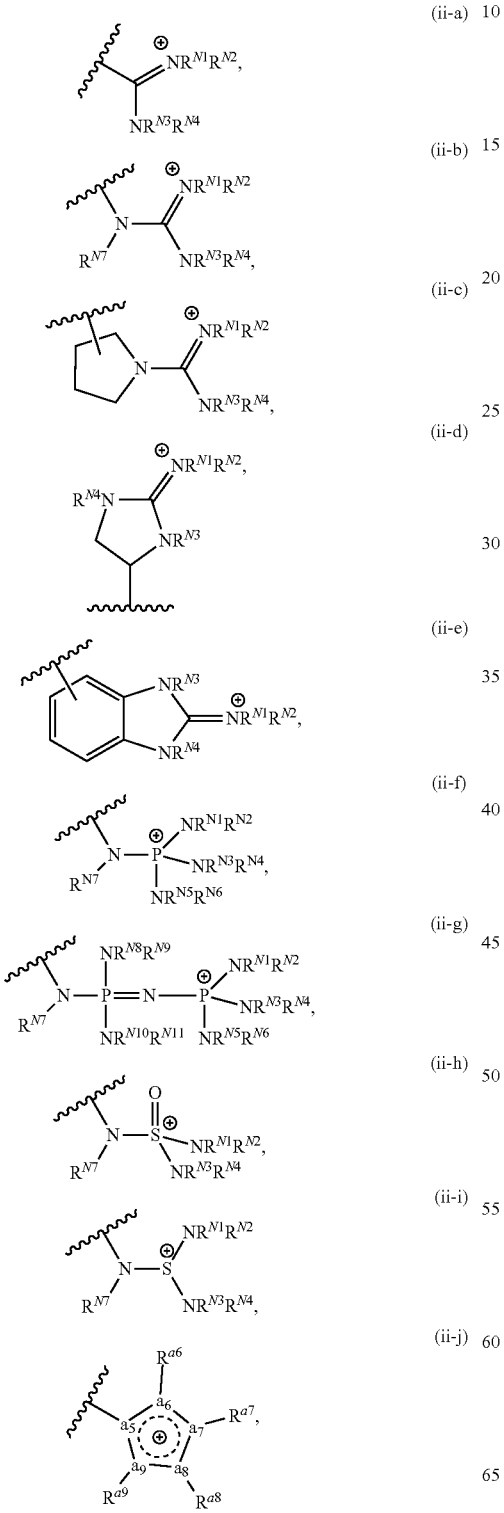

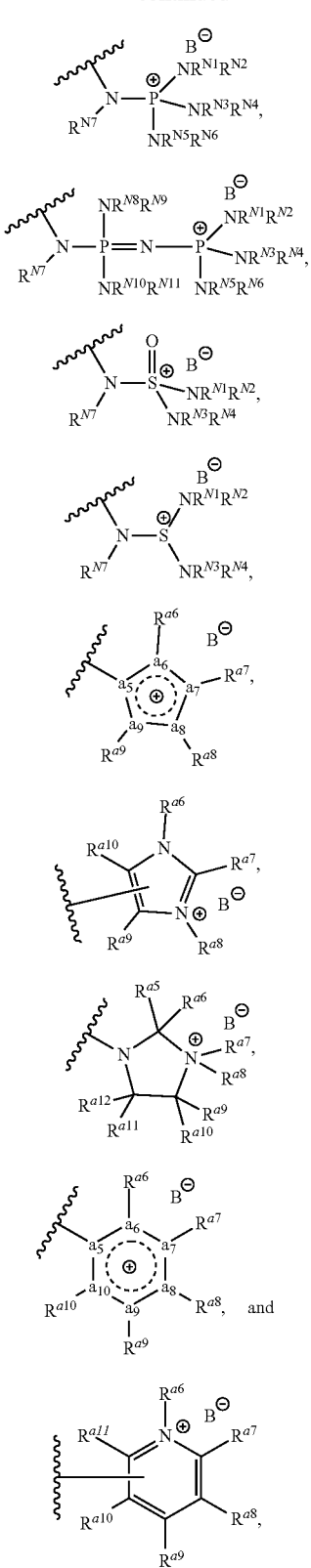

or a salt thereof or a form thereof including a counter ion; each of $R^{N1}$, $R^{N2}$, $R^{N3}$, $R^{N4}$, $R^{N5}$, $R^{N6}$, $R^{N7}$, $R^{N8}$, $R^{N9}$, $R^{N10}$, and $R^{N11}$ is, independently, H, halo, cyano, nitro, nitroso, azido, sulfo, carboxyaldehyde, carboxyl, hydroxyl, amino, amidino, amido, thioamido, dithiocarboxyamino, optionally substituted $C_{1-12}$ alkyl, optionally substituted $C_{3-12}$ cycloalkyl, optionally substituted $C_{1-12}$ alkanoyl, optionally substituted $C_{1-12}$ alkoxy, optionally substituted heterocyclyl, optionally substituted $C_{4-18}$ aryl, optionally substituted $C_{1-6}$ alk-$C_{4-18}$ aryl, or optionally substituted $C_4$-18 aryloxy, and wherein a combination of $R^{N1}$ and $R^{N2}$, a combination of $R^{N1}$ and $R^{N3}$, a combination of $R^{N1}$ and $R^{N4}$, a combination of $R^{N3}$ and $R^{N4}$, or a combination of $R^{N5}$ and $R^{N6}$, taken together with the nitrogen atom to which each are attached, can form a heterocyclyl group; each of $R^{a5}$, $R^{a6}$, $R^{a7}$, $R^{a8}$, $R^{a9}$, $R^{a10}$, $R^{a11}$, and $R^{a12}$ is, independently, absent, a covalent bond, H, or optionally substituted alkyl, wherein a combination of $R^{a6}$ and $R^{a7}$, a combination of $R^{a7}$ and $R^{a8}$, a combination of $R^{a8}$ and $R^{a9}$, a combination of $R^{a9}$ and $R^{a10}$, a combination of $R^{a10}$ and Rail, or a combination of $R^{a11}$ and $R^{a12}$, taken together with the parent atom to which each are attached, can form a heterocyclyl group or an aryl group; each of $a_5$, $a_6$, $a_7$, $a_8$, $a_9$, and $a_{10}$ is, independently, C, N, O, or S, in which at least one of $a_5$, $a_6$, $a_7$, $a_8$, and $a_9$ within a five-membered ring is N, O, or S and at least one of $a_5$, $a_6$, $a_7$, $a_8$, $a_9$, and $a_{10}$ within a six-membered ring is N, O, or S; and each B is, independently, an anionic moiety.

Additional cationic moieties and cationic functionalities are described in Kim D S et al., "Resonance stabilized perfluorinated ionomers for alkaline membrane fuel cells," Macromolecules 2013; 46(19):7826-33; as well as U.S. Pat. Nos. 7,582,683, 7,846,980, 8,227,147, 8,492,049, 8,530,109, 9,048,480, and 9,051,431, and U.S. Pat. Pub. No. 2012/0225371, each of which is incorporated herein by reference in its entirety.

Figure 5A:
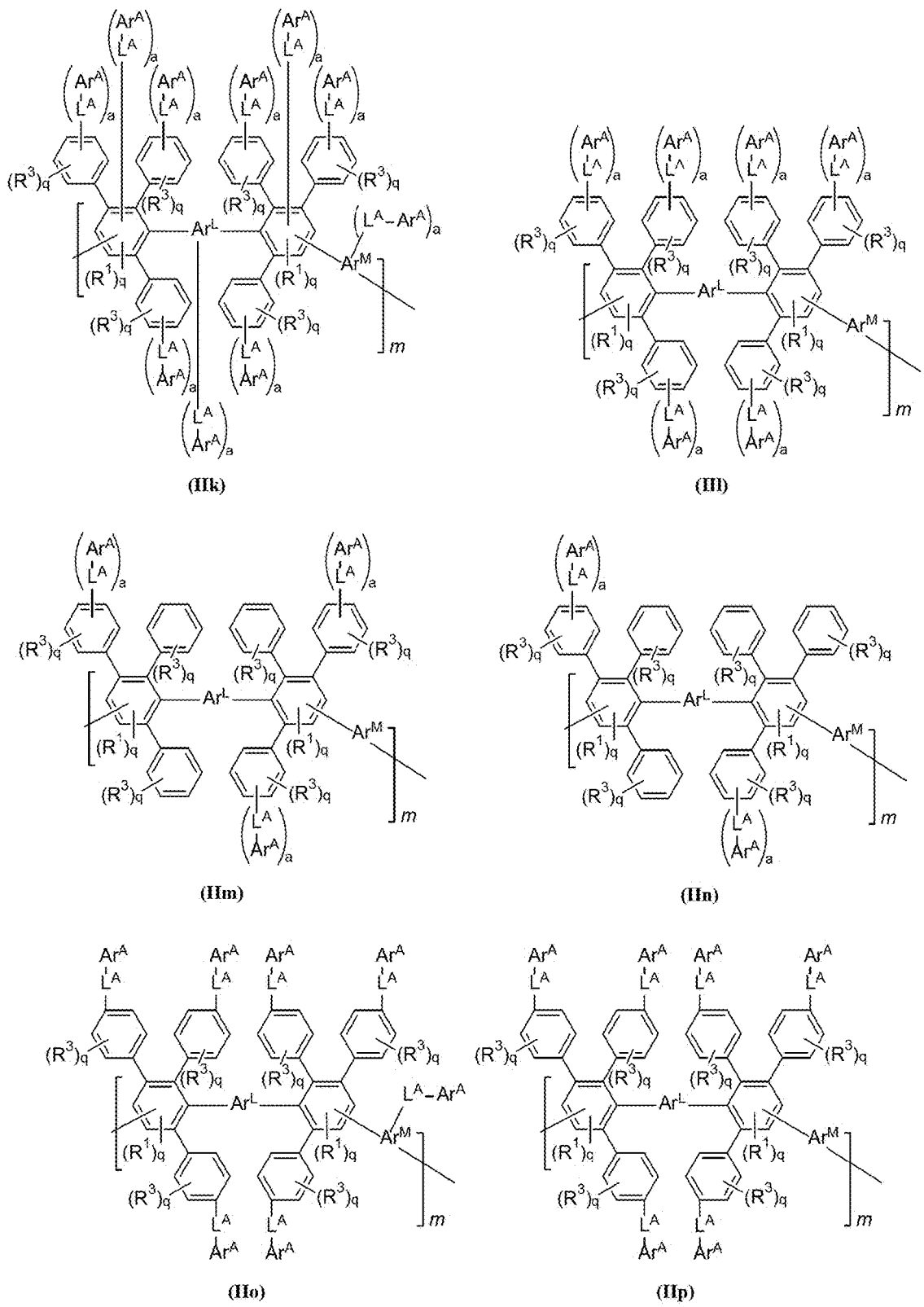
FIG. 5A-5B shows schematics of exemplary polymer structures having one or more cationic moieties ($R^4$), which in turn includes an aryl group $Ar^4$. Provided are exemplary polymer structures (A) having formulas (IIk) to (IIp) that include a linker ($L^4$) and an aryl group ($Ar^4$) having one or more cationic functionalities, in which a is an integer; and (B) having formulas (IIq) and (IIr) that include a phenyl group, one more cationic functionalities ($R^{41}$), and a linker ($L^{41}$) connecting $R^{41}$ to the parent phenyl group, in which each of a and a1 is, independently, an integer.

FIG. 5A provides exemplary polymers having a structure that includes an $R^4$ substituent that is $-L^A-Ar^4$. As can be seen, the polymer can include one or more a number of $R^4$ that is $-L^A-Ar^4$. In some embodiments, the $Ar^4$ aryl-containing $R^4$ substituent is installed on each aryl group of the polymer (e.g., as in a structure having formula (IIk)). In other embodiments, the $Ar^4$ aryl-containing $R^4$ substituent is installed on each pendent aryl group of the polymer (e.g., as in a structure having formula (III)). In yet other embodiments, the $Ar^4$ aryl-containing $R^4$ substituent is installed on three pendent aryl groups of the polymer (e.g., as in a structure having formula (IIm)) In other embodiments, the $Ar^4$ aryl-containing $R^4$ substituent is installed on two pendent aryl groups of the polymer (e.g., as in a structure having formula (IIn)).

The $R^4$ substituent can be installed at any position on the pendent aryl groups or the connecting aryl group. In some embodiments, the $Ar^4$ aryl-containing $R^4$ substituent is installed para to the parent pendent aryl group. As seen in the structure having formula (IIo) and (IIp), the polymer includes $-L^A-Ar^4$ substituents that are installed para to the other bond that attaches the pendent aryl group (substituted with $R^3$ substituents) or the connecting group $Ar^M$ to the backbone aryl group (substituted with $R^1$ substituents).

Figure 5B:
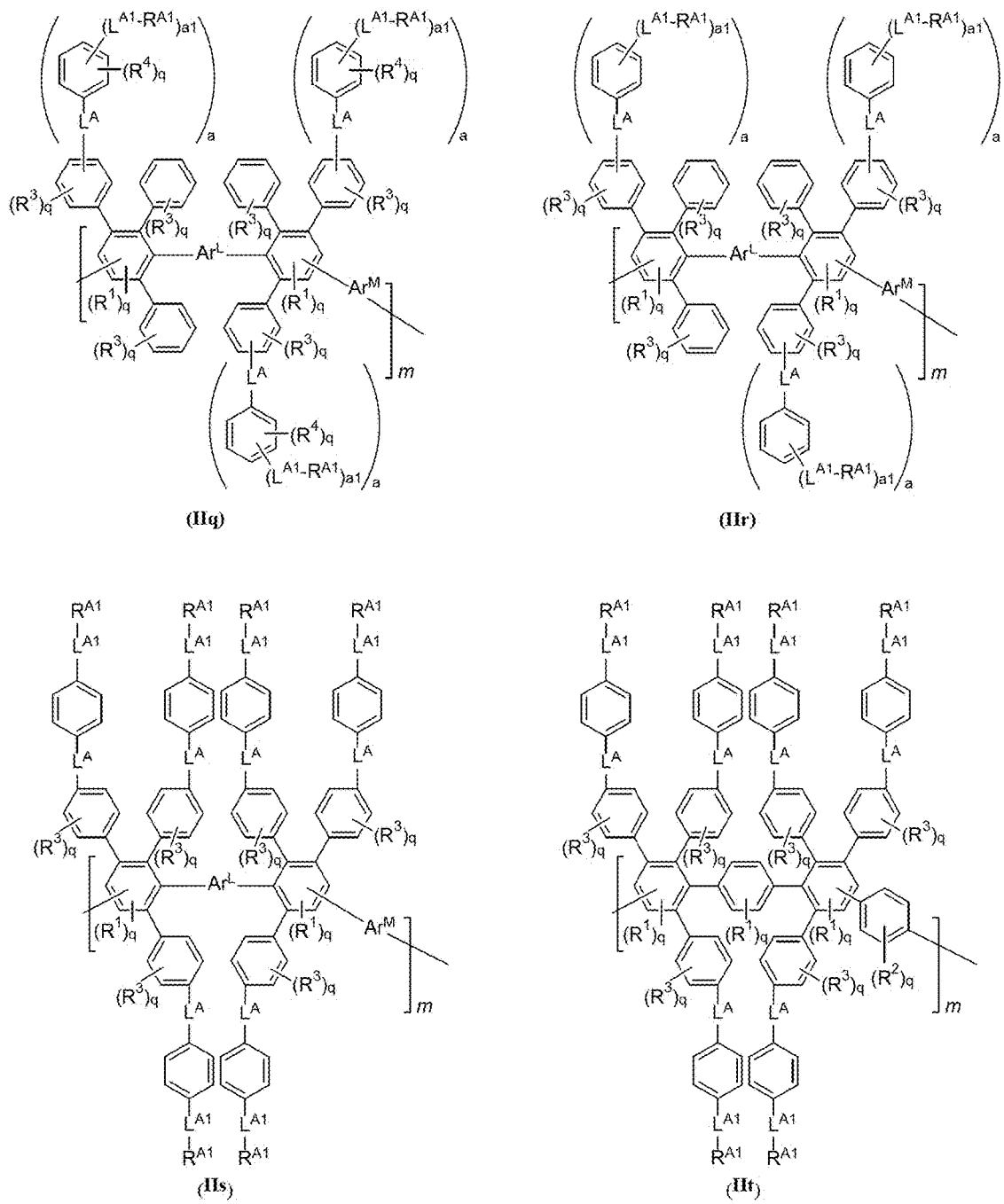

In some embodiments, the $Ar^4$ aryl-containing $R^4$ substituent is $-L^A-Ar^4$, in which $Ar^4$ is a phenyl group substituted with any number a1 of $-L^{A1}-R^{A1}$ substituents. Furthermore, any number a of such $R^4$ substituents can be installed on each aryl group. $R^{41}$ can be any useful substituent including a cationic charge, such as a cationic functionality (e.g., any described herein, such as a structure including formula (ii-a) to (ii-n) or (iii-a) to (iii-n); and/or such as an ammonium derivative, a sulfonium derivative, a sulfoxonium derivative, a phosphonium derivative, or an iminium derivative). As seen in FIG. 5B, in other embodiments, the $R^{41}$ substituent is installed on three pendent aryl groups of the polymer (e.g., as in a structure having formula (IIq) with further $R^4$ substituents on the $Ar^4$ group, or as in a structure having formula (IIr) lacking $R^4$ substituents).

In other embodiments, the $R^{41}$ substituent is installed on each pendent aryl group. As seen FIG. 5B, the $L^A$ linkage connects the pendent aryl group to the $Ar^4$ group in a para manner on all six pendent aryl groups of the polymer, and the $L^{41}$ linker connects the $R^{41}$ substituents to the $Ar^4$ group in a para manner (e.g., as in a structure having formula (IIs) or formula (IIt)).

A precursor cationic moiety includes a non-ionized version of any cationic moiety. Likewise, a precursor cationic functionality includes a non-ionized version of any cationic functionality described herein. For instance, if the cationic moiety or the cationic functionality includes a guanidinium derivative (including a quaternary amino), then the counterpart precursor cationic moiety or functionality includes a guanidine derivative (including a non-ionized, non-charged tertiary amino). Similarly, a skilled artisan would understand how to arrive at non-ionized, non-charged counterparts from any cationic moiety or cationic functionality described herein.

Exemplary precursor cationic moieties and precursor cationic functionalities include a heterocyclyl (e.g., any described herein); an amino derivative, e.g., any amino derivative that can be functionalized to carry a charge, thereby providing an ammonium derivative (e.g., such as by reacting the amino derivative with an alkylating reagent $R^7$—$X^R$ or $R^{N3}$—$X^L$ or $R^{N2}$—$X^L$, in which $R^7$, $R^{N2}$, $R^{N3}$, $X^R$, and $X^L$ are any described herein), where exemplary amino derivatives include —$NR^{N1}R^{N2}$ or =$NR^{N1}$ or >$NR^{N1}$ or =N— or >N— or ≡N, where each of $R^{N1}$ and $R^{N2}$ is, independently, H, optionally substituted alkyl, optionally substituted alkaryl, or optionally substituted aryl, or where a combination of $R^{N1}$ and $R^{N2}$, taken together with the nitrogen atom to which each are attached, form a heterocyclyl group, as defined herein; a thioether derivative, e.g., any thioether derivative that can be functionalized to carry a charge, thereby providing a sulfonium derivative (e.g., such as by reacting the thioether derivative with an alkylating reagent $R^7$—$X^R$ or $R^{S2}$—$X^L$, in which $R^7$, $R^{S2}$, $X^R$, and $X^L$ are any described herein), where exemplary thioether derivatives include —$SR^{S1}$, where $R^{S1}$ is H, optionally substituted alkyl, optionally substituted alkaryl, optionally substituted aryl, or optionally substituted amino (e.g., any described herein); a sulfoxide derivative, e.g., any sulfoxide derivative that can be functionalized to carry a charge, thereby providing a sulfoxonium derivative (e.g., such as by reacting the sulfoxide derivative with an alkylating reagent $R^7$—$X^R$ or $R^{S2}$—$X^L$, in which $R^7$, $R^{S2}$, $X^R$, and $X^L$ are any described herein), where exemplary sulfoxide derivatives include —S(=O)$R^{S1}$, where $R^{S1}$ is H, optionally substituted alkyl, optionally substituted alkaryl, optionally substituted aryl, or optionally substituted amino (e.g., any described herein); a phosphine derivative, e.g., any phosphine derivative that can be functionalized to carry a charge, thereby providing a phosphonium derivative (e.g., such as by reacting the phosphine derivative with an alkylating reagent $R^7$—$X^R$ or $R^{P3}$—$X^L$, in which $R^7$, $R^{P3}$, $X^R$, and $X^L$ are any described herein), where exemplary phosphine derivatives include —$PR^{P1}R^{P2}$ or —$NR^{N1}PR^{P1}R^{P2}$, where $R^{N1}$ is H, optionally substituted alkyl, optionally substituted alkaryl, or optionally substituted aryl, and where each of $R^{P1}$ and $R^{P2}$ is, independently, H, optionally substituted alkyl, optionally substituted alkoxy, optionally substituted alkcycloalkyl, optionally substituted alkaryl, optionally substituted aryl, or optionally substituted amino (e.g., any described herein); or an imine derivative, e.g., any imine derivative that can be functionalized to carry a charge, thereby providing a iminium derivative (e.g., such as by reacting the imine derivative with an alkylating reagent $R^7$—$X^R$ or $R^{N1}$—$X^L$, in which $R^7$, $R^{N1}$, $X^R$, and $X^L$ are any described herein), where exemplary imine derivatives include —N=$CR^{C1}R^{C1}$, where each of $R^{C1}$ and $R^{C2}$ is, independently, H, optionally substituted alkyl, optionally substituted alkaryl, or optionally substituted aryl (e.g., any described herein).

Exemplary linkers $L^A$ and $L^{41}$ include a covalent bond, carbonyl (—C(O)—), oxy (—O—), thio (—S—), azo (—N=N—), phosphonoyl (—P(O)H—), phosphoryl (—P(O))<), sulfonyl (—S(O)$_2$—), sulfinyl (—S(O)—), sulfonamide (e.g., —SO$_2$—$NR^{L3}$— or —$NR^{L3}$—SO$_2$—, where $R^{L3}$ is H, optionally substituted alkyl, optionally substituted haloalkyl, optionally substituted alkoxy, optionally substituted alkaryl, optionally substituted aryl, or halo), imino (—NH—), imine (e.g., —$CR^{L1}$=N—, where $R^{L1}$ is H or optionally substituted alkyl), phosphine (e.g., —$PR^{L3}$— group, where $R^{L3}$ is H or optionally substituted alkyl), nitrilo (e.g., —$NR^{L3}$—, where $R^{L3}$ is H, optionally substituted alkyl, optionally substituted haloalkyl, optionally substituted alkoxy, optionally substituted alkaryl, optionally substituted aryl, or halo), optionally substituted $C_{1-12}$ alkylene (e.g., —(C$R^{L1}R^{L2}$)$_{La}$—, where each of $R^{L1}$ and $R^{L2}$ is, independently, H, optionally substituted alkyl, optionally substituted haloalkyl, optionally substituted alkoxy, optionally substituted alkaryl, optionally substituted aryl, or halo), optionally substituted $C_{1-12}$ alkyleneoxy, optionally substituted $C_{1-12}$ heteroalkylene (e.g., —C(O)$NR^{L3}$—, —$NR^{L3}$C(O)—, —(C$R^{L1}R^{L2}$)$_{La}$—C(O)—(C$R^{L1}R^{L2}$)$_{Lb}$—, —(C$R^{L1}R^{L2}$)$_{La}$—SO$_2$—(C$R^{L1}R^{L2}$)$_{Lb}$—, —(C$R^{L1}R^{L2}$)$_{La}$—C(O)$NR^{L3}$—(C$R^{L1}R^{L2}$)$_{Lb}$—, —(C$R^{L1}R^{L2}$)$_{La}$—$NR^{L3}$C(O)—(C$R^{L1}R^{L2}$)$_{Lb}$—, —(C$R^{L1}R^{L2}$)$_{La}$—SO$_2$$NR^{L3}$—(C$R^{L1}R^{L2}$)$_{Lb}$—, or —(C$R^{L1}R^{L2}$)$_{La}$—$NR^{L3}$SO$_2$—(C$R^{L1}R^{L2}$)$_{Lb}$—, where each of $R^{L1}$, $R^{L2}$, and $R^{L3}$ is, independently, H, halo, optionally substituted $C_{1-12}$ alkyl, optionally substituted $C_{1-12}$ haloalkyl, optionally substituted $C_{1-12}$ alkoxy, optionally substituted $C_{4-18}$ aryl, or optionally substituted $C_{1-6}$ alk-$C_{4-18}$ aryl; and where each of La and Lb is, independently, an integer of from 0 to 10, wherein at least one of La or Lb is not 0), optionally substituted $C_{1-12}$ heteroalkyleneoxy, optionally substituted $C_{4-18}$ arylene, or optionally substituted $C_{4-18}$ aryleneoxy.

Further exemplary cationic moieties $R^A$ include —C(O)—$Ar^4$, in which $Ar^4$ is an optionally substituted aryl (e.g., a phenyl group substituted with one or more $R^4$ substituents and optionally substituted with additional substituents selected from the group of halo, haloalkyl, nitro, nitroso, alkoxy, etc.). In another instance, $R^4$ includes —C(O)-Ph, in which Ph is substituted with a1 number of $R^{41}$, where a1 is an integer of from 1 to 5), and where $R^{41}$ is selected from any cationic functionality (e.g., any described herein, such as a structure including formula (ii-a) to (ii-n) or (iii-a) to (iii-n); and/or such as an ammonium derivative, a sulfonium derivative, a sulfoxonium derivative, a phosphonium derivative, or an iminium derivative).

Figure 6A:
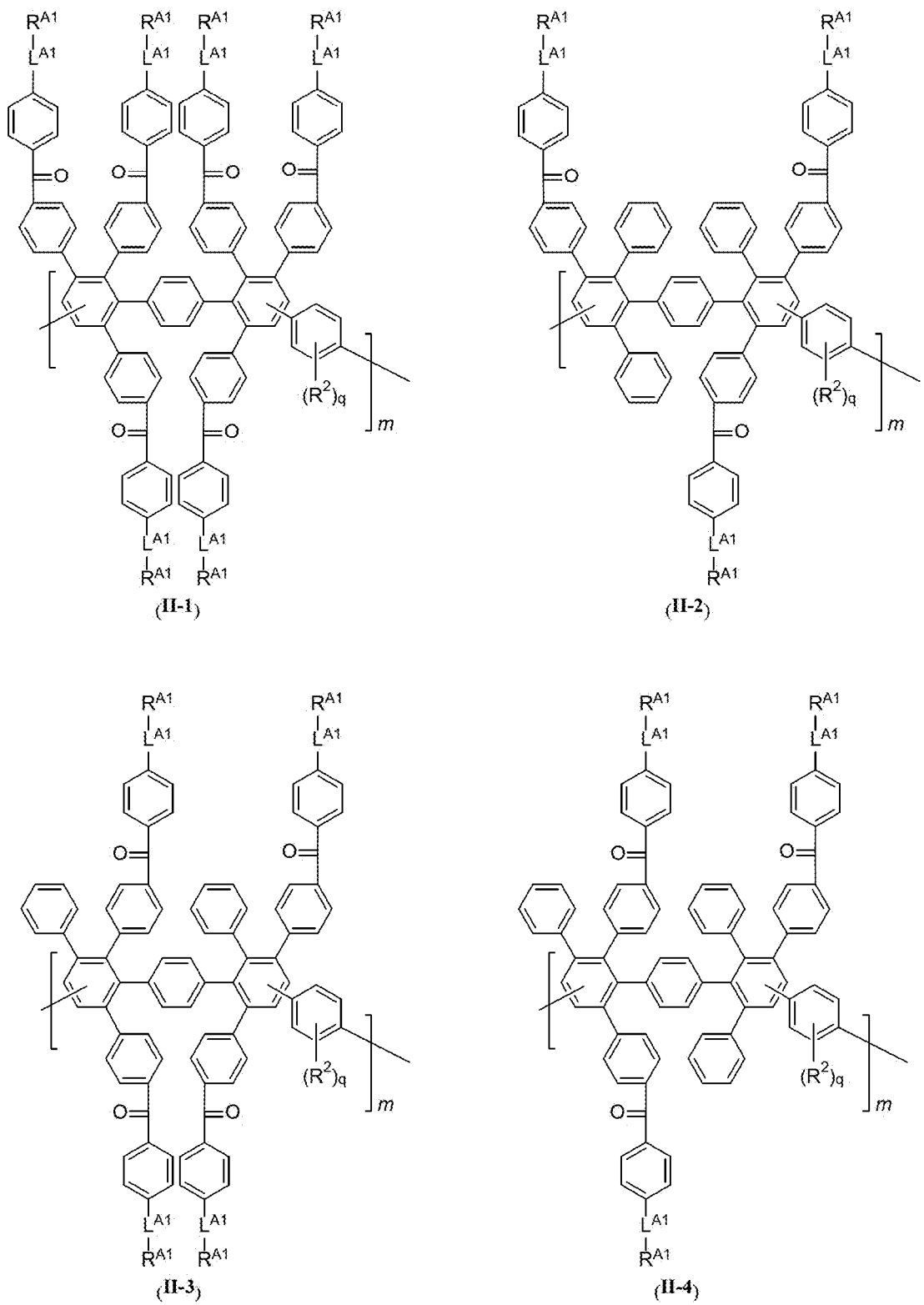
FIG. 6A-6B shows schematics of further exemplary polymer structures including one or more cationic functionalities ($R^{41}$) and a linker ($L^{41}$), in which a1 is an integer. Provided are exemplary polymer structure (A) having formulas (II-1) to (II-4) and (B) having formulas (II-5) to (II-10).

FIG. 6A shows an exemplary cationic moiety $R^4$, in which $R^{41}$ is located in the para position in relation to the —C(O)— linker of $R^4$. As can be seen, any number of aryl groups in the underlying DAPP can be substituted. For instance, in the polymer of structure (II-1), each pendent aryl group includes a $R^4$ substituent of C(O)-(p-$L^{41}$-$R^{41}$)-Ph. In another instance, only the backbone aryl groups are substituted (e.g., with one or more $R^4$, such as any herein). In yet another instance, the connecting group $Ar^M$ is substituted (e.g., with one or more $R^A$, such as any herein). Optionally, the connecting group $Ar^M$ can include a label (e.g., halo).

Any useful number of aryl groups in the polymer can include $R^A$. For instance, as seen in FIG. 6A, the polymer of structure (II-2) or (II-4) includes three pendent aryl groups, in which each of these pendent groups includes a $R^A$ substituent of —C(O)-(p-$L^{A1}$-$R^{A1}$)-Ph. In another instance, the polymer of structure (II-3) includes four pendent aryl groups, in which each of these pendent groups includes a $R^A$ substituent of —C(O)-(p-$L^{A1}$-$R^{A1}$)-Ph. In some instances, each pendent aryl group is substituted. In other instances, only 2, 3, 4, or 5 of the pendent groups are substituted.

Figure 6B:
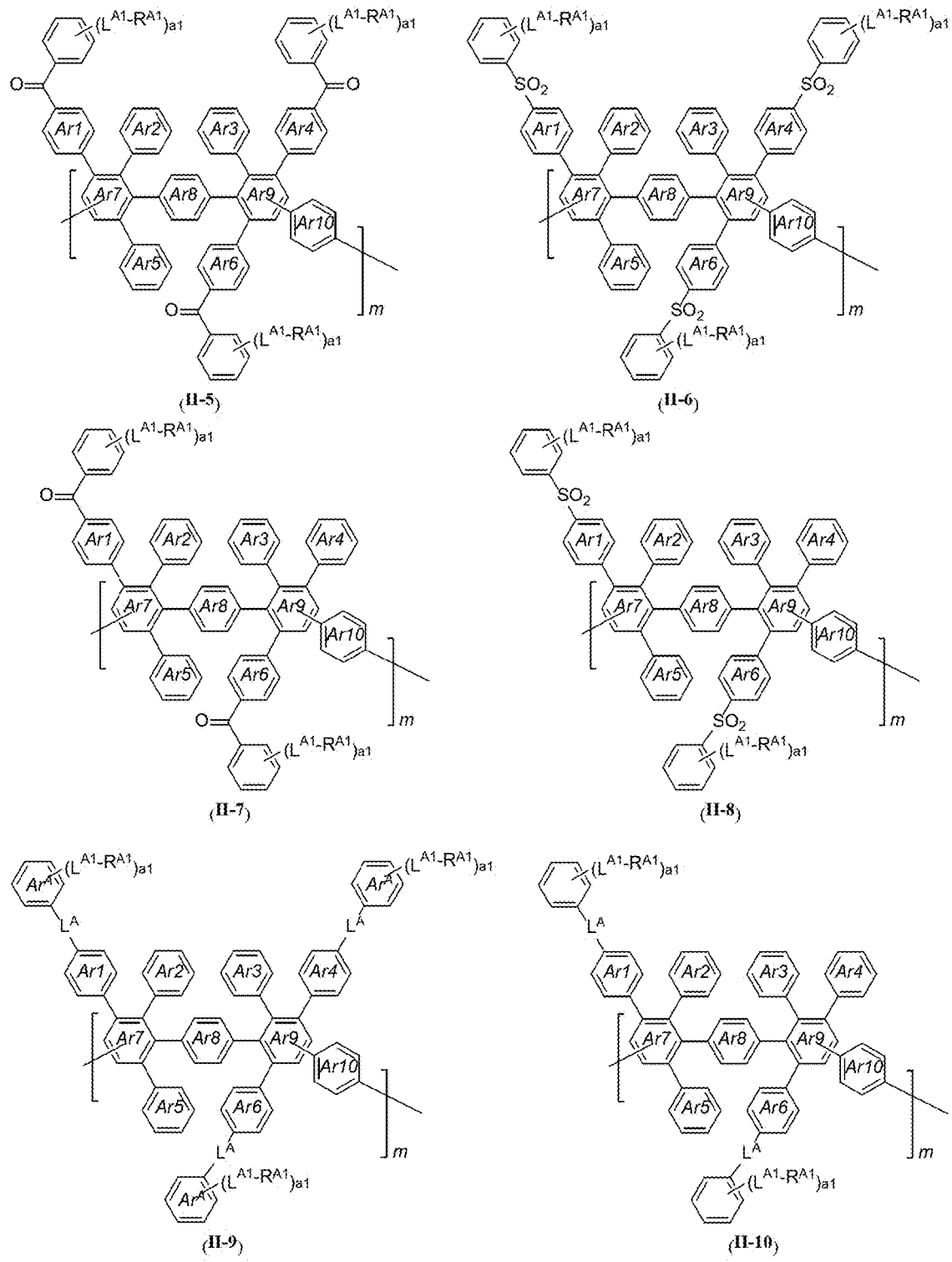

The polymer structure can include any useful combination of linkers $L^A$ and $R^{A1}$ substitutions. In one instance, the linker $L^A$ includes —C(O)—. For instance, as seen in FIG. 6B, the polymer of structure (II-5) or (II-7) includes $R^A$ substituents including a —C(O)— linker. In another instance, the linker $L^A$ includes —$SO_2$—. For instance, as seen in FIG. 6B, the polymer of structure (II-6) or (II-8) includes three $R^A$ substituents including a —$SO_2$— linker. As further seen, the polymer can include any number of $R^A$ substituents located on a pendent aryl group (e.g., Ar1 to Ar6) in formula (II-9)), a backbone aryl group (e.g., on a pendent aryl group (e.g., Ar7 to Ar9) in formula (II-9)), or a connecting group (e.g., Ar10 in formula (II-9)). In some instance, the polymer includes a structure having formula (II-9) or (II-10), in which linker $L^A$ connects the underlying $Ar^A$ aryl group at a para position to the pendent aryl group (e.g., Ar1).

Any useful number and type of $R^A$, $R^1$, and/or $R^3$ substituents can be present on a particular polymer structure. In one instance, the number q of $R^1$ or $R^3$ substituent(s) is of from 1 to 5 for each aryl group (e.g., from 1 to 4, 1 to 3, 1 to 2, 2 to 5, 2 to 4, or 2 to 3). In another instance, the number a of $R^A$ substituent(s) is of from 1 to 5 for each aryl group (e.g., from 1 to 4, 1 to 3, 1 to 2, 2 to 5, 2 to 4, or 2 to 3). In yet another instance, the number a1 of $R^{A1}$ substituent(s) is of from 1 to 5 for each aryl group (e.g., from 1 to 4, 1 to 3, 1 to 2, 2 to 5, 2 to 4, or 2 to 3).

Other Functional Moieties

The present invention includes the use of other functional moieties, such as reactive handles (e.g., $R^H$), acidic moieties (e.g., $R^S$, $R^P$, or $R^C$), electron-withdrawing moieties (e.g., $R^F$), and functional groups. Any number of these functional moieties can be present on the polymer (e.g., the polymer backbone aryl groups and/or pendent aryl groups).

Exemplary reactive handles (e.g., $R^H$) include any useful group, such as H, halo, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, optionally substituted aryl, optionally substituted alkaryl, optionally substituted arylalkoxy, optionally substituted aryloxy, optionally substituted aryloxycarbonyl, optionally substituted aryloyl, optionally substituted arylcarbonylalkyl, optionally substituted arylsulfonyl, and optionally substituted arylsulfonylalkyl. In one instance, at least one $R^H$ includes an optionally substituted aryl group (e.g., an optionally substituted aryl group including a halo, a haloalkyl, a perfluoroalkyl, a hydroxyl, or an alkoxy group).

In some embodiments, the reactive handle $R^H$ includes -$L^H$-$Ar^H$ or -$L^H$-$Ak^H$, in which $Ar^H$ is an optionally substituted aryl and in which $Ak^H$ is an optionally substituted alkyl or optionally substituted heteroalkyl. In particular embodiments $L^H$ is any useful covalent bond or any useful linker (e.g., any described herein). In some embodiments, $Ar^H$ or $Ak^H$ is substituted with one or more substituents selected from the group of halo, cyano, optionally substituted haloalkyl, optionally substituted perfluoroalkyl, optionally substituted nitroalkyl, and optionally substituted alkyl.

In some embodiments, the $Ar^H$ aryl-containing $R^H$ substituent is -$L^{H-1}$-$Ar^H$, in which $Ar^H$ is an $R^{H1}$-substituted phenyl group. Furthermore, any number h of such $R^H$ substituents can be installed on each aryl group. $R^{H1}$ can be any useful substituent, such as amino, amido, azido, nitro, nitroso, halo, as well as any described for an aryl group (e.g., substituents (1)-(47) as defined herein for aryl). In other embodiments, the $Ar^H$ aryl-containing $R^H$ substituent is -$L^H$-$Ar^H$, in which $L^H$ is a sulfonyl group and in which $Ar^H$ is a halo-substituted phenyl group (e.g., pentafluorophenyl, tetrafluorophenyl, trifluorophenyl, difluorophenyl, or monofluorophenyl).

In yet other embodiments, the $Ar^H$ aryl-containing $R^H$ substituent is -$L^H$-$Ar^H$, in which $L^H$ is a carbonyl group and in which $Ar^H$ is a halo-substituted phenyl group (e.g., pentafluorophenyl, tetrafluorophenyl, trifluorophenyl, difluorophenyl, or monofluorophenyl In some embodiments, the $Ak^H$ alkyl-containing $R^H$ substituent is -$L^H$-$Ak^H$, in which $Ak^H$ is an $R^{H1}$-substituted $C_1$-alkyl group. Furthermore, any number h of such $R^H$ substituents can be installed on each aryl group, and any number h1 of —$CR^{H1}R^{H1}$ groups can be present within the $R^H$ substituent, in which each $R^{H1}$ can be the same or different. $R^{H1}$ can be any useful substituent, such as amino, amido, azido, nitro, nitroso, halo, as well as any described for an aryl group (e.g., substituents (1)-(27) as defined herein for alkyl).

In other embodiments, the $Ak^H$ alkyl-containing $R^H$ substituent is -$L^H$-$Ak^H$, in which $L^H$ is a carbonyl group and in which $Ak^H$ is a halo-substituted alkyl group (e.g., perfluoroalkyl, —$(CF_2)_{h1}$F, —$(CH_2)_{h1}$F, or —$(CHF)_{h1}$F, in which h1 is an integer of from about 1 to about 24).

Exemplary linkers $L^H$ include a covalent bond, carbonyl (—C(O)—), oxy (—O—), thio (—S—), azo (—N=N—), phosphonoyl (—P(O)H—), phosphoryl (—P(O))<), sulfonyl (—$S(O)_2$—), sulfinyl (—S(O)—), sulfonamide (e.g., —$SO_2$—$NR^{L3}$— or —$NR^{L3}$—$SO_2$—, where $R^{L3}$ is H, optionally substituted alkyl, optionally substituted haloalkyl, optionally substituted alkoxy, optionally substituted alkaryl, optionally substituted aryl, or halo), imino (—NH—), imine (e.g., —$CR^{L1}$=N—, where $R^{L1}$ is H or optionally substituted alkyl), phosphine (e.g., —$PR^{L3}$— group, where $R^{L3}$ is H or optionally substituted alkyl), nitrilo (e.g., —$NR^{L3}$—, where $R^{L3}$ is H, optionally substituted alkyl, optionally substituted haloalkyl, optionally substituted alkoxy, optionally substituted alkaryl, optionally substituted aryl, or halo), optionally substituted $C_{1-12}$ alkylene (e.g. —$(CR^{L1}R^{L2})_{La}$—, where each of $R^{L1}$ and $R^{L2}$ is, independently, H, optionally substituted alkyl, optionally substituted haloalkyl, optionally substituted alkoxy, optionally substituted alkaryl, optionally substituted aryl, or halo), optionally substituted $C_{1-12}$ alkyleneoxy, optionally substituted $C_{1-12}$ heteroalkylene (e.g., —C(O)$NR^{L3}$—, —$NR^{L3}$C(O)—, —$(CR^{L1}R^{L2})_{La}$—C(O)—$(CR^{L1}R^{L2})_{Lb}$—, —$(CR^{L1}R^{L2})_{La}$—$SO_2$—$(CR^{L1}R^{L2})_{Lb}$—, —$(CR^{L1}R^{L2})_{La}$—C(O)$NR^{L3}$—$(CR^{L1}R^{L2})_{Lb}$—, —$(CR^{L1}R^{L2})_{La}$—$NR^{L3}$C(O)—$(CR^{L1}R^{L2})_{Lb}$—, —$(CR^{L1}R^{L2})_{La}$—$SO_2NR^{L3}$—$(CR^{L1}R^{L2})_{Lb}$—, or —$(CR^{L1}R^{L2})_{La}$—$NR^{L3}SO_2$—$(CR^{L1}R^{L2})_{Lb}$—, where each of $R^{L1}$, $R^{L2}$, and $R^{L3}$ is, independently, H, halo, optionally substituted $C_{1-12}$ alkyl, optionally substituted $C_{1-12}$ haloalkyl, optionally substituted $C_{1-12}$ alkoxy, optionally substituted $C_{4-18}$ aryl, or optionally substituted $C_{1-6}$ alk-$C_{4-18}$ aryl; and where each of La and Lb is, independently, an integer of from 0 to 10, wherein at least one of La or Lb is not 0), optionally substituted $C_{1-12}$ heteroalkyleneoxy, optionally substituted $C_{4-18}$ arylene, or optionally substituted $C_{4-18}$ aryleneoxy.

Further exemplary reactive handles $R^H$ include —C(O)—$Ar^H$, in which $Ar^H$ is an optionally substituted aryl (e.g., optionally substituted phenyl with one or more optional substituents selected from the group of halo, haloalkyl, nitro, nitroso, alkoxy, etc.). In another instance, $R^H$ includes —C(O)-Ph, in which Ph is substituted with h1 number of $R^{H1}$, where $R^{H1}$ is selected from the group of halo, haloalkyl, nitro, nitroso, alkoxy, etc., and where h1 is an integer of from 1 to 5).

Any useful number of aryl groups in the polymer can include $R^H$. In some instances, each pendent aryl group is substituted. In other instances, only some of the pendent groups are substituted. In one instance, the number h of $R^H$ substituent(s) is of from 0 to 5 for each aryl group (e.g., from 0 to 4, 0 to 3, 0 to 2, 0 to 1, 1 to 5, 1 to 4, 1 to 3, 1 to 2, 2 to 5, 2 to 4, or 2 to 3). In some embodiments, each aryl group includes one or more $R^H$. In other embodiments, one aryl group includes one or more $R^H$. In other embodiments, each pendent aryl group includes one or more $R^H$. In yet other embodiments, one to three pendent aryl groups includes one or more $R^H$. In other embodiments, each backbone aryl group or $Ar^L$ aryl group includes one or more $R^H$. In some embodiments, one backbone aryl group includes one or more $R^H$. In particular embodiments, each h for each aryl group is the same or different.

In another instance, each backbone aryl group or $Ar^L$ aryl group includes one or more $R^1$. In particular embodiments, each q for each aryl group is the same or different. In yet another instance, the number q of $R^3$ substituent(s) is of from 1 to 5 for each aryl group (e.g., from 1 to 4, 1 to 3, 1 to 2, 2 to 5, 2 to 4, or 2 to 3). In some embodiments, each pendent aryl group includes one or more $R^3$.

Other exemplary reactive handles $R^H$ include —SO$_2$—$Ar^H$, in which $Ar^H$ is an optionally substituted aryl (e.g., optionally substituted phenyl with one or more optional substituents selected from the group of halo, haloalkyl, nitro, nitroso, alkoxy, etc.). In another instance, $R^H$ includes SO$_2$-Ph, in which Ph is substituted with h1 number of $R^{H1}$, where $R^{H1}$ is selected from the group of halo, haloalkyl, nitro, nitroso, alkoxy, etc., and where h1 is an integer of from 1 to 5).

Exemplary acidic moieties (e.g., $R^S$) include any group having one or more sulfonyl groups, such as sulfo (e.g., —SO$_2$—OH), alkylsulfonyl (e.g., —SO$_2$—$R^{S1}$, where $R^{S1}$ is optionally substituted $C_{1-12}$ alkyl), alkylsulfonylalkyl (e.g., $R^{SA}$—SO$_2$—$R^{S1}$, where each of $R^{SA}$ is optionally substituted $C_{1-12}$ alkylene or optionally substituted heteroalkylene and $R^{S1}$ is optionally substituted $C_{1-12}$ alkyl), arylsulfonyl (e.g., —SO$_2$—$R^{Ar}$, where $R^{Ar}$ is optionally substituted $C_{4-18}$ aryl), arylsulfonylalkyl (e.g., —$R^{SA}$—SO$_2$—$R^{Ar}$, where $R^{SA}$ is independently, optionally substituted $C_{1-12}$ alkyl or alkylene and $R^{Ar}$ is optionally substituted $C_{4-18}$ aryl), sulfonamoyl (e.g., —SO$_2$NR$^{N1}$R$^{N2}$), sulfoamino (e.g., —N(R$^{N1}$)—SO$_2$—R$^{S3}$), aminosulfonyl (e.g., —SO$_2$—NR$^{N1}$—R$^{S2}$), or sulfonyl imide (e.g., —SO$_2$—NR$^{N1}$—SO$_2$—R$^{S3}$), where each of R$^{N1}$ and R$^{N2}$ is, independently, H, optionally substituted $C_{1-12}$ alkyl (e.g., haloalkyl, such as perfluoroalkyl), optionally substituted $C_{4-18}$ aryl, or optionally substituted $C_{1-12}$ alk-$C_{4-18}$ aryl; R$^{S2}$ is H, hydroxyl, optionally substituted $C_{1-12}$ alkyl (e.g., haloalkyl, such as perfluoroalkyl), optionally substituted $C_{1-12}$ alkylsulfonyl, optionally substituted $C_{4-18}$ aryl, or optionally substituted $C_{1-12}$ alk-$C_{4-18}$ aryl; and R$^{S3}$ is H, hydroxyl, optionally substituted $C_{1-12}$ alkyl (e.g., haloalkyl, such as perfluoroalkyl), optionally substituted $C_{4-18}$ aryl, or optionally substituted $C_{1-12}$ alk-$C_{4-18}$ aryl.

In any of these moieties, each R$^{S1}$ and R$^{S3}$ is, independently, H, hydroxyl, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl, or optionally substituted $C_{4-18}$ aryloxy; each R$^{S2}$ is independently, H, hydroxyl, optionally substituted $C_{1-12}$ alkyl (e.g., haloalkyl, such as perfluoroalkyl), optionally substituted $C_{1-12}$ alkylsulfonyl, optionally substituted $C_{1-12}$ alkoxy, optionally substituted $C_{4-18}$ aryl, optionally substituted $C_{1-12}$ alk-$C_{4-18}$ aryl, or optionally substituted $C_{4-18}$ aryloxy; each R$^{Ar}$ is, independently, optionally substituted $C_{4-18}$ aryl, optionally substituted $C_{1-12}$ alk-$C_{4-18}$ aryl, or optionally substituted $C_{4-18}$ aryloxy; each of R$^{SA}$ is, independently, oxy, optionally substituted $C_{1-12}$ alkylene, or optionally substituted heteroalkylene; and each of R$^{N1}$ and R$^{N2}$ is, independently, H, optionally substituted $C_{1-12}$ alkyl (e.g., haloalkyl, such as perfluoroalkyl), optionally substituted $C_{4-18}$ aryl, or optionally substituted $C_{1-12}$ alk-$C_{4-18}$ aryl.

Other exemplary acidic moieties (e.g., R$^P$) include any group having one or more phosphoryl groups, such as phosphono (e.g., —P(O))(OH)$_2$), phosphoric ester (e.g., —O—PO(OH)$_2$ or —O—P(O))<R$^{P1}$R$^{P2}$ or —O—P(O))<R$^{Ar}$R$^{P2}$ or —O—P(O))<R$^{Ar}$R$^{Ar}$ where each R$^{Ar}$ is the same or different), alkylphosphoryl (e.g., —P(O))<R$^{P1}$R$^{P2}$, where R$^{P1}$ is H, hydroxyl, optionally substituted $C_{1-12}$ alkyl or optionally substituted $C_{1-12}$ alkoxy; and R$^{P2}$ is H, hydroxyl, optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, or optionally substituted $C_{4-18}$ aryloxy), substituted phosphonoyl (e.g., —P(O))HR$^{P1}$, where R$^{P1}$ is H, hydroxyl, optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, or optionally substituted $C_{4-18}$ aryloxy), alkylphosphorylalkyl (e.g., —R$^{PA}$—P(O))<R$^{P1}$R$^{P2}$, where R$^{PA}$ is optionally substituted $C_{1-12}$ alkylene or optionally substituted heteroalkylene; and each of R$^{P1}$ and R$^{P2}$ is, independently, H, hydroxyl, optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, or optionally substituted $C_{4-18}$ aryloxy), arylphosphoryl (e.g., —P(O))<R$^{Ar}$R$^{P2}$ or —P(O))<R$^{Ar}$R$^{Ar}$, where each R$^{Ar}$ is, independently, H, hydroxyl, optionally substituted $C_{4-18}$ aryl, optionally substituted $C_{1-12}$ alk-$C_{4-18}$ aryl, or optionally substituted $C_{4-18}$ aryloxy; and R$^{P2}$ is optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, or optionally substituted $C_{4-18}$ aryloxy), or arylphosphorylalkyl (e.g., —R$^{PA}$—P(O))<R$^{Ar}$R$^{P2}$ or —R$^{PA}$—P(O))<R$^{Ar}$R$^{Ar}$, where R$^{PA}$ is, independently, optionally substituted $C_{1-12}$ alkylene or optionally substituted heteroalkylene; each R$^{Ar}$ is, independently, optionally substituted $C_{4-18}$ aryl, optionally substituted $C_{1-12}$ alk-$C_{4-18}$ aryl, or optionally substituted $C_{4-18}$ aryloxy; and R$^{P2}$ is H, hydroxyl, optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, or optionally substituted $C_{4-18}$ aryloxy), where each of these groups can be optionally substituted (e.g., with one or more substituents described for alkyl, as defined herein).

In any of these moieties, each of R$^{P1}$ and R$^{P2}$ is, independently, H, hydroxyl, optionally substituted $C_{1-12}$ alkyl (e.g., haloalkyl, such as $C_{1-12}$ perfluoroalkyl), optionally substituted C$_{1-12}$ alkoxy, optionally substituted C$_{4-18}$ aryl, optionally substituted C$_{1-12}$ alk-C$_{4-18}$ aryl, or optionally substituted C$_{4-18}$ aryloxy; each of R$^{Ar}$ is, independently, optionally substituted C$_{4-18}$ aryl, optionally substituted C$_{1-12}$ alk-C$_{4-18}$ aryl, or optionally substituted C$_{4-18}$ aryloxy; and each R$^{PA}$ is, independently, oxy, optionally substituted C$_{1-12}$ alkylene, or optionally substituted heteroalkylene.

Yet other exemplary acidic moieties (e.g., R$^C$) include any group having a carbonyl group, such as carboxyl (e.g., —CO$_2$H), —C(O)—R$^{C1}$, or —R$^{CA}$—C(O)—R$^{C1}$ (e.g., where each R$^{C1}$ is, independently, H, hydroxyl, optionally substituted C$_{1-12}$ alkyl (e.g., haloalkyl, such as C$_{1-12}$ perfluoroalkyl), optionally substituted C$_{1-12}$ alkoxy, optionally substituted C$_{4-18}$ aryl, optionally substituted C$_{1-12}$ alk-C$_{4-18}$ aryl, or optionally substituted C$_{4-18}$ aryloxy; and each R$^{CA}$ is, independently, oxy, optionally substituted C$_{1-12}$ alkylene, or optionally substituted heteroalkylene).

Exemplary electron-withdrawing moieties (e.g., R$^F$) include optionally substituted C$_{5-19}$ or C$_{7-11}$ aryloyl, optionally substituted C$_{6-18}$ aryl, carboxyaldehyde, optionally substituted C$_{2-7}$ or C$_{2-13}$ alkanoyl, optionally substituted C$_{1-12}$ alkyl, optionally substituted C$_{1-12}$ haloalkyl, optionally substituted C$_{2-7}$ or C$_{2-13}$ alkoxycarbonyl, nitro, nitroso, cyano, sulfo, carboxyl, and quaternary ammonium (e.g. —N$^+$R$^{N1}$R$^{N2}$R$^{N3}$, where each of R$^{N1}$, R$^{N2}$, and R$^{N3}$ is, independently, optionally substituted alkyl, optionally substituted alkaryl, or optionally substituted aryl, or two of R$^{N1}$, R$^{N2}$, and R$^{N3}$, taken together with the nitrogen atom to which each are attached, form a heterocyclyl group, as defined herein). In another embodiment, R$^F$ includes or is substituted by a C$_{1-12}$ perfluoroalkyl group. In yet another embodiment, R$^F$ is a C$_{1-12}$ perfluoroalkyl group.

The reactive handles, acidic moieties, electron-withdrawing moieties, and/or functional groups can be substituted or unsubstituted. For example, these groups can be substituted with one or more substitution groups, as described herein for alkyl and/or aryl.

Aryl Groups

The aryl groups herein can have any useful configuration, structure, and substitutions. Exemplary aryl groups (e.g., including arylene groups, such as for Ar$^L$, Ar$^M$, and Ar*) include the following groups, which may be optionally substituted:

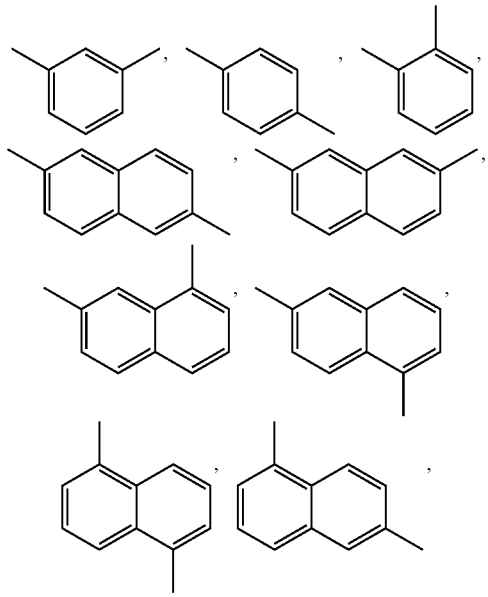

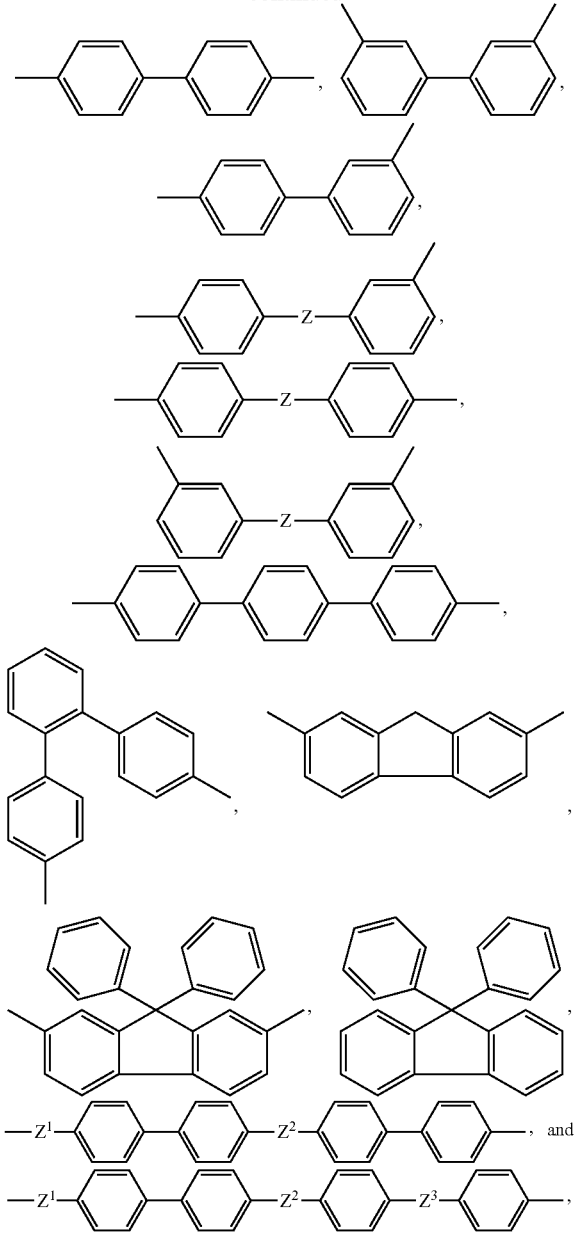

where each of Z, Z$^1$, Z$^2$, and Z$^3$ is, independently, —O—, —S—, —SO$_2$—, optionally substituted C$_{1-12}$ alkylene, optionally substituted C$_{1-12}$ alkyleneoxy, optionally substituted C$_{1-12}$ heteroalkylene, optionally substituted C$_{1-12}$ heteroalkyleneoxy, —CF$_2$—, —CH$_2$—, —OCF$_2$—, perfluoroalkylene, perfluoroalkyleneoxy, —Si(R$^i$)$_2$—, —P(O)(R$^i$)—, —PR$^i$—, —C(O)—, —C(CF$_3$)$_2$—, —C(CH$_3$)$_2$—, or —CCF$_3$Ph-, and where R$^i$ is H, optionally substituted alkyl, or optionally substituted aryl (e.g., methyl, ethyl, isopropyl, t-butyl, or phenyl).

Polymer Salts

The present invention includes a salt of any polymer described herein, e.g., a salt of any one of formulas (II), (IIA), (IIa), (IIb), (IIc), (IId), (IIe), (IIf), (IIg), (IIh), (IIi), (IIj), (IIk), (III), (IIm), (IIn), (IIo), (IIp), (IIq), (IIr), (IIs), (IIt), (IIu), (IIv), (IIw), (IIx), (III), (IIIa), (IIIb), (IIIc), (IIId), (IV), (V), and (Va), as well as particular structures provided as structures (II-1), (II-2), (II-3), (II-4), (II-5), (II-6), (II-7), (II-8), (II-9), (II-10), (II-11), (II-12), and (II-13). In particular embodiments, the salt is an anionic salt (e.g., a halide salt). In other embodiments, the form is a hydroxide form thereof.

Methods of Making Polymer Structures

The polymers of the invention can be synthesized using any useful scheme. In some instances, the cationic moiety $R^A$ includes an optionally substituted aryl (e.g., an $Ar^{A}$ group) having a cationic functionality (e.g., an $R^{A1}$ group). Without wishing to be limited by mechanism, the proximity of an $Ar^A$ aryl group to a $R^{A1}$ cationic charge results in an enhanced stability due to resonance stabilization.

The following synthetic schemes are provided as further non-limiting examples.

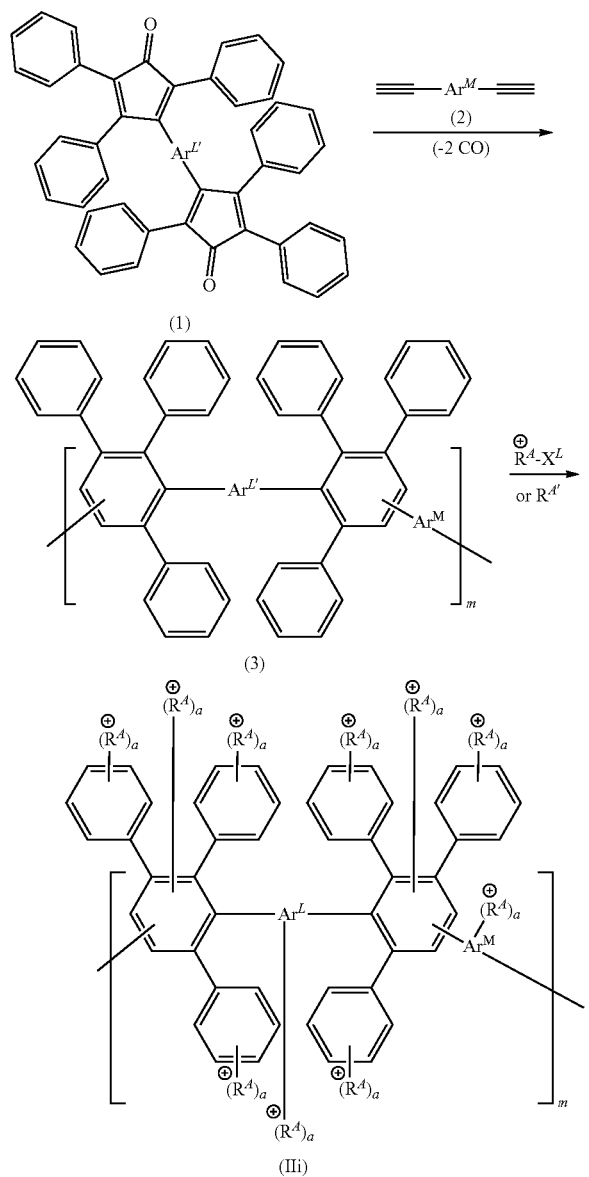

first substitution reaction to introduce $R^A$ to the parent structure. These two steps are described in more detail below.

First, a Diels-Alder reaction can be performed with an optionally substituted diene, such as a 1,4-bis-(2,4,5-triphenylcyclopentadienone)arylene reagent (1), with an optionally substituted dienophile, such as a diethynylarylene reagent (2). This reaction provides a Diels-Alder poly(phenylene) polymer (DAPP) (3). As can be seen, in this step, the number of subunits m is controlled by the stoichiometry of reagents (1) and (2).

Second, a substitution reaction is performed with reagent $R^A$—$X^L$ with the DAPP product (3) to provide a substituted polymer (III), where $X^L$ is any useful leaving group (e.g., halo, hydroxyl, or sulfonate, such as mesylate, tosylate, or triflate) and $R^A$ is any described herein (e.g., $R^A$ can be -$L^A$-$Ar^A$). As can be seen, reagent $R^A$—$X^L$ includes a cationic charge (e.g., provided by way of a cationic functionality, such as an alkylated quaternary amine). Exemplary reagent $R^A$—$X^L$ includes a salt, such as an iminium salt (e.g., a Vilsmeier reagent). Alternatively, the second step is conducted with reagent $R^{A'}$, which upon reaction with the DAPP product (3) forms cationic moiety. Exemplary reagent $R^{A'}$ includes an amine (e.g., a substituted amine), a guanidine (e.g., a substituted guanidine), or a heterocyclyl amine.

The concentration of $R^A$—$X^L$ or $R^{A'}$ can be controlled to provide the desired extent of substitution on the DAPP pendent and/or backbone aryl groups. As can be seen, the number a of $R^A$ substituents on each aryl group can be controlled by the stoichiometry of reagent $R^A$—$X^L$ and (DAPP) (3). In one instance, concentration can be controlled in order to install $R^A$ substituents on readily accessible pendent aryl groups. The reaction can be conducted until completion in order to access the backbone aryl groups, which are sterically more difficult to functionalize.

The cationic moiety $R^A$ can be installed in any useful manner. In one instance, the positively charged $R^A$ group can be installed directly on the pendent and/or backbone aryl group. In another instance, a precursor cationic moiety is installed on the pendent and/or backbone aryl group, and this precursor cationic moiety is reacted (e.g., with an alkylating reagent) to thereby provide a positively charged group attached to the DAPP structure.

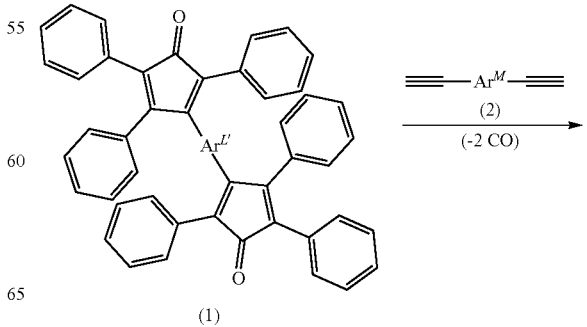

Scheme Ib

As shown in Scheme Ia, the polymer of formula (III) can be formed by performing a Diels-Alder reaction to form the pendent and backbone aryl groups, and then performing a

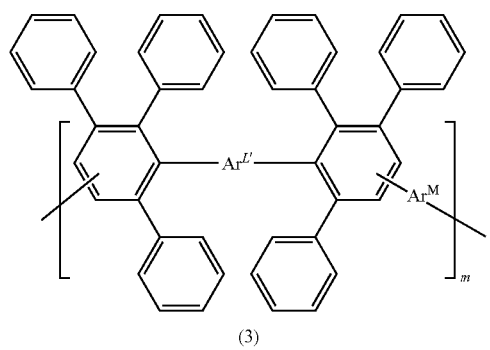

(3)

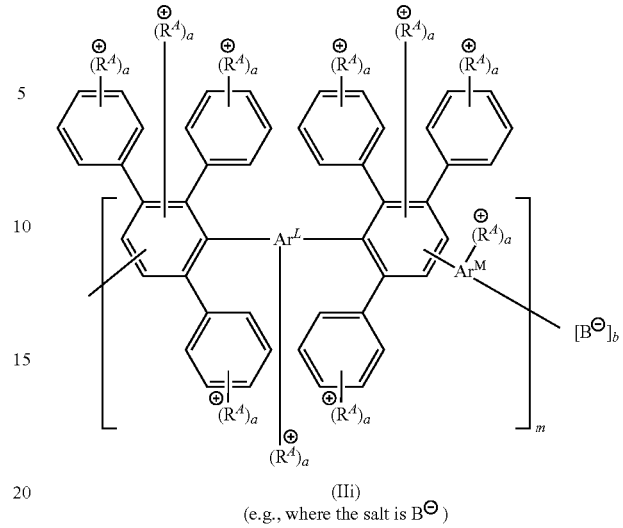

(IIi)
(e.g., where the salt is $B^{\ominus}$)

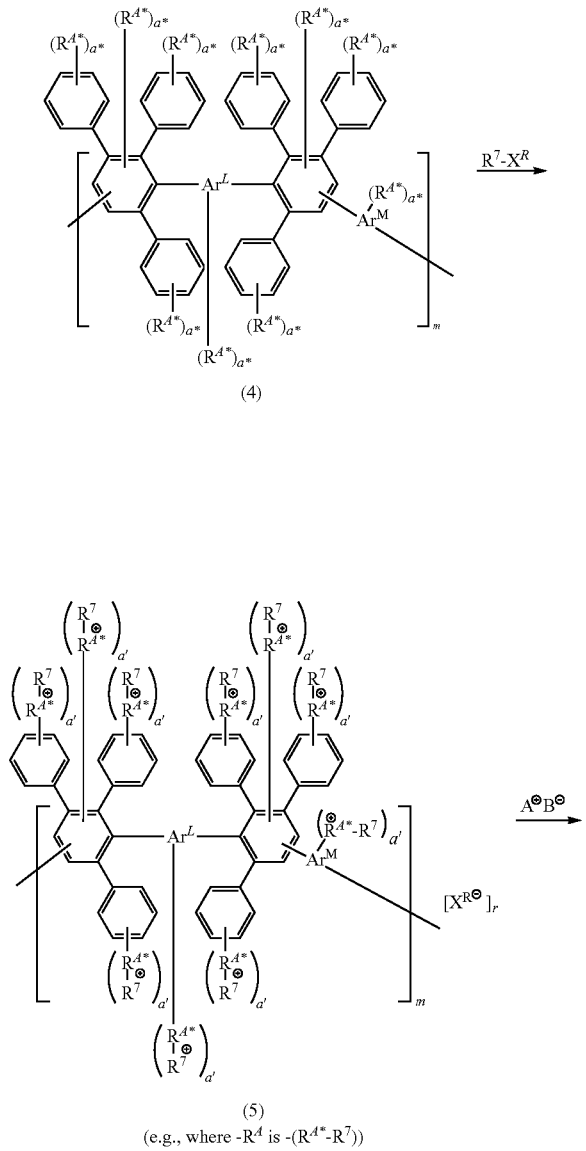

(4)

(5)
(e.g., where -$R^A$ is -($R^{A*}$-$R^7$))

As seen in Scheme Ib, the polymer of formula (III) can be formed by performing a Diels-Alder reaction to form the pendent and backbone aryl groups, performing a first substitution reaction to introduce the precursor cationic moiety $R^{A*}$ to the parent structure, performing a second substitution reaction to introduce an alkylating reagent $R^7$—$X^R$, and optionally performing an anionic salt exchange reaction to introduce anionic moiety B. These four steps are described in more detail below.

Similar to Scheme Ia, the first step in Scheme Ib includes a Diels-Alder reaction that is performed with an optionally substituted diene, such as a 1,4-bis-(2,4,5-triphenyl cyclopentadienone)arylene reagent (1), in the presence of an optionally substituted dienophile, such as a diethynylarylene reagent (2). This reaction provides a Diels-Alder poly(phenylene) polymer (DAPP) (3).

The second step includes an initial substitution reaction, which is performed with reagent $R^{A*}$—$X^L$ in the presence of the DAPP product (3), thereby providing a substituted polymer (4) bearing a precursor cationic moiety $R^{A*}$. For reagent $R^{A*}$—$X^L$, $X^L$ is any useful leaving group (e.g., halo, hydroxyl, or sulfonate, such as mesylate, tosylate, or triflate), and $R^{A*}$ is any precursor cationic moiety described herein (e.g., any non-ionized, non-charged counterpart of any cationic moiety or cationic functionality described herein).

The third step includes a second substitution reaction, which is performed with reagent $R^7$—$X^R$ in the presence of the substituted polymer (4) to provide the cationic charge on the polymer (5). For reagent $R^7$—$X^R$, $X^R$ is any useful leaving group (e.g., halo, hydroxyl, or sulfonate, such as mesylate, tosylate, or triflate), and $R^7$ is any described herein (e.g., an optionally substituted alkyl, an optionally substituted alkaryl, or an optionally substituted aryl). Exemplary reagent $R^7$—$X^R$ includes an alkylating agent (e.g., a methylating agent), such as an alkyl halide (e.g., $CH_3I$), a dialkyl sulfonate, a dialkyl carbonate, an alkyl triflate, a diazo compound (e.g., diazo methane), or an alkyl halosulfonate (e.g., methyl fluorosulfonate).

Finally, the fourth step includes an optional anion exchange reaction, which is performed with reagent AB in the presence of the DAPP product (5) to provide a substituted polymer carrying a different anionic moiety B (III).

In Scheme Ib, each of integers a, a*, and a' may be the same of different. For instance, if each reaction step is conducted with 100% efficiency (e.g., with excess reagents and/or lengthy reaction times), then a can equal a', which can in turn be equal to a*. Alternatively, if any of these reaction steps are not conducted with 100% efficiency or with different efficiencies, then two or more of a, a*, and a' may be different.

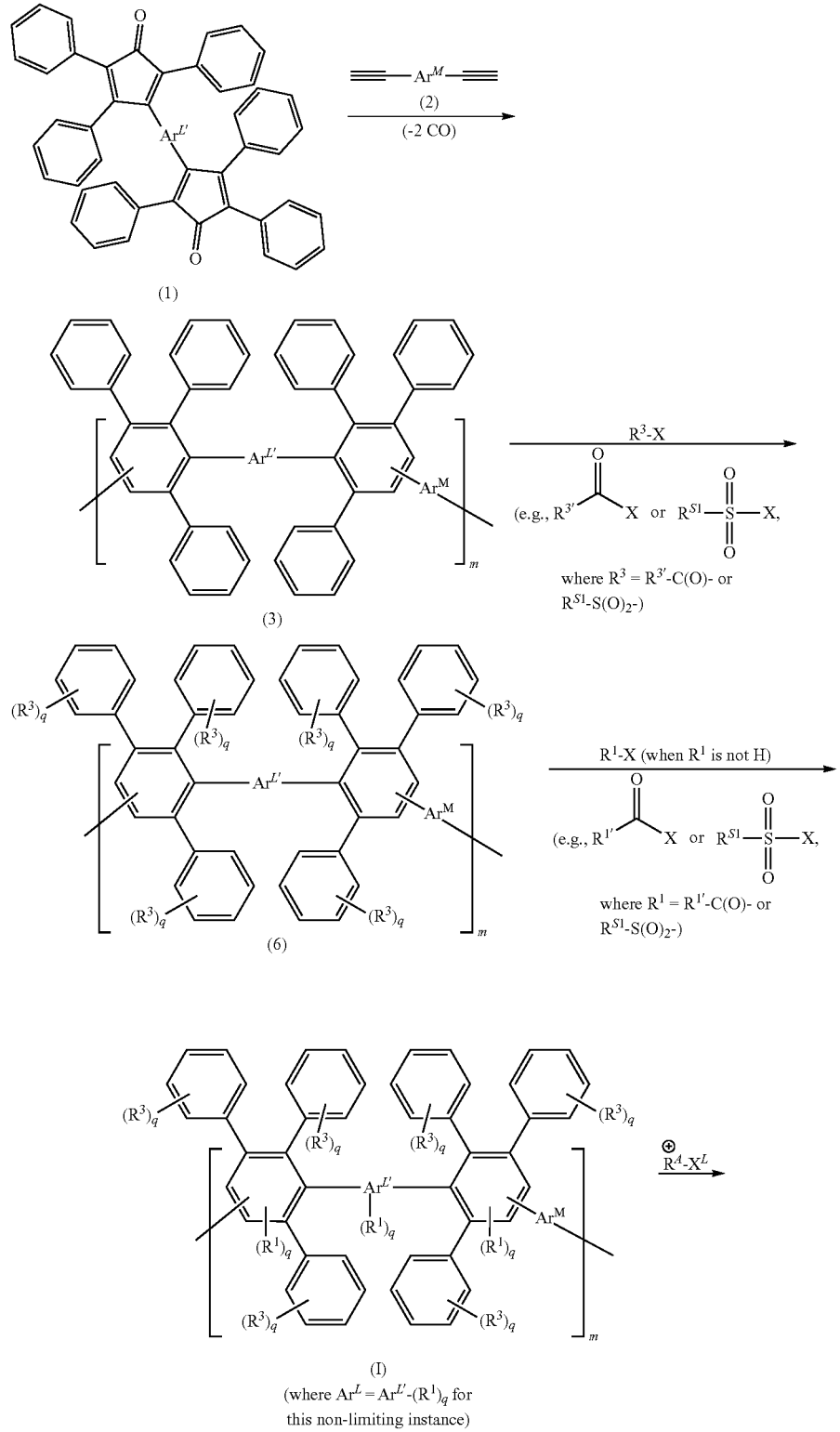

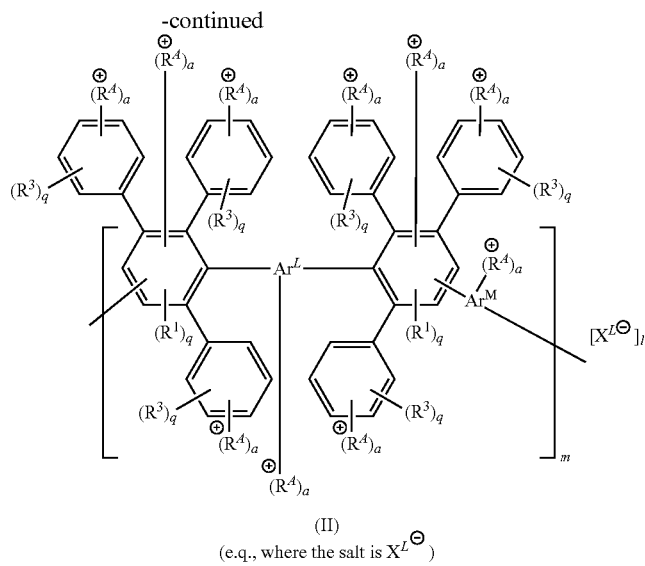

(II)
(e.q., where the salt is $X^{L\ominus}$)

Any useful substituents can be installed on the polymer in any useful manner. As shown in Scheme IIa, the polymer of formula (II) can be formed by performing a Diels-Alder reaction to form the pendent and backbone aryl groups, performing a first substitution reaction to introduce $R^3$ to the parent structure, performing a second substitution reaction to introduce $R^1$, and performing a final substitution reaction to introduce $R^A$. These four steps are described in more detail below.

Similar to Scheme Ia, the first step in Scheme IIa includes a Diels-Alder reaction that is performed with an optionally substituted diene, such as a 1,4-bis-(2,4,5-triphenyl cyclopentadienone)arylene reagent (1), in the presence of an optionally substituted dienophile, such as a diethynylarylene reagent (2). This reaction provides a Diels-Alder poly(phenylene) polymer (DAPP) (3).

The second step includes an initial substitution reaction, which is performed with reagent $R^3$—X in the presence of the DAPP product (3), thereby providing a substituted polymer (6). For reagent $R^3$—X, X is any useful leaving group (e.g., halo, hydroxyl, or sulfonate, such as mesylate, tosylate, or triflate) and $R^3$ is any described herein.

The third step includes a second substitution reaction, which is performed with reagent $R^1$—X in the presence of the substituted polymer (6) to provide the desired polymer of formula (I). For reagent $R^1$—X, X is any useful leaving group (e.g., halo, hydroxyl, or sulfonate, such as mesylate, tosylate, or triflate), and $R^1$ is any described herein.

Finally, the fourth step includes a third substitution reaction, which is performed with reagent $R^A$—$X^L$ in the presence of the substituted polymer (I) to provide a further substituted polymer (II). For reagent $R^A$—$X^L$, $X^L$ is any useful leaving group (e.g., halo, hydroxyl, or sulfonate, such as mesylate, tosylate, or triflate), and $R^A$ is any described herein (e.g., $R^A$ can be -$L^A$-$Ar^A$). The cationic moiety $R^A$ can be installed in any useful manner (e.g., in one step or in two steps, such as by using a reagent including a precursor cationic moiety $R^{A*}$—$X^L$ and an alkylating reagent $R^7$—$X^R$, such as in Scheme Ib).

In some embodiments, one or more steps may be required to install $R^1$ or $R^3$ on the parent molecule. For instance, when $R^1$ or $R^3$ is —$SO_2$—$NR^{N1}$—$R^{S2}$, multiple steps may be required to first install the —$SO_2$— functional group on the parent molecule. Then, this functional group may be activated (e.g., by forming a sulfonyl halide, such as sulfonyl chloride) and reacted with an amine (e.g., $NHR^{N1}$—$R^{S2}$).

In another instance, an additional step may be required to install the —$R^{S2}$ functional group. For example, when $R^1$ or $R^3$ includes two sulfonyl groups, such as in —$SO_2$—$NR^{N1}SO_2$—$R^{S2'}$, then then sulfonyl groups can be attached sequentially. In one example, the method includes installing the first —$SO_2$— functional group on the parent molecule and then reacted with a primary amine, such as $NH_2R^{N1}$, thereby providing a parent molecule having a —$SO_2$—$NHR^{N1}$ sulfonamide group. This sulfonamide can then be reacted with an activated sulfonyl reagent, e.g., a Cl—$SO_2$—$R^{S2'}$ reagent, where $R^{S2'}$ is an optionally substituted $C_{1-12}$ alkyl, thereby providing an $R^S$ moiety of —$SO_2$—$NR^{N1}$—$SO_2$—$R^{S2'}$ on the polymer.

In yet another instance, when $R^1$ or $R^3$ is —$R^{P4}$—P(O))<$R^{P1}R^{P2}$, multiple steps may be required to first install the $R^{P4}$ alkylene or heteroalkylene on the parent molecule, and then to later install the —P(O))<$R^{P1}R^{P2}$ group on the alkylene or heteroalkylene molecule. Furthermore, if $R^{P1}$ or $R^{P2}$ is an alkoxy or aryloxy group, then additional step may be required to modify a hydroxyl group attached to the phosphorous atom with an alkoxy or aryloxy group. A skilled artisan would understand that additional modifications or step can be employed to arrive at the desired structure.

Exemplary $R^1$—X and $R^3$—X reagents include $HSO_3Cl$, $H_2SO_4$, $PCl_3$, $POCl_3$, $H_3PO_4$, $SO_3$, fuming sulfuric acid, thionyl chloride, trimethylsilyl chlorosulfonate, dialkyl phosphites (e.g., diethyl phosphate with an optional catalyst, such as a Pd(0) catalyst), phosphines (e.g., tertiary phosphines), phosphoric acids (e.g., hypophosphorous acids, phosphonic acids, phosphinic acids, etc.), aryl halide (e.g., RX, where R is an optionally substituted aryl group, as defined herein, and X is halo), aryl halide (e.g., RX, where R is an optionally substituted aryloyl group, as defined herein, and X is halo, such as trifluorobenzoyl chloride), protein kinase (e.g., to install a phosphoryl group), phosphonoxyphenols, as well as mixtures thereof.

Furthermore, an additional anion exchange reaction may be conducted to provide a final product with the desired anionic moiety B (e.g., in which B is different than any leaving group X or $X^L$ employed during synthesis of the polymer).

Any substitution steps herein (e.g., the second, third, and fourth steps in Scheme IIa) can be performed in any order to obtain the desired substitution pattern. Of course, if $R^3$ and $R^1$ are the same substituents, then only one of the substitution reaction steps can be conducted.

In another instance, as shown in Scheme IIb, the polymer of formula (II) can be formed by performing a Diels-Alder reaction to form the pendent and backbone aryl groups, performing a first substitution reaction to introduce $R^1$ to the parent structure, performing a second substitution reaction to introduce $R^3$, and performing a final substitution reaction to introduce $R^A$. These three steps are described in more detail below.

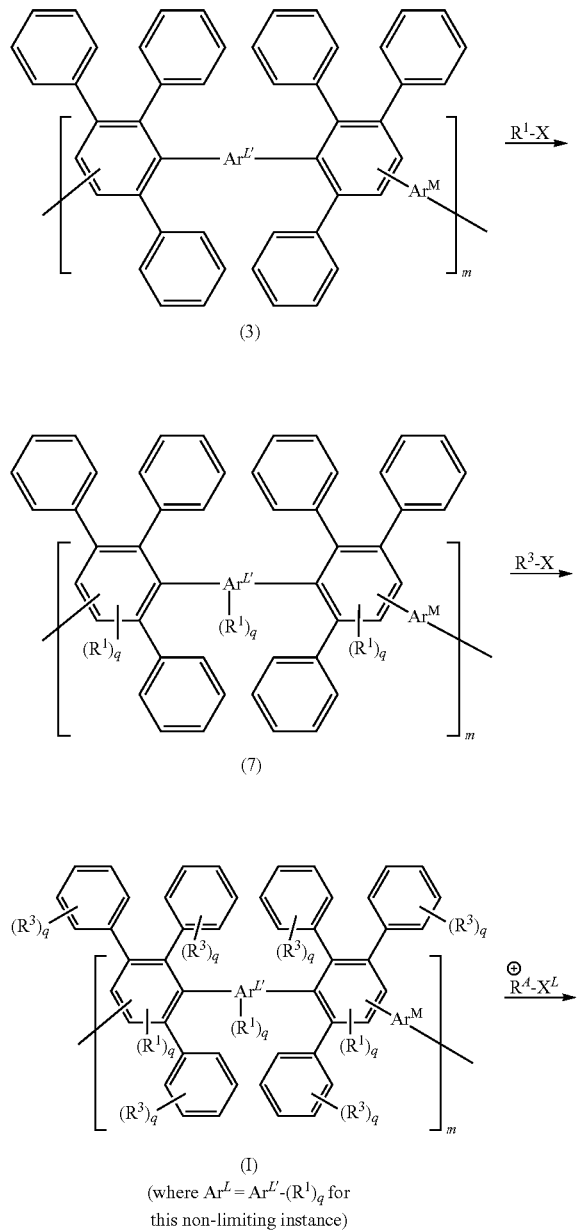

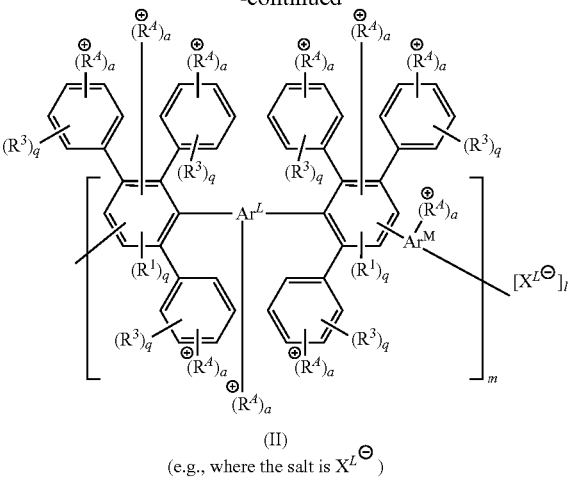

The Diels-Alder poly(phenylene) polymer (DAPP) (3) in Scheme IIb can be formed in any useful manner. In one instance, similar to Scheme Ia, a DAPP polymer (3) is formed by way of a Diels-Alder reaction that is performed with an optionally substituted diene, such as a 1,4-bis-(2,4,5-triphenyl cyclopentadienone)arylene reagent, in the presence of an optionally substituted dienophile, such as a diethynylarylene reagent.

In Scheme IIb, the first step includes an initial substitution reaction, which is performed with reagent $R^1$—X in the presence of the DAPP product (3), thereby providing a substituted polymer (7). For reagent $R^1$—X, X is any useful leaving group (e.g., halo, hydroxyl, or sulfonate, such as mesylate, tosylate, or triflate), and $R^1$ is any described herein.

The second step includes a second substitution reaction, which is performed with reagent $R^3$—X in the presence of the substituted polymer (7) to provide the desired polymer of formula (I). For reagent $R^3$—X, X is any useful leaving group (e.g., halo, hydroxyl, or sulfonate, such as mesylate, tosylate, or triflate), and $R^3$ is any described herein.

Finally, the third step includes a third substitution reaction, which is performed with reagent $R^A$—$X^L$ in the presence of the substituted polymer (I) to provide a further substituted polymer (II). For reagent $R^A$—$X^L$, $X^L$ is any useful leaving group (e.g., halo, hydroxyl, or sulfonate, such as mesylate, tosylate, or triflate), and $R^A$ is any described herein (e.g., $R^A$ can be -$L^A$-$Ar^A$). The cationic moiety $R^A$ can be installed in any useful manner (e.g., in one step or in two steps, such as by using a reagent including a precursor cationic moiety $R^{A*}$—$X^L$ and an alkylating reagent $R^7$—$X^R$, such as in Scheme Ib). Optionally, an anion exchange reaction can be conducted to exchange $X^L$ for any other useful anionic moiety (e.g., any anionic salt described herein).

A substituted polymer (e.g., having $R^3$ and $R^1$ substituents) can be further functionalized in any useful way to include one or more cationic moieties $R^A$ or cationic functionalities $R^{A1}$. In some instances, the cationic moiety $R^A$ is installed directly on the substituted polymer. In other instances, a reactive handle $R^H$ is first installed on the substituted polymer, and $R^H$ is further reacted with a reagent including a cationic moiety $R^A$ or a precursor cationic moiety $R^{A*}$. In particular embodiments, $R^H$ is a functional group X including a halo, a haloalkyl, an optionally substituted alkyl, an optionally substituted alkaryl, or an optionally substituted aryl (e.g., in which each of these can optionally include one or more halo substitutions); or in which X is halo, hydroxyl, or sulfonate, such as mesylate, tosylate, or triflate.

Scheme IIIa

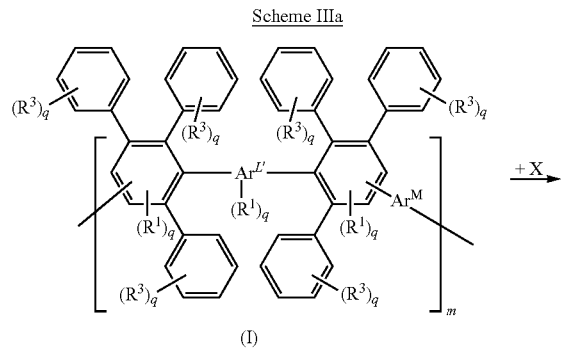

(I)

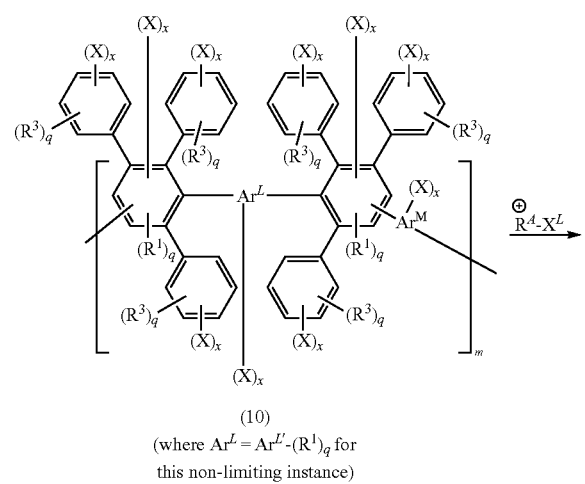

(10)
(where $Ar^L = Ar^{L'}-(R^1)_q$ for this non-limiting instance)

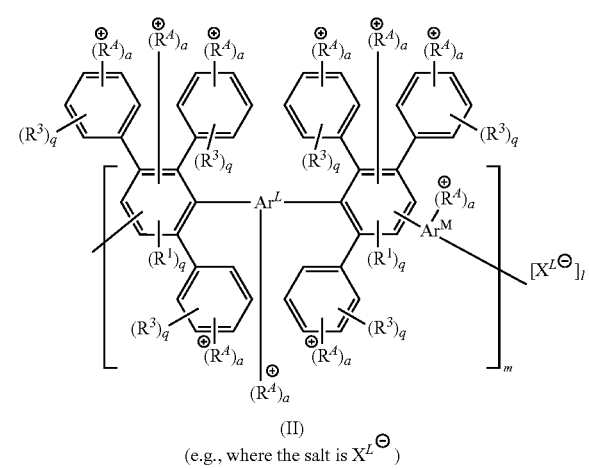

(II)
(e.g., where the salt is $X^{L\ominus}$)

As shown in Scheme IIIa, the polymer of formula (II) can be formed by providing a substituted DAPP polymer (e.g., any described herein) having a structure of formula (I), performing a first substitution reaction to introduce X to the parent structure, and then performing a second substitution reaction to introduce $R^A$. These steps are described in more detail below.

The substituted polymer (I) in Scheme IIIa can be formed in any useful manner. In one instance, similar to Scheme IIa or Scheme IIb, the substituted polymer (I) is formed by way of a Diels-Alder reaction to form the underlying DAPP structure, as well as by a plurality of substitution reactions to install $R^1$ and $R^3$ substituents.

In Scheme IIIa, the first step includes an initial substitution reaction, which is performed with a reagent including X in the presence of the substituted polymer (I), thereby providing a further substituted polymer (10), in which each x is, independently, any useful integer (e.g., 0, 1, 2, 3, 4, or 5). For the reagent including X, X can be any useful leaving group (e.g., halo, hydroxyl, nitro, or sulfonate, such as mesylate, tosylate, or triflate). For instance, if X is halo, then the reagent including X can be any useful halogenating reagent (e.g., $X_2$, where X is halo) in the presence of an optional catalyst (e.g., Fe, $FeX_3$, or $AlX_3$, where X is halo). In another instance, if X is sulfonate, then the reagent including X can include any useful sulfonating reagent (e.g., $SO_3$ and/or $H_2SO_4$).

The second step includes a further substitution reaction, which is performed with reagent $R^A$—$X^L$ in the presence of the substituted polymer (10) to provide a further substituted polymer (II). For reagent $R^A$—$X^L$, $X^L$ is any useful leaving group (e.g., halo, hydroxyl, or sulfonate, such as mesylate, tosylate, or triflate), and $R^A$ is any described herein (e.g., $R^A$ can be -$L^A$-$Ar^A$). The cationic moiety $R^A$ can be installed in any useful manner (e.g., in one step or in two steps, such as by using a reagent including a precursor cationic moiety $R^{A*}$—$X^L$ and an alkylating reagent $R^7$—$X^R$, such as in Scheme Ib). Optionally, an anion exchange reaction can be conducted to exchange $X^L$ for any other useful anionic moiety (e.g., any anionic salt described herein).

Any useful reagents and any useful synthetic steps can be employed to install the cationic moiety $R^A$ in the final polymer. As seen in Scheme IIIb, an exemplary non-limiting synthetic scheme can include an initial reaction to install an $Ar^A$ aryl group and a further reaction to install the cationic functionality $R^{A1}$.

Scheme IIIb
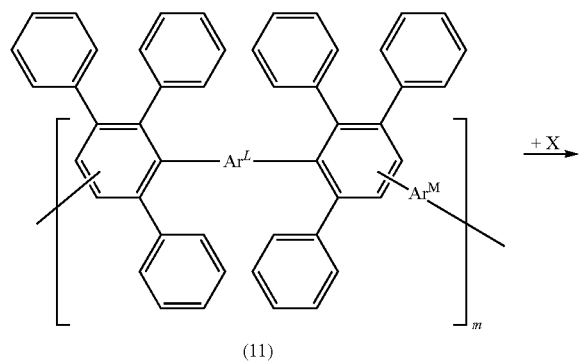
(11)
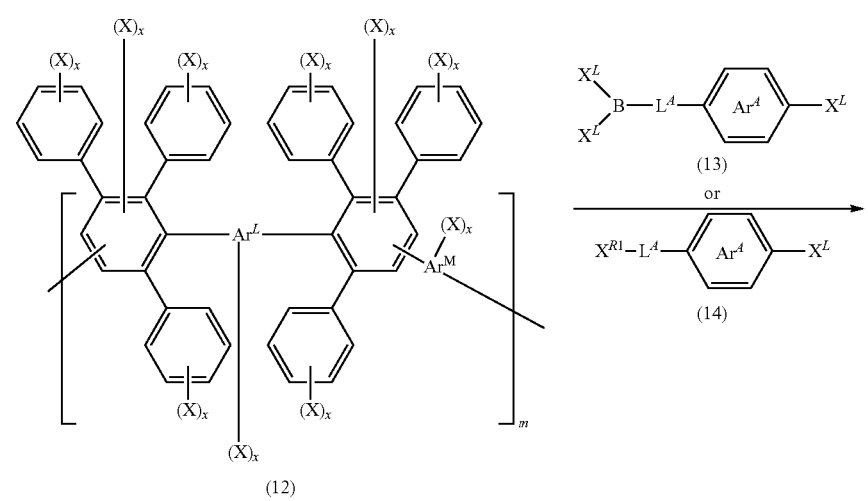
(12)

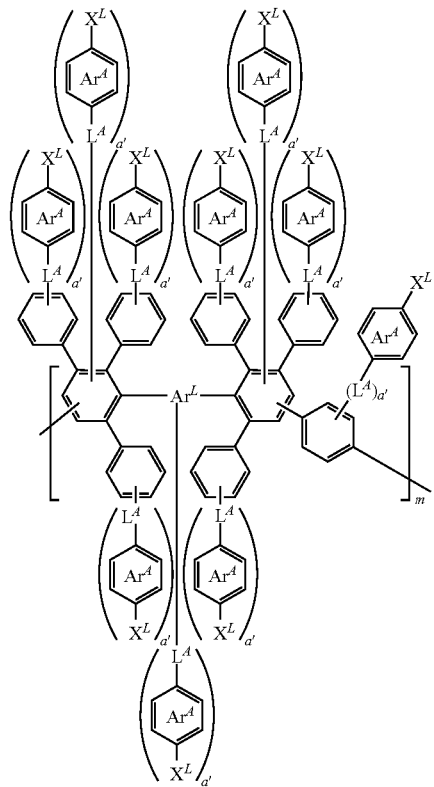

(15)

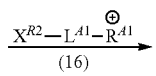

(16)

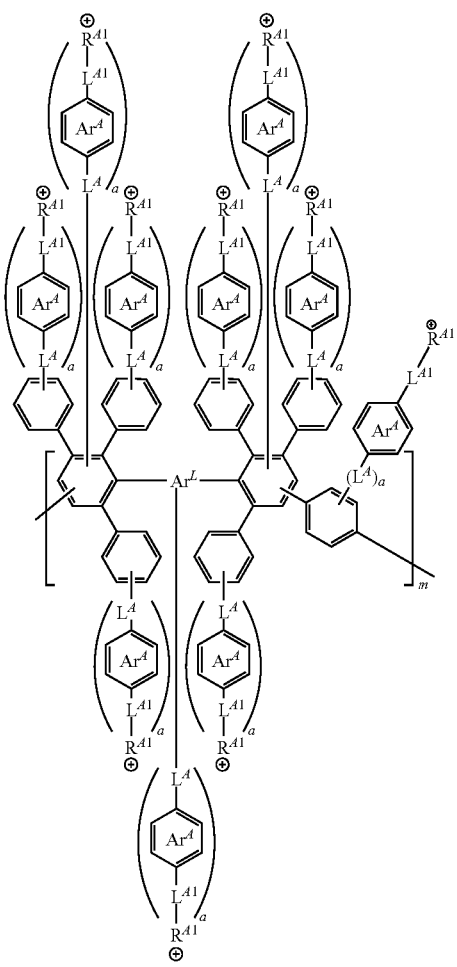

(IIu)

As shown in Scheme IIIb, the polymer of formula (IIu) can be formed by providing a substituted DAPP polymer (e.g., any described herein, such as having a structure of formula (I) or (11)), performing a first substitution reaction to introduce X to the parent structure, performing a second substitution reaction to introduce an $Ar^4$ group to the parent structure, and then performing a third substitution reaction to introduce a cationic functionality $R^{A1}$ in proximity to the aryl ring of the $Ar^4$ group. These steps are described in more detail below.

The DAPP polymer (11) in Scheme IIIb can be formed in any useful manner. In one instance, similar to Scheme IIb, the DAPP polymer (11) is formed by way of a Diels-Alder reaction including an optionally substituted diene and an optionally substituted dienophile.

The first step includes an initial substitution reaction, which is performed with a reagent including X in the presence of the DAPP polymer (11), thereby providing a further substituted polymer (12), in which each x is, independently, any useful integer (e.g., 0, 1, 2, 3, 4, or 5). Exemplary X and reagents including X are described herein.

The second step includes a further substitution reaction to introduce an $Ar^4$ aryl group to one or more pendent and/or backbone aryl groups of the DAPP polymer. In one instance, the reagent (13) is a boronic reagent including any useful ligand $X^L$ (e.g., any described herein, such as halo, optionally substituted alkoxy, hydroxyl, an optionally substituted alkylene, or an optionally substituted heteroalkylene, in which the alkylene or heteroalkylene, taken together with the boron to which it is attached, forms a boronate ester), any useful linker $L^A$ (e.g., any described herein), and an optionally substituted aryl group $Ar^4$. Such a boronic reagent can be useful to conduct any useful reaction (e.g., a Suzuki coupling reaction). In another instance, the reagent (14) includes any useful leaving groups $X^{R1}$, $X^L$ (e.g., any described herein), any useful linker $L^A$ (e.g., any described herein), and an optionally substituted aryl group $Ar^4$. Such a reagent can be useful to conduct any useful reaction (e.g., a Friedel-Crafts alkylation or acylation reaction). As can be seen, the resultant polymer (15) includes any useful number a' (e.g., where each a' is, independently, any useful integer, such as 0, 1, 2, 3, 4, or 5) of $Ar^4$ groups attached by way of a linker $L^A$ to the pendent and/or backbone aryl groups of the DAPP structure. The leaving group $X^L$ provides a reactive functional group that can be employed to further attach a cationic moiety $R^A$, a cationic functionality $R^{A1}$, or a precursor cationic moiety $R^{A*}$.

The third step includes a substitution reaction to introduce $R^{A1}$ to the DAPP polymer. In one instance, the reagent (16) includes any useful leaving group $X^{R2}$, a linker $L^{A1}$, and a cationic functionality $R^{A1}$ (e.g., where exemplary leaving groups, linkers, and cationic functionalities are described herein). The number a of $R^A$ groups can be less than or equal to the number a' of reactive groups on each aryl group. As can be seen, the final polymer of structure (IIu) includes one or more cationic moieties, each of which in turn includes a cationic functionality $R^{A1}$ attached by way of a linker $L^{A1}$ to an aryl group $Ar^A$.

synthetic building block (16) having a leaving group $X^{R2}$, a linker $L^{A1}$, and a cationic functionality $R^{A1}$.

Optionally, this building block (16), in turn, can be formed from a reaction including further building blocks, such as a first reagent (19) and a second reagent (20), to form a building block (16*) including a cationic moiety. The first

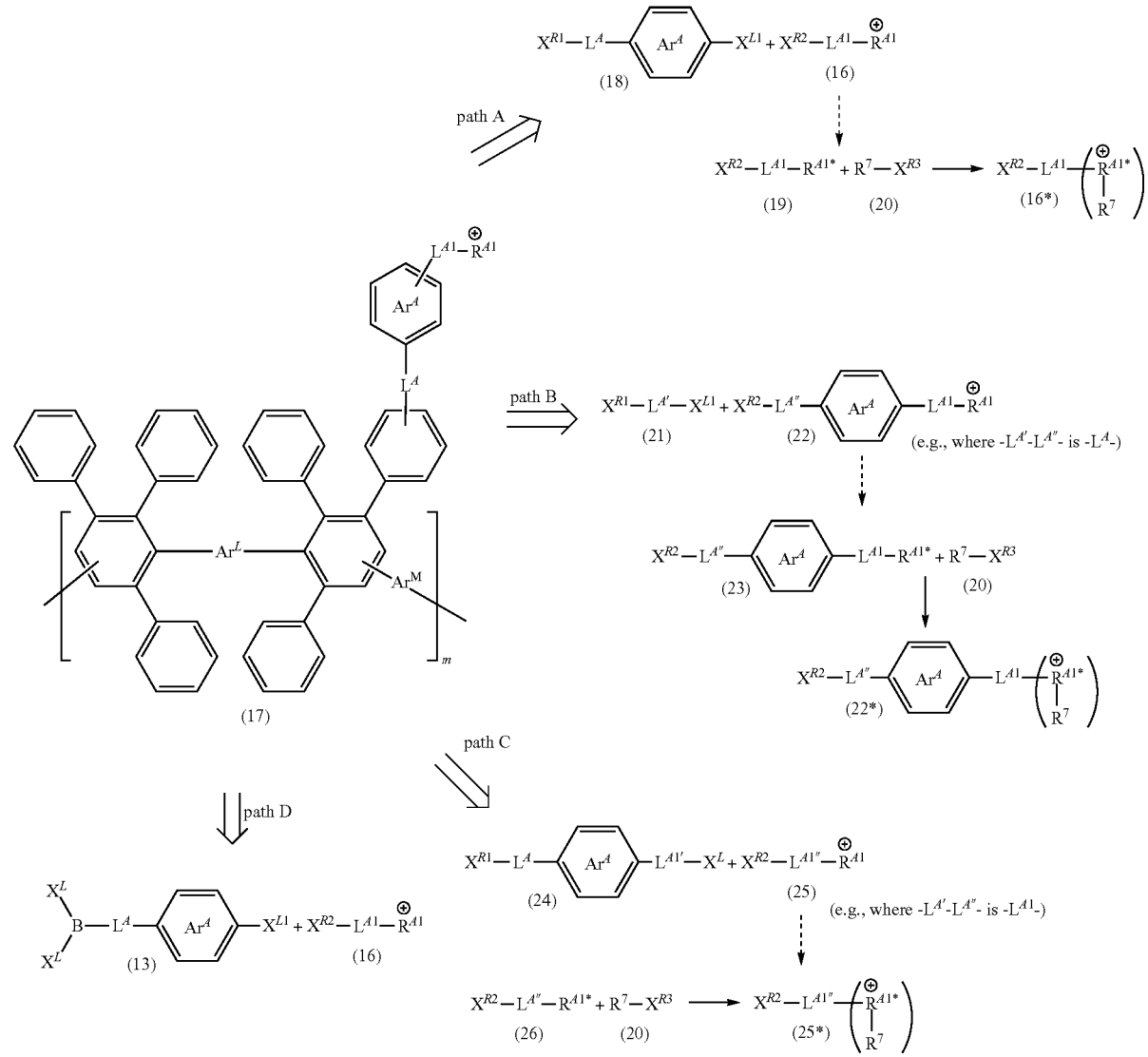

Scheme IV

Any useful combination of reactions can be employed to install and/or form the cationic moiety on the DAPP polymer. For instance, Scheme IV provides various exemplary, non-limiting retrosynthetic paths to install a cationic moiety $R^A$, in which $R^A$ is $-L^A-Ar^A-L^{A1}-R^{A1}$.

In one non-limiting instance, path A is employed to first install the aryl group $Ar^A$ on the DAPP polymer and then to install the cationic functionality $R^{A1}$. Optionally, the cationic functionality $R^{A1}$ in turn is installed by providing a precursor cationic functionality $R^{A1*}$ and by reacting this moiety with an alkylating reagent $R^7-X^{R3}$. As can be seen, retrosynthetic path A can include a first synthetic building block (18) having leaving groups $X^{R1}$, $X^{L1}$, a linker $L^A$, and an aryl group $Ar^A$. The cationic moiety can be provided by a second reagent (19) can include any useful leaving group $X^{R2}$, linker $R^{A1}$, and precursor cationic moiety $R^{A1*}$; and the second reagent (20) can be any useful alkylating reagent having a leaving group $X^{R3}$ and an organic moiety $R^7$. In some instances, the cationic functionality $R^{A1}$ is formed by reacting the precursor cationic moiety $R^{A1*}$ to include an appended organic moiety $R^7$.

In another non-limiting instance, path B is employed to first install a linker portion $L^{A'}$ on the DAPP polymer and then to install the aryl group $Ar^A$ having the cationic functionality $R^{A1}$. Optionally, the cationic functionality $R^{A1}$ in turn is installed by providing a precursor cationic functionality $R^{A1*}$ and by reacting this moiety with an alkylating reagent $R^7-X^{R3}$.

As can be seen, retrosynthetic path B can include a first synthetic building block (21) having leaving groups $X^{R1}$, $X^{L1}$, and a linker portion $L^{A'}$. The aryl group and cationic moiety can be provided by a second synthetic building block (22) having a leaving group $X^{R2}$, a linker portion $L^{A''}$, an aryl group $Ar^A$, a linker $L^{A1}$, and a cationic functionality $R^{A1}$. The linker portions $L^{A'}$, $L^{A''}$ can be designed to react in order to form a linker $L^A$.

Optionally, this building block (22), in turn, can be formed from a reaction including further building blocks, such as a first reagent (23) and a second reagent (20), to form a building block (22*) including a cationic moiety. The first reagent (23) can include any useful leaving group $X^{R2}$, linker portion $L^{A''}$, aryl group $Ar^A$, linker $L^{A1}$, and precursor cationic moiety $R^{A1}*$'d the second reagent (20) can be any useful alkylating reagent having a leaving group $X^{R3}$ and an organic moiety $R^7$. In some instances, the cationic functionality $R^{A1}$ is formed by reacting the precursor cationic moiety $R^{A1}*$ to include an appended organic moiety $R^7$.

In yet another non-limiting instance, retrosynthetic path C is employed to first install an aryl group $Ar^A$ and a linker portion $L^{A1'}$ on the DAPP polymer and then to install the cationic functionality $R^{A1}$. Optionally, the cationic functionality $R^{A1}$ in turn is installed by providing a precursor cationic functionality $R^{A1}*$ and by reacting this moiety with an alkylating reagent $R^7—X^{R3}$.

As can be seen, path C can include a first synthetic building block (24) having leaving groups $X^{R1}$, $X^L$, a linker $L^A$, an aryl group $Ar^A$, and a linker portion $L^{A1'}$. The cationic moiety can be provided by a second synthetic building block (25) having a leaving group $X^{R2}$, a linker portion $L^{A1''}$, and a cationic functionality $R^{A1}$. The linker portions $L^{A1'}$, $L^{A1''}$ can be designed to react in order to form a linker $L^{A1}$.

Optionally, this building block (25), in turn, can be formed from a reaction including further building blocks, such as a first reagent (26) and a second reagent (20), to form a building block (25*) including a cationic moiety. The first reagent (26) can include any useful leaving group $X^{R2}$, linker portion $L^{A1''}$, and precursor cationic moiety $R^{A1}*$; and the second reagent (20) can be any useful alkylating reagent having a leaving group $X^{R3}$ and an organic moiety $R^7$. In some instances, the cationic functionality $R^{A1}$ is formed by reacting the precursor cationic moiety $R^{A1}*$ to include an appended organic moiety $R^7$.

In another non-limiting instance, retrosynthetic path D is employed to first install the aryl group $Ar^A$ on the DAPP polymer and then to install the cationic functionality $R^{A1}$. Optionally, the cationic functionality $R^{A1}$ in turn is installed by providing a precursor cationic functionality $R^{A1}*$ and by reacting this moiety with an alkylating reagent $R^7—X^{R3}$.

As can be seen, path D can include a first synthetic building block (13) having ligands $X^L$, a linker $L^A$, and an aryl group $Ar^A$. The cationic moiety can be provided by a second synthetic building block (16) having a leaving group $X^{R2}$, a linker $L^{A1}$, and a cationic functionality R. Optionally, this building block (16), in turn, is formed as seen and described for retrosynthetic pathway A.

In any scheme described herein, any useful functional group can be employed. For instance, $X^{R1}$, $X^{R2}$, $X^{R3}$, $X^L$, and $X^{L1}$ can be any useful leaving group or ligand (e.g., any described herein, such as halo, hydroxyl, alkoxy, aryloxy, alkaryloxy, or sulfonate, such as mesylate, tosylate, or triflate). In another instance, organic moiety $R^7$ can include any useful functional group, such as an optionally substituted alkyl, optionally substituted alkaryl, or optionally substituted aryl. In yet another instance, $L^A$ and $L^{A1}$ can be any useful linker described herein (e.g., a covalent bond, carbonyl, oxy, thio, azo, phosphonoyl, phosphoryl, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy); and $L^{A'}$ and $L^{A''}$ can be any useful precursor or derivative that provides any linker described herein. In yet another instance, $Ar^A$ can include any optionally substituted aryl group described herein. In another instance, $R^A$ and $R^{A1}$ can be any cationic moiety or cationic functionality described herein; and $R^{A}*$ and $R^{A1}*$ can be any useful precursor or derivative that provides any cationic moiety or cationic functionality described herein.

EXAMPLES

Example 1: Anion Exchange Polymer Electrolytes

Ion exchange polymer electrolytes and their dispersion in liquid medium are one aspect of fuel cells and other electrochemical applications. In fuel cells, electrochemical reactions occur either in acidic or alkaline media. In acidic environments, proton exchange membranes offer the required combination of adequate longevity and good conductivity at relatively low temperatures (e.g., of from about 25° C. to about 100° C.). Whereas fuel cells and electrolytes employ proton exchange membranes, alkaline fuel cells require anion-conducting polymer electrolytes. In alkaline environments, the efficiency of the oxygen reduction reaction is much higher than in acidic conditions, which allows the use of low-cost, abundant electro-catalysts as opposed to precious metal catalysts.

Traditionally, alkaline fuel cells use an aqueous solution of potassium hydroxide as the electrolyte, with typical concentrations of about 30%. A major operating constraint is the requirement for low carbon dioxide concentrations in the oxidant feed stream, as carbon dioxide can result in the formation of carbonate precipitates. One approach for addressing this issue is the use of solid anion-conducting membranes. Alkaline fuel cell systems based on such membranes use the desirable properties of the solid electrolytes, such as the lack of requirement of liquid electrolyte circulation, the presence of less corrosion, and the capability of applying differential pressure and system design simplification.

A significant challenge in the area of alkaline fuel cells is the current lack of anion exchange polymer electrolytes that have i) good electrolyte stability in alkaline media, ii) high anionic conductivity, and iii) good processability.

Without wishing to be limited by theory, one cause of the low stability of anion exchange polymer electrolytes is due to fast hydrolysis of polymer electrolytes in highly basic conditions. The degradation process can be accelerated by electron-withdrawing molecules in the vicinity of cation functional group. Lower ionic conductivity of anion exchange polymer electrolytes, as compared to cation exchange polymer electrolytes, is due to the diffusion coefficient of the hydroxide ion, which is lower than that of protons. Another non-limiting reason for lower ionic conductivity of anion exchange polymer electrolytes is the larger size of cation group in the anion exchange polymer electrolytes, which dilutes the concentration of exchange site.

Processability can also be a concern. The low processability of alkyl ammonium cation-based anion exchange polymer electrolytes is due, in part, to their low solubility.

Alkyl ammonium cation-based (and other cation-based) anion exchange polymer electrolytes may be synthesized by chloride substitution of a —CH$_2$Cl moiety of the polymers. Because the cation form of the polymer electrolytes is directly synthesized via chloride substitution, the resultant cation functionalized polymer electrolytes has limited solubility. This limited solubility has been a significant inhibitor of successful application of alkaline fuel cells.

Traditional techniques rely on improving the stability of anion exchange polymer electrolytes by introducing highly basic and bulky cations such as sulfonium, phosphazenium, and guanidinium. However, the cation functionality is directly attached to the hydrocarbon-based polymer backbone, which is technically challenging to synthesize.

There exists a need, therefore, for additional polymer structures and components formed from polymers that exhibit useful characteristics for use as anion exchange polymer electrolytes. Exemplary characteristics include enhanced stability against chemical degradation at high pH than currently available anion exchange polymer electrolytes; improved anionic conductivity; and/or increased solubility in a dispersing medium, which in turn improves processability. Additionally, a need exists for methods of fabricating high performance, solid anion exchange membrane fuel cells.

This Example provides exemplary anion exchange polymer electrolytes that include a poly(phenylene) polymer with resonance-stabilized cationic moieties. The poly(phenylene) substructure provides a durable construct, and the cationic moiety provides a positive charge to promote anion conduction. These two structures (e.g., the poly(phenylene) substructure and the cationic moiety) work together to provide enhanced stabilities under high pH condition.

In one embodiment, the polymer includes an aryl group in proximity to the cationic moiety, thereby providing increased conjugation by way of charge delocalization. The proximity of the aryl group allows for the construction of an increased number of resonance forms. The resonance structure of the aryl group can potentially enhance the stability of both cationic moieties and amide (or sulfonamide) linkage from the hydrolysis by sharing the electrons. The stabilization can be maximized when the conjugated structures, e.g., amide (or sulfonamide), aryl group, and cationic groups, are connected without interruption. Without wishing to be limited by mechanism, the polymer can be designed (e.g., by controlling the distance or linkage between an aryl group and the cationic moiety/cationic functionality) to provide resonance stabilized poly(phenylene)-based anion exchange polymer electrolytes. Also described herein are methods of preparing a poly(phenylene)-based polymer (e.g., a polymer having a structure of formula (II) or any polymer described herein) and methods of using the polymer to prepare membranes.

In one embodiment, the composition includes a structure having the formula (IIv):

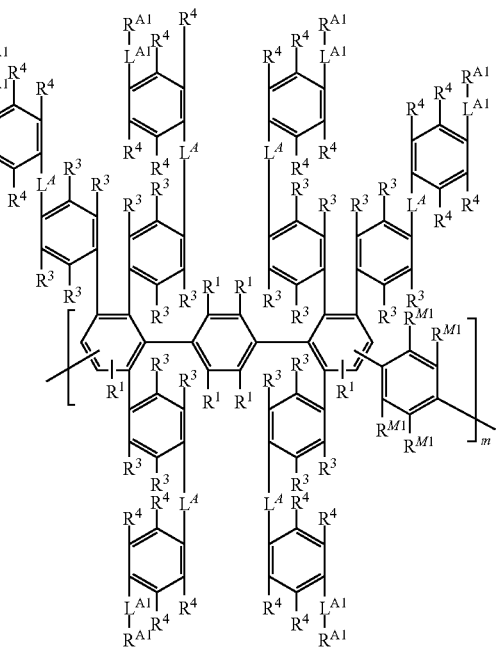

(IIv)

or a salt thereof or a form thereof including a counter ion. In some embodiments, each $R^1$ or $R^3$ is, independently, any substituent described herein (e.g., H or halo, such as fluorine).

In some embodiments, each of $L^A$ and $L^{A1}$ is, independently, any linker described herein (e.g., a covalent bond, carbonyl, oxy, thio, sulfonyl, sulfinyl, optionally substituted $C_{1-12}$ alkylene, optionally substituted $C_{1-12}$ alkyleneoxy, optionally substituted $C_{1-12}$ heteroalkylene, or optionally substituted $C_{1-12}$ heteroalkyleneoxy).

In some embodiments, each $R^4$ is, independently, any substituent described herein (e.g., H, halo, cyano, nitro, nitroso, azido, sulfo, carboxyaldehyde, carboxyl, hydroxyl, amino, amidino, amido, thioamido, optionally substituted $C_{1-12}$ alkyl, or optionally substituted $C_{1-12}$ alkoxy).

In other embodiment, each $R^{A1}$ is, independently, any cationic moiety or cationic functionality described herein (e.g., amidinium, guanidinium, phosphazenium, aminosulfonium, aminosulfoxonium, imidazolium, or pyridinium, as well as salts thereof). Exemplary cationic moieties and cationic functionalities include the following:

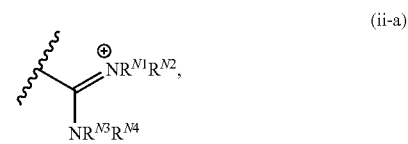

(ii-a)

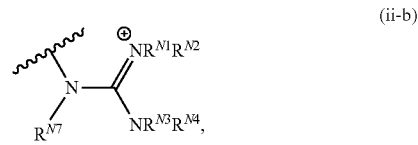

(ii-b)

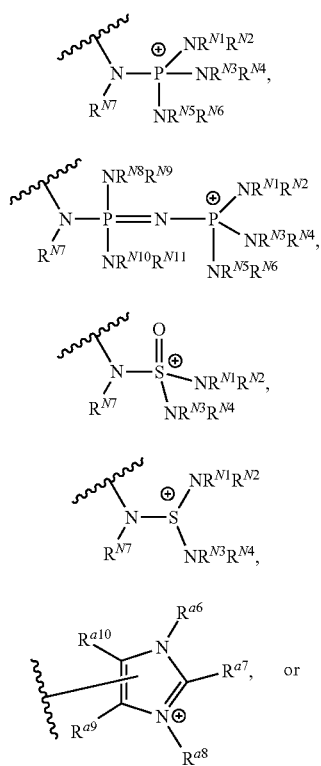

(ii-f)

(ii-g)

(ii-h)

(ii-i)

(ii-k)

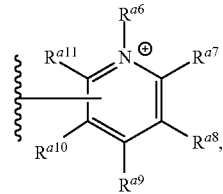

(ii-n)

where each of $R^{N1}$, $R^{N2}$, $R^{N3}$, $R^{N4}$, $R^{N5}$, $R^{N6}$, $R^{N7}$, $R^{N8}$, $R^{N9}$, $R^{N10}$, and $R^{N11}$ is any described herein; and each of $R^{a6}$, $R^{a7}$, $R^{a8}$, $R^{a9}$, $R^{a10}$ and $R^{a11}$ is, independently, any described herein. In some embodiments, each of $R^{N1}$, $R^{N2}$, $R^{N3}$, $R^{N4}$, $R^{N5}$, $R^{N6}$, $R^{N7}$, $R^{N8}$, $R^{N9}$, $R^{N10}$, and $R^{N11}$ is, independently, H or optionally substituted $C_{1-12}$ alkyl. In other embodiments, each of $R^{a6}$, $R^{a7}$, $R^{a8}$, $R^{a9}$, $R^{a10}$, and $R^{a11}$ is, independently, absent, a covalent bond, H, or optionally substituted $C_{1-12}$ alkyl.

Any of the structures herein, as well as compositions including such structures, can be synthesized in any useful manner. Synthetic methods can be designed to introduce a linker or a linker portion to the poly(phenylene) polymer (e.g., a pendent aryl group and/or a backbone aryl group of the polymer). Provided herein are two exemplary methods for preparing the poly(phenylene)-based anion exchange polymer electrolytes, as seen in Scheme A and Scheme B, which are described in further detail. Scheme A relies on forming a linker by a Suzuki cross-coupling reaction with the poly(phenylene) polymer substructure. Scheme B relies on forming a linker by way of a Friedel-Crafts acylation reaction.

Scheme A

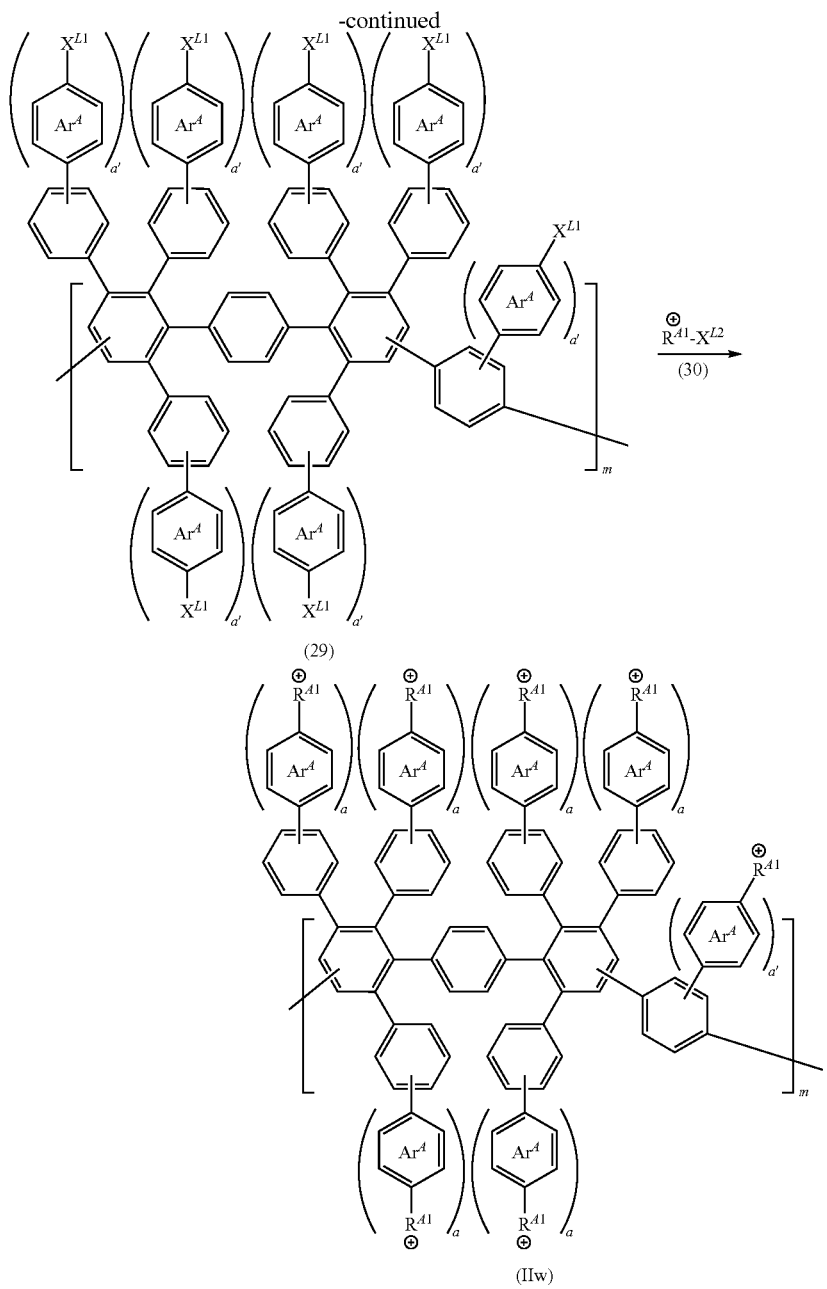

As shown in Scheme A, the polymer of formula (IIw) can be formed by providing a DAPP polymer (e.g., any described herein, such as having a structure of formula (I) or (27)), performing a first substitution reaction to introduce X to the parent structure, performing a second substitution reaction to introduce an $Ar^4$ group (e.g., by way of a Suzuki cross-coupling reaction), and then performing a third substitution reaction to introduce a cationic functionality $R^{A1}$ in proximity to the aryl ring of the $Ar^4$ group. These steps are described in more detail below.

The DAPP polymer (27) in Scheme A can be formed in any useful manner. In one instance, similar to Scheme IIb, the DAPP polymer (27) is formed by way of a Diels-Alder reaction between the optionally substituted diene and the optionally substituted dienophile.

The first step includes an initial substitution reaction, which is performed with a reagent including X in the presence of the DAPP polymer (27), thereby providing a further substituted polymer (28), in which each x is, independently, any useful integer (e.g., 0, 1, 2, 3, 4, or 5). Exemplary X and reagents including X are described herein (e.g., in which X is bromine for use in a Suzuki cross-coupling reaction).

The second step includes a further substitution reaction to introduce an $Ar^4$ aryl group to one or more pendent and/or backbone aryl groups of the DAPP polymer. In one instance, the reagent (13*) is a phenylboronic reagent including any useful ligand $X^{L*}$ (e.g., any described herein, such as optionally substituted $C_{1-12}$ alkyl, or in which a combination of two $X^{L*}$ is an optionally substituted alkylene which, taken together with the boron to which each is bound, forms a boronate ester), any useful leaving group $X^{L1}$ (e.g., any described herein), and an optionally substituted aryl group Ar$^A$ (e.g., optionally substituted with any substituent described herein, such as that described for R$^1$, R$^3$, R$^4$, or substituents (1)-(47) described herein for aryl, including H, halo, cyano, nitro, nitroso, azido, sulfo, carboxyaldehyde, carboxyl, hydroxyl, amino, amidino, amido, thioamido, optionally substituted C$_{1-12}$ alkyl, or optionally substituted C$_{1-12}$ alkoxy).

Such boronic reagents can be useful to conduct any useful reaction (e.g., a Suzuki cross-coupling reaction). As can be seen, the resultant polymer (29) includes any useful number a' (e.g., where each a' is, independently, any useful integer, such as 0, 1, 2, 3, 4, or 5, such as 1 or 2 on each pendent phenyl group) of Ar$^A$ groups attached by way of a covalent bond to the pendent and/or backbone aryl groups of the DAPP structure. The leaving group X$^{L1}$ provides a reactive functional group that can be employed to further attach a cationic moiety R$^A$, a cationic functionality R$^{A1}$, or a precursor cationic moiety R$^{A*}$.

The third step includes a substitution reaction (e.g., an S$_N$2 nucleophilic substitution reaction) to introduce R$^{A1}$ to the DAPP polymer. In one instance, the reagent (30) is a reagent including any useful leaving group X$^{L2}$ and a cationic functionality R$^{A1}$ (e.g., where exemplary leaving groups and cationic functionalities are any described herein). The number a of R$^A$ groups can be less than or equal to the number a' of reactive groups on each aryl group. As can be seen, the final polymer of structure (IIw) includes one or more cationic functionalities R$^{A1}$ attached by way of a covalent bond to an aryl group Ar$^A$. Optionally, R$^{A1}$ can be introduced in two steps, in which the first step employs a reagent having a precursor cationic moiety and the second step employs an alkylating reagent to form a cationic charge.

In other embodiments, each R$^{A1}$ is, independently, any cationic moiety or cationic functionality described herein (e.g., amidinium, guanidinium, phosphazenium, aminosulfonium, aminosulfoxonium, imidazolium, or pyridinium, as well as salts thereof). Exemplary cationic moieties and cationic functionalities include the following:

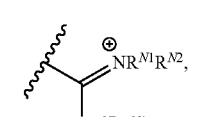
(ii-a)

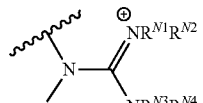
(ii-b)

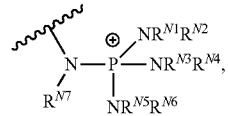
(ii-f)

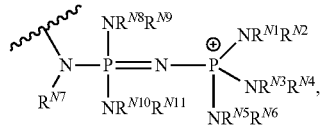
(ii-g)

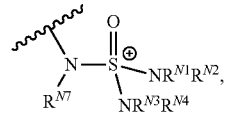
(ii-h)

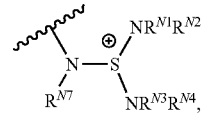
(ii-i)

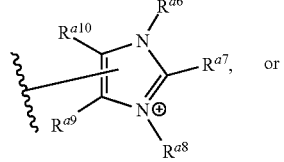
(ii-k)

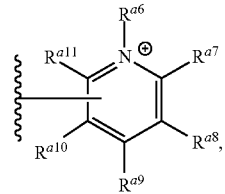
(ii-n)

where each of R$^{N1}$, R$^{N2}$, R$^{N3}$, R$^{N4}$, R$^{N5}$, R$^{N6}$, R$^{N7}$, R$^{N8}$, R$^{N9}$, R$^{N10}$, and R$^{N11}$ is any described herein; and each of R$^{a6}$, R$^{a7}$, R$^{a8}$, R$^{a9}$, R$^{a10}$, and R$^{a11}$ is, independently, any described herein. In some embodiments, each of R$^{N1}$, R$^{N2}$, R$^{N3}$, R$^{N4}$, R$^{N5}$, R$^{N6}$, R$^{N7}$, R$^{N8}$, R$^{N9}$, R$^{N10}$, and R$^{N11}$ is, independently, H or optionally substituted C$_{1-12}$ alkyl. In other embodiments, each of R$^{a6}$, R$^{a7}$, R$^{a8}$, R$^{a9}$, R$^{a10}$, and R$^{a11}$ is, independently, absent, a covalent bond, H, or optionally substituted C$_{1-12}$ alkyl.

Scheme B

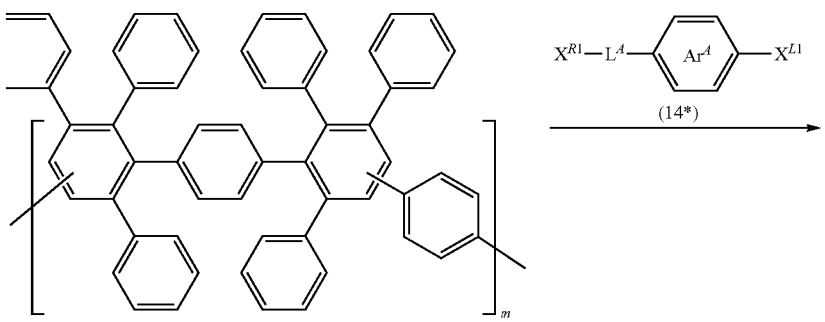

(27)

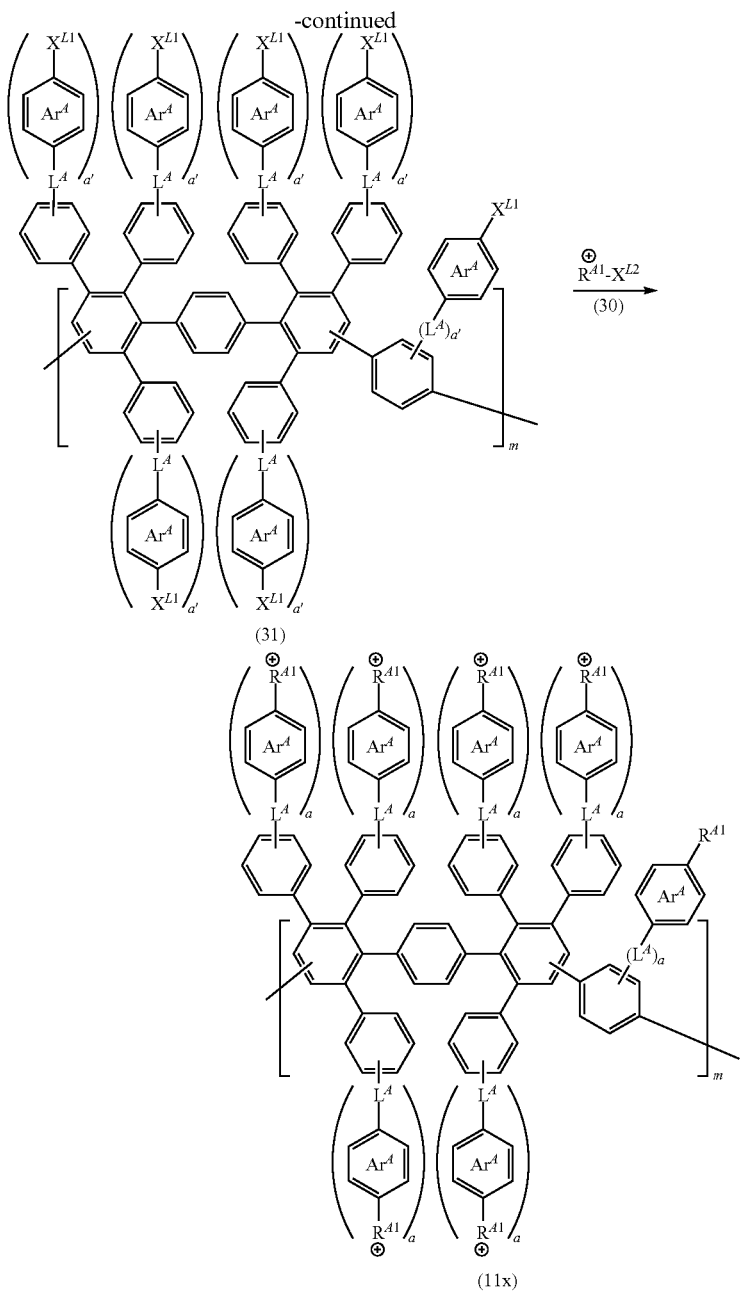

As shown in Scheme B, the polymer of formula (IIx) can be formed by providing a DAPP polymer (e.g., any described herein, such as having a structure of formula (I) or (27)), performing a first substitution reaction to introduce $Ar^A$ to the parent structure, and then performing a second substitution reaction to introduce a cationic functionality $R^{A1}$ in proximity to the aryl ring of the $Ar^A$ group. These steps are described in more detail below.

The DAPP polymer (27) in Scheme B can be formed in any useful manner. In one instance, similar to Scheme IIb, the DAPP polymer (27) is formed by way of a Diels-Alder reaction between the optionally substituted diene and the optionally substituted dienophile.

The first step includes a further substitution reaction to introduce an $Ar^A$ aryl group to one or more pendent and/or backbone aryl groups of the DAPP polymer. In one instance, the reagent (14*) is a reagent including any useful leaving group $X^{R1}$, $X^{L1}$ (e.g., any described herein, such as halo), any useful linker $L^A$ (e.g., any described herein, such as a covalent bond, carbonyl, oxy, thio, sulfonyl, sulfinyl, optionally substituted $C_{1-12}$ alkylene, optionally substituted $C_{1-12}$ alkyleneoxy, optionally substituted $C_{1-12}$ heteroalkylene, or optionally substituted $C_{1-12}$ heteroalkyleneoxy), and an optionally substituted aryl group $Ar^A$. Such a reagent can be useful to conduct any useful reaction (e.g., a Friedel-Crafts alkylation or acylation reaction). As seen in Scheme B, the $L^A$-connected derivative represented by formula (31) is formed by way of a Friedel-Crafts acylation reaction between a poly(phenylene) of formula (27) and a reagent (14*) (e.g., a benzoyl halide or sulfonyl halide).

As can be seen, the resultant polymer (31) includes any useful number a' (e.g., where each a' is, independently, any useful integer, such as 0, 1, 2, 3, 4, or 5) of $Ar^4$ groups attached by way of a linker $L^4$ to the pendent aryl groups of the DAPP structure. The leaving group $X^{L1}$ provides a reactive functional group that can be employed to further attach a cationic moiety $R^4$, a cationic functionality $R^{41}$, or a precursor cationic moiety $R^{4*}$.

The second step includes a substitution reaction (e.g., an $S_N2$ nucleophilic substitution reaction) to introduce $R^{41}$ to the DAPP polymer. In one instance, the reagent (31) is a reagent including any useful leaving group $X^{L2}$ and a cationic functionality $R^{41}$ (e.g., where exemplary leaving groups and cationic functionalities are any described herein). The number a of $R^4$ groups can be less than or equal to the number a' of reactive groups on each aryl group (e.g., where each a is, independently, any useful integer, such as 0, 1, 2, 3, 4, or 5, including 1 or 2). As can be seen, the final polymer of structure (IIx) includes one or more cationic functionalities $R^{41}$ attached by way of a covalent bond to an aryl group $Ar^4$. Optionally, $R^{41}$ can be introduced in two steps, in which the first step employs a reagent having a precursor cationic moiety and the second employs an alkylating reagent to form the cationic charge. Exemplary $R^{41}$ groups are described herein (e.g., for Scheme A or any other cationic moiety or cationic functionality described herein).

In addition, rather than a covalent bond, other linkers may be present between the aryl group $Ar^4$ and the cationic functionality $R^{41}$, such as a linker $L^{41}$ (e.g., any described herein).

Example 2: Polymers Having Carbonyl-Containing Linkers

Figure 7:
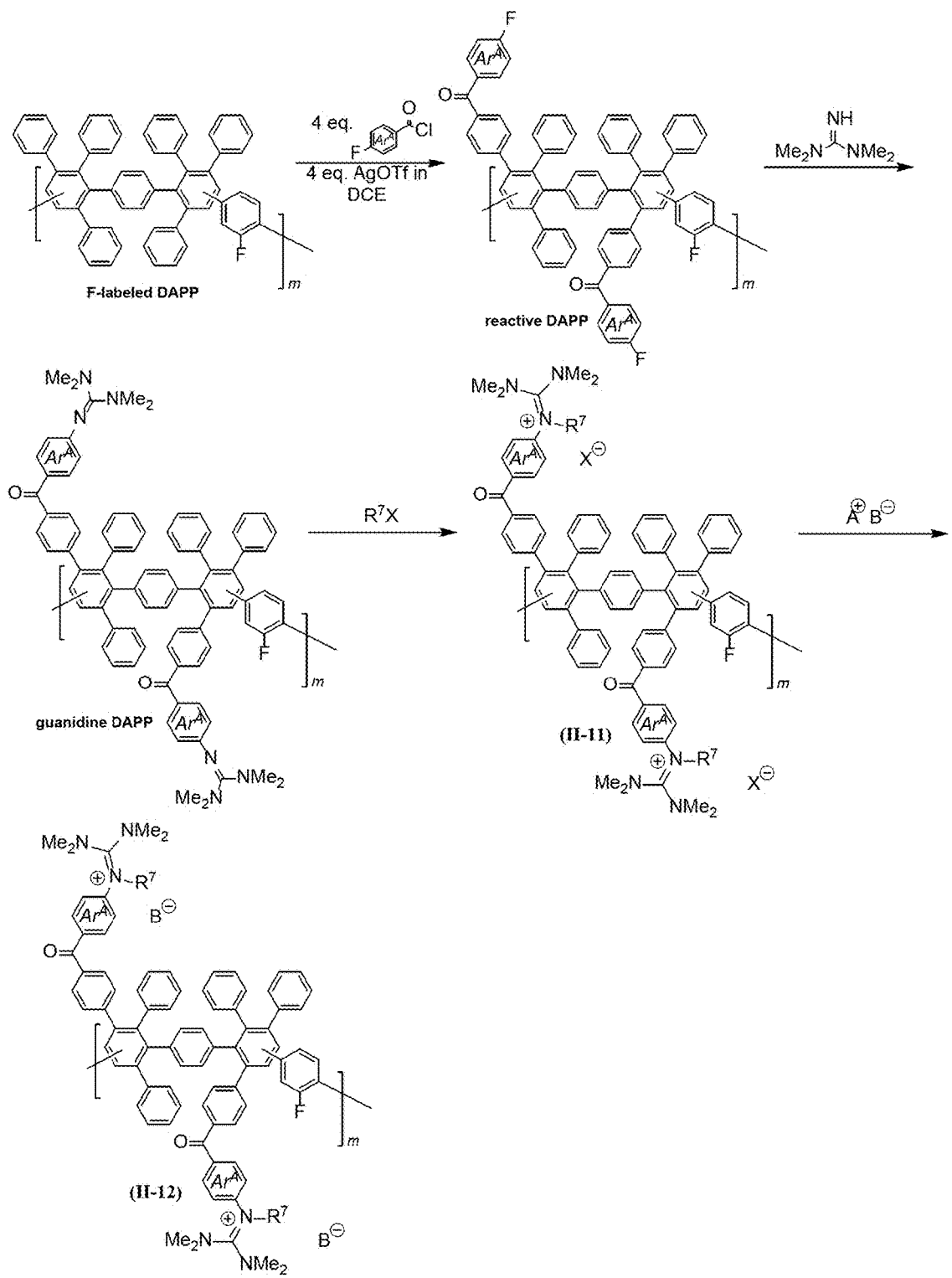
FIG. 7 shows a schematic of an exemplary reaction scheme to provide polymer structures with one or more cationic moieties including an alkylated guanidinium moiety. In this scheme, the aryl group is first installed on the DAPP structure, and then the precursor cationic moiety is installed. Provided is an exemplary reaction of a labeled Diels-Alder poly(phenylene) polymer (labeled "F-labeled DAPP") in the presence of a reagent including an aryl group (e.g., Ar—C(O)—X, such as (F)-Phe-C(O)—Cl) to from a reactive DAPP having two reactive handles $R^H$ including an aryl group. Then, the reactive DAPP is reacted with a precursor cationic moiety (e.g., a guanidine reagent, such as 1,1,3,3-tetramethyl guanidine) to produce guanidine DAPP, which in turn is reacted with a reagent (e.g., an alkylating reagent $R^7X$) to form a guanidinium DAPP (II-11) having two cationic moieties. Finally, an optional anion exchange reaction can be conducted to form a guanidinium DAPP (II-12) having an anionic moiety B.

The anion exchange polymers can include any useful linker, which can be installed in any useful manner. For instance, FIG. 7 shows an exemplary schematic that can be described generically as follows. First, the initial DAPP structure can be reacted to provide a reactive DAPP, which has one or more reactive handles and a linker including —C(O)—. The initial DAPP structure can be any described herein (e.g., having a structure of formula (I) or (IA)). Then, a precursor cationic moiety can be installed, and an alkylation reaction can be performed to form the cationic moiety. Finally, an optional anion exchange reaction can be performed to provide an anionic moiety B. As can be seen, this scheme allows an aryl group and a cationic functionality to be installed in a step-wise manner. For instance, a first step can include use of a reactive handle having an $Ar^4$ aryl group, and a second step can include use of a precursor cationic moiety to install this moiety on the $Ar^4$ aryl group of the reactive handle.

As seen in FIG. 7, a substitution reaction is performed in the presence of a F-labeled DAPP and a reagent $R^H$—X including $Ar^4$ (here, (p-F)Ph-C(O)Cl) in the optional presence of a metal salt (here, AgOTf). If included, the metal salt can include any useful compound, such as $O(SO_2—R^{MF})]$, $M[N(SO_2—R^{MF})_2]$, or $M[C(SO_2—R^{MF})_3]$, where $R^{MF}$ is optionally substituted alkyl, optionally substituted aryl, optionally substituted alkaryl, optionally substituted haloalkyl, or perfluoroalkyl, and where M is Ag, Al, Ba, Bi, Ca, Cu, In, Re, Sc, Sn, Ti, Y, Yb, or Zn. Particular embodiments of metal salts include $M[OTf]_{mf}$, where mf is an integer from 1 to 3 and where M is Ag, Al, Ba, Bi, Ca, Cu, In, Sc, Y, or Yb; as well as $M[NTf_2]_{mf}$, where mf is an integer from 1 to 3 and where M is Ag, Al, Sn, Ti, Yb, or Zn.

The reactive DAPP is then reacted with a precursor cationic moiety (here, 1,1,3,3,-tetramethyl guanidine or TMG), which reacts with the halide of the reactive handle. The carbonyl linker (—C(O)—) is also part of the reactive handle, and this linker connects the pendent aryl group with another aryl group $Ar^4$. This aryl group $Ar^4$, in turn, is connected to the cationic moiety or cationic functionality. As seen in FIG. 7, the reaction between the reactive DAPP and TMP results in guanidine DAPP.

Next, the precursor cationic moiety is alkylated with an alkylating reagent (e.g., $R^7X$, in which $R^7$ is an optionally substituted alkyl group and X is a leaving group, such as any described herein), thereby providing an $R^7$-alkylated guanidinium moiety having a cationic charge and optionally complexed to an anion X. The resultant polymer structure has formula (II-11), which includes a cationic moiety in proximity to aryl group $Ar^4$ and further includes a carbonyl linker attaching $Ar^4$ to a pendent aryl group of the DAPP structure.

Finally, an optional anion exchange reaction is conducted in the presence of a salt AB, which results in a polymer having formula (II-12) with anionic moiety B. In this way, any useful anionic salt form can be synthesized.

Example 3: Polymers Having Sulfonyl-Containing Linkers

Figure 8:
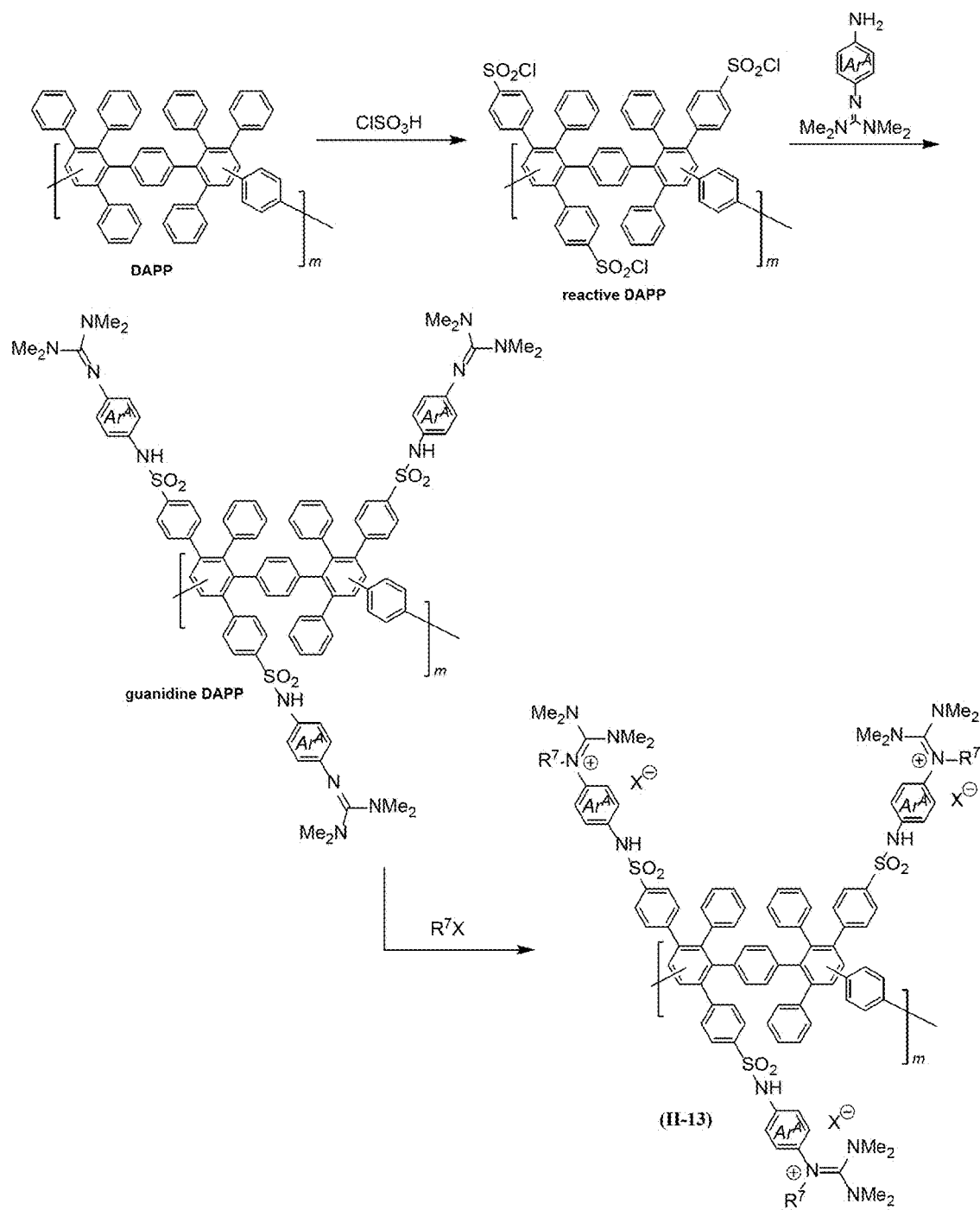
FIG. 8 shows a schematic of another exemplary reaction scheme to provide polymer structures with one or more cationic moieties including an alkylated guanidinium moiety. In this scheme, the aryl group and the precursor cationic moiety is installed at the same time. Provided is an exemplary reaction of a Diels-Alder poly(phenylene) polymer (DAPP) in the presence of a reagent to install a reactive handle (e.g., a handle including a sulfonyl group, such as —SO$_2$Cl), thereby forming a reactive DAPP. Then, this structure is reacted with an aryl group further including a precursor cationic moiety (e.g., an aryl guanidine reagent) to produce guanidine DAPP, which in turn is reacted with a reagent (e.g., an alkylating reagent $R^7X$) to form a guani-dinium DAPP (II-13) having three cationic moieties. Optionally, an anion exchange reaction can be conducted to form a DAPP having an anionic moiety B (e.g., any described herein).

In another instance, the $Ar^4$ aryl group and the $R^{41}$ cationic functionality (or the $Ar^4$ aryl group and a precursor cationic functionality $R^{41*}$) is installed at the same time. Furthermore, the linker can include any useful functional group, such as a sulfonyl (—S(O)$_2$—) or a sulfoneamide (—S(O)$_2$—NR$^{L3}$— or —NR$^{L3}$—S(O)$_2$—, in which $R^{L3}$ is any useful moiety group). FIG. 8 provides an exemplary synthetic scheme including such linkers.

As seen in FIG. 8, a substitution reaction is performed in the presence of an initial DAPP and a reagent $R^H$—X (here, ClSO$_3$H) to provide a reactive DAPP. The initial DAPP can be any described herein (e.g., having a structure of formula (I) or (IA)). Furthermore, $R^H$—X can be chosen to include a linker portion (here, the —S(O)$_2$— portion of a sulfonamide linker), as well as a halide that is reactive.

Next, the reactive DAPP is reacted with a precursor cationic moiety (here, N-(4-aminophenyl)-1,1,3,3,-tetramethylguanidine), which reacts with the halide of the reactive handle, thereby providing guanidine DAPP. As can be seen, the reagent providing the precursor cationic moiety can be chosen to include a linker portion (here, the —NH— portion of a sulfonamide linker) and to include the precursor cationic moiety in proximity to the aryl group $Ar^4$.

Then, the precursor cationic moiety is alkylated with an alkylating reagent (e.g., $R^7X$, in which $R^7$ is an optionally substituted alkyl group and X is a leaving group, such as any described herein), thereby providing an $R^7$-alkylated guanidinium moiety having a cationic charge and optionally complexed to an anion X. The resultant polymer structure has formula (II-13), which includes a cationic moiety in proximity to aryl group $Ar^4$ and includes a sulfonamide linker attaching $Ar^4$ to a pendent aryl group of the DAPP structure. Optionally, an anion exchange reaction is conducted in the presence of a salt AB, which results in a polymer with anionic moiety B.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A composition comprising a structure having the formula (III):

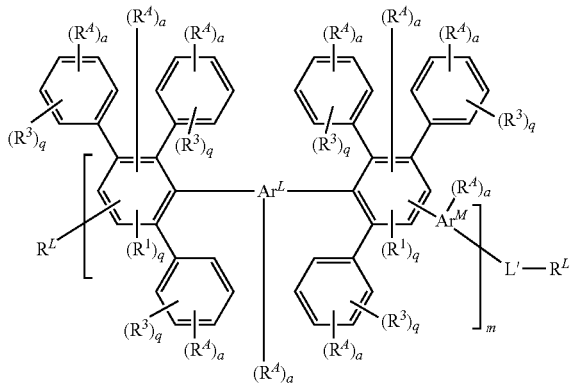

(III)

or a salt thereof or a form thereof including a counter ion, wherein:

each $R^A$ comprises an aryl group and a cationic functionality, wherein the aryl group is selected from the consisting of an optionally substituted aryl, optionally substituted alkaryl, optionally substituted arylalkoxy, optionally substituted aryloxy, optionally substituted aryloxycarbonyl, optionally substituted aryloyl, optionally substituted arylcarbonylalkyl, optionally substituted arylsulfonyl, and optionally substituted arylsulfonylalkyl;

each $R^1$ and $R^3$ is, independently, H, halo, cyano, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$, wherein $R^S$ is an acidic moiety comprising a sulfonyl group, $R^P$ is an acidic moiety comprising a phosphoryl group, $R^C$ is an acidic moiety comprising a carbonyl group, and $R^F$ is an electron-withdrawing moiety;

each $Ar^L$ is, independently, a bivalent linker comprising optionally substituted arylene;

each $Ar^M$ is, independently, a bivalent linker comprising optionally substituted arylene;

each q is, independently, an integer of from 0 to 5, in which each q for $R_1$ is, independently, 0 or 1;

each a is, independently, an integer of from 0 to 5, wherein at least one a is not 0;

m is an integer of from about 1 to 1000;

L' is a sublink; and each $R^L$ is, independently, a reactive end group, wherein at least one $R^A$ is disposed on a pendent aryl group of formula (III).

2. The composition of claim 1, wherein L' comprises a covalent bond, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, optionally substituted $C_{4-18}$ aryleneoxy, optionally substituted polyphenylene, or a structure of formula (II):

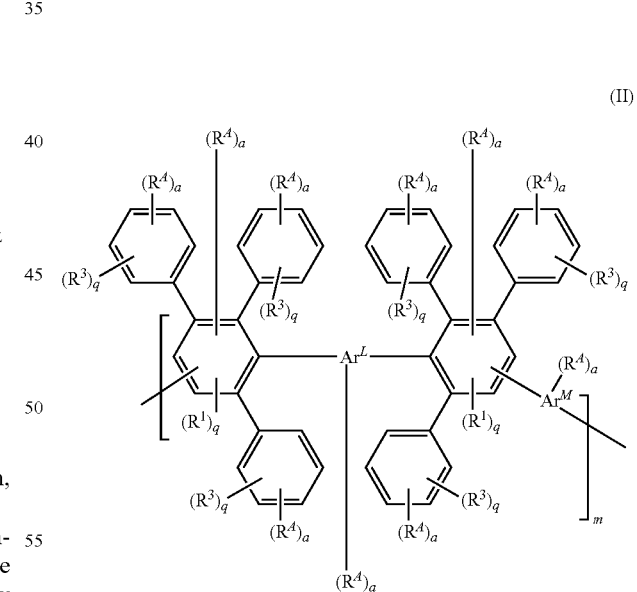

(II)

or a salt thereof or a form thereof including a counter ion.

3. The composition of claim 1, wherein $R^L$ is optionally substituted $C_{5-19}$ aryloyl or optionally substituted $C_{4-18}$ aryl.

4. The composition of claim 1, wherein the composition comprises a structure having the formula (IIIa) or (IIIb):

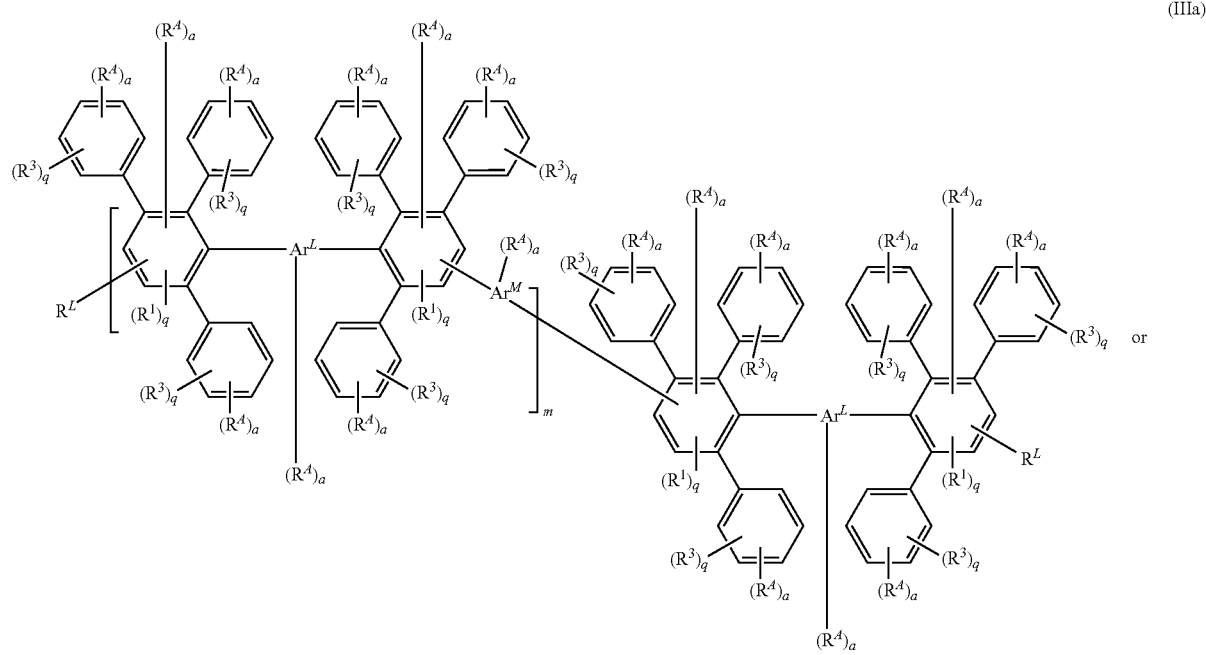
(IIIa)
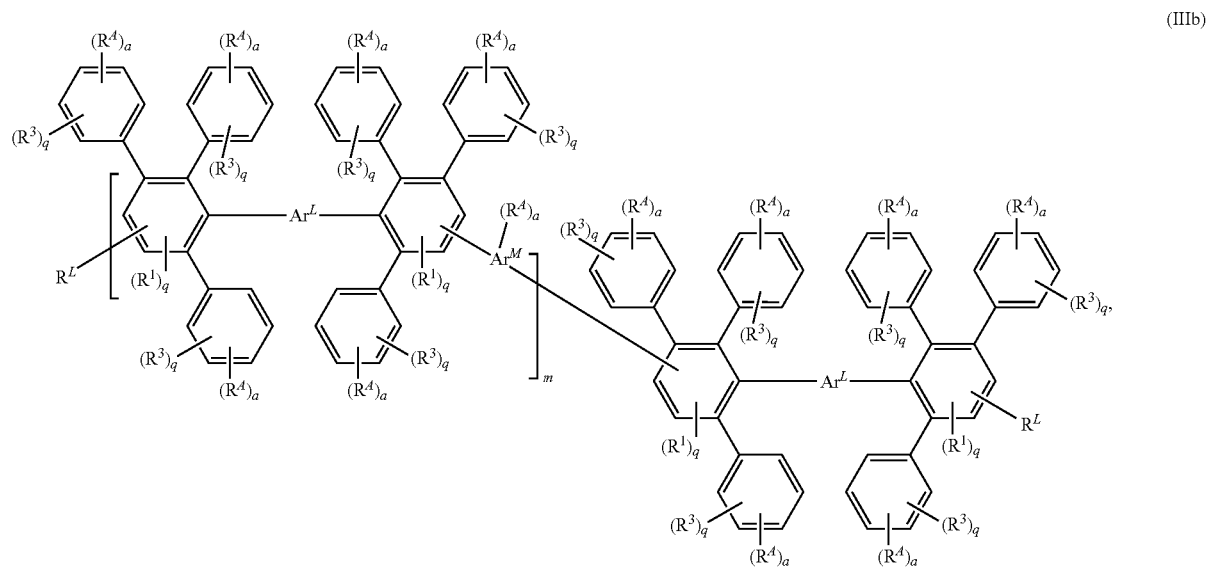
(IIIb)
or a salt thereof or a form thereof including a counter ion.

5. A composition comprising a structure having the formula (IV):

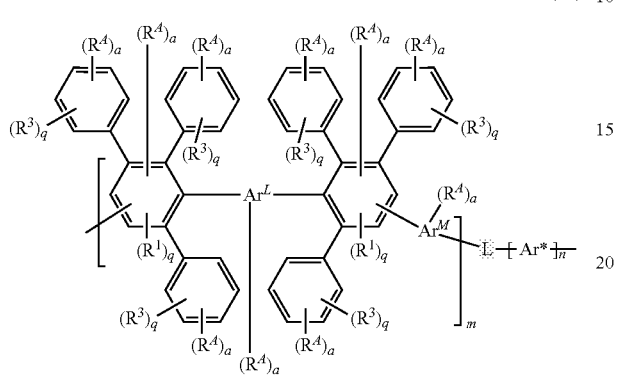

or a salt thereof or a form thereof including a counter ion, wherein:

each $R^A$ comprises an aryl group and a cationic functionality, wherein the aryl group is selected from the consisting of an optionally substituted aryl, optionally substituted alkaryl, optionally substituted arylalkoxy, optionally substituted aryloxy, optionally substituted aryloxycarbonyl, optionally substituted aryloyl, optionally substituted arylcarbonylalkyl, optionally substituted arylsulfonyl, and optionally substituted arylsulfonylalkyl;

each $R^1$ and $R^3$ is, independently, H, halo, cyano, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, $R^S$, $R^P$, $R^C$, or $R^F$, wherein $R^S$ is an acidic moiety comprising a sulfonyl group, $R^P$ is an acidic moiety comprising a phosphoryl group, $R^C$ is an acidic moiety comprising a carbonyl group, and $R^F$ is an electron-withdrawing moiety;

each $Ar^L$ is, independently, a bivalent linker comprising optionally substituted arylene;

each $Ar^M$ is, independently, a bivalent linker comprising optionally substituted arylene;

each q is, independently, an integer of from 0 to 5, in which each q for $R_1$ is, independently, 0 or 1;

each a is, independently, an integer of from 0 to 5, wherein at least one a is not 0;

each of m and n is, independently, an integer of from about 1 to 1000;

L is a linking segment; and

Ar* is a hydrophobic segment, wherein at least one $R^A$ is disposed on a pendent aryl group of formula (IV).

6. The composition of claim 5, wherein the composition comprises a structure having the formula (V) or (Va):

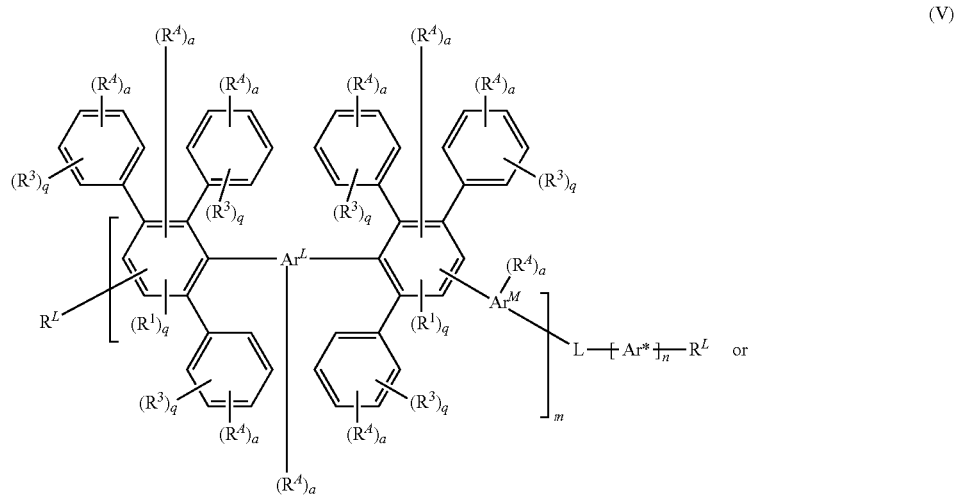

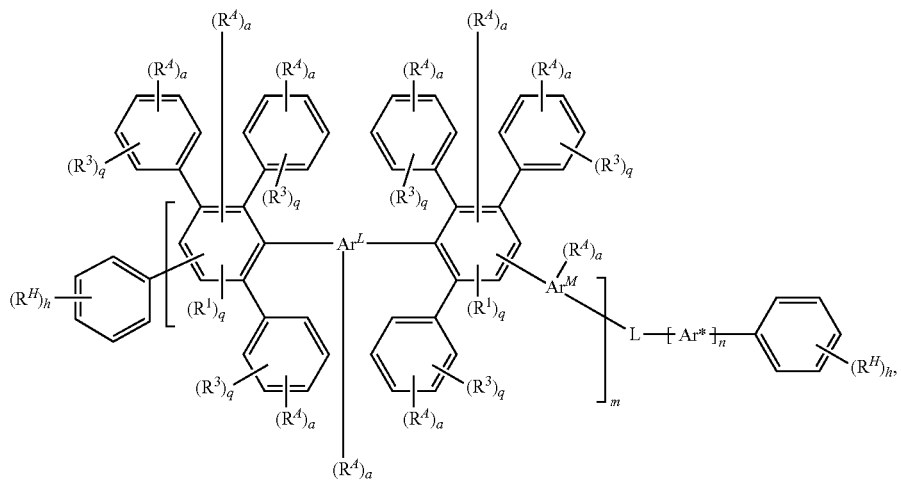

(Va)

or a salt thereof or a form thereof including a counter ion, and wherein:

each $R^L$ is, independently, a reactive end group;
each $R^H$, if present, is, independently, H, optionally substituted $C_{1-12}$ alkyl, optionally substituted $C_{1-12}$ haloalkyl, optionally substituted $C_{1-12}$ heteroalkyl, halo, optionally substituted $C_{1-12}$ perfluoroalkyl, optionally substituted $C_{4-18}$ aryl, optionally substituted $C_{1-6}$ alk-$C_{4-18}$ aryl, optionally substituted $C_{4-18}$ aryl-$C_{1-6}$ alkoxy, optionally substituted $C_{4-18}$ aryloxy, optionally substituted $C_{5-19}$ aryloxycarbonyl, optionally substituted $C_{5-19}$ aryloyl, optionally substituted $C_{4-18}$ arylcarbonyl-$C_{1-6}$ alkyl, optionally substituted $C_{4-18}$ arylsulfonyl, or optionally substituted $C_{4-18}$ arylsulfonyl-$C_{1-6}$ alkyl; and
each h, if present, is, independently, an integer of from 0 to 5, wherein at least one h is not 0.

7. A composition of claim 5, wherein the composition is a polymer or a solid membrane.

8. The composition of claim 1, wherein:
at least one $R^A$ is -$L^A$-$Ar^A$ or a salt thereof or a form thereof including a counter ion;
$L^A$ is a covalent bond, carbonyl, oxy, thio, azo, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy; and
$Ar^A$ is an optionally substituted aryl comprising one or more cationic functionalities.

9. The composition of claim 1, wherein:
at least one $R^A$ is

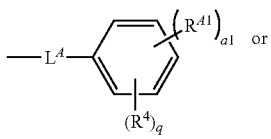

(ii-1)

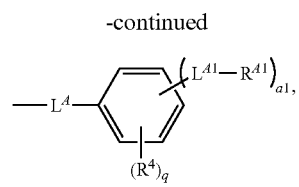

(ii-2)

or a salt thereof or a form thereof including a counter ion;
each $L^A$ and $L^{A1}$ is, independently, a covalent bond, carbonyl, oxy, thio, azo, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy;
each $R^4$ is, independently, H, halo, cyano, nitro, nitroso, azido, sulfo, carboxyaldehyde, carboxyl, hydroxyl, amino, amidino, amido, thioamido, optionally substituted $C_{1-12}$ alkyl, optionally substituted $C_{1-12}$ haloalkyl, optionally substituted $C_{1-12}$ perfluoroalkyl, optionally substituted $C_{1-12}$ heteroalkyl, optionally substituted $C_{1-12}$ alkoxy, $R^S$, $R^P$, $R^C$, or $R^F$, wherein $R^S$ is an acidic moiety comprising a sulfonyl group, $R^P$ is an acidic moiety comprising a phosphoryl group, $R^C$ is an acidic moiety comprising a carbonyl group, and $R^F$ is an electron-withdrawing moiety;
each $R^{A1}$ is, independently, a cationic functionality;
each q is, independently, an integer of from 1 to 5; and
each a1 is, independently, an integer of from 1 to 5.

10. The composition of claim 8, wherein:
$L^A$ is a covalent bond, carbonyl, sulfonyl, —$NR^{L3}$—, —$CR^{L1}$=N—, —$(CR^{L1}R^{L2})_{La}$—, —$C(O)NR^{L3}$—, —$NR^{L3}C(O)$—, —$PR^{L3}$—, —$SO_2NR^{L3}$—, —$NR^{L3}SO_2$—, —$(CR^{L1}R^{L2})_{La}$—$C(O)$—$(CR^{L1}R^{L2})_{Lb}$—, —$(CRL R^{L2})_{La}$—$SO_2$—$(CR^{L1}R^{L2})_{Lb}$—, —$(CR^{L1}R^{L2})_{La}$—$C(O)NR^{L3}$—$(CR^{L1}R^{L2})_{Lb}$—, —$(CRL R^{L2})_{La}$—$NR^{L3}C(O)$—$(CR^{L1}R^{L2})_{Lb}$—, —$(CR^{L1}R^{L2})_{La}$—$SO_2NR^{L3}$—$(CRL R^{L2})_{Lb}$—, or —$(CRL R^{L2})_{La}$—$NR^{L3} SO_2$—$(CR^{L1}R^{L2})_{Lb}$—;
each of $R^{L1}$, $R^{L2}$, and $R^{L3}$ is, independently, H, halo, optionally substituted $C_{1-12}$ alkyl, optionally substituted $C_{1-12}$ haloalkyl, optionally substituted $C_{1-12}$ alkoxy, optionally substituted $C_{4-18}$ aryl, or optionally substituted $C_{1-6}$ alk-$C_{4-18}$ aryl; and
each of La and Lb is, independently, an integer of from 0 to 10, wherein at least one of La or Lb is not 0.
11. The composition of claim 1, wherein:
the cationic functionality is selected from the group consisting of:
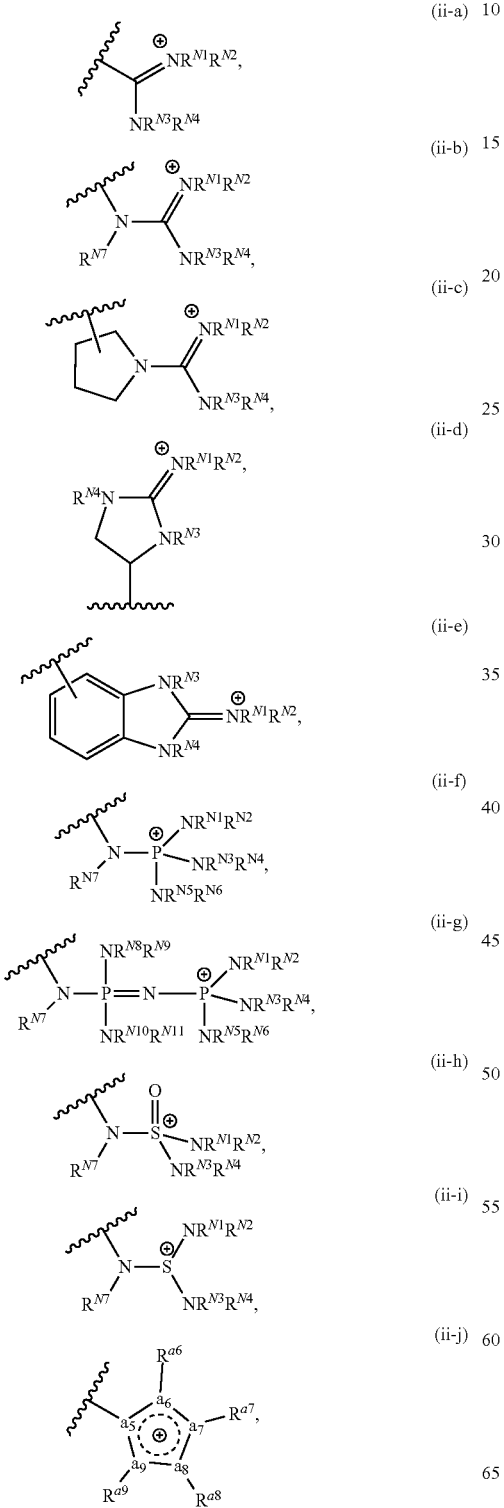
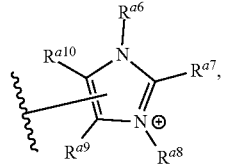
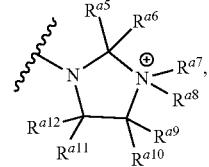
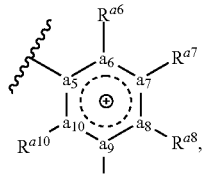
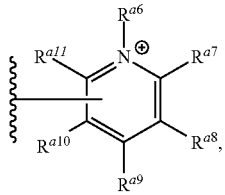
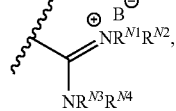
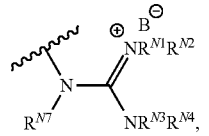
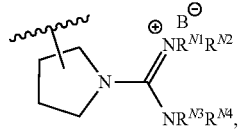
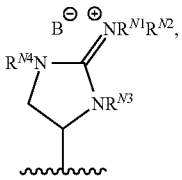
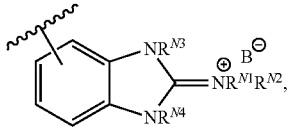

-continued

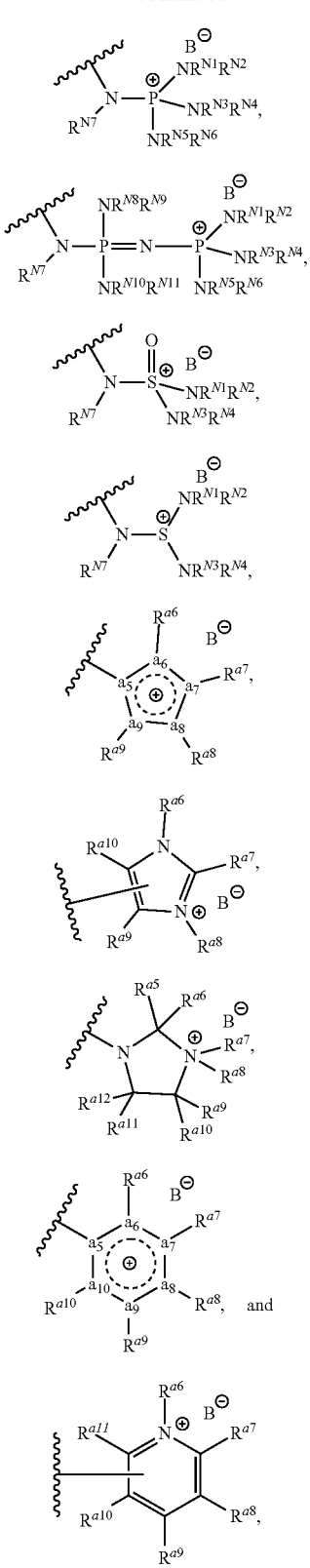

(iii-f)
(iii-g)
(iii-h)
(iii-i)
(iii-j)
(iii-k)
(iii-l)
(iii-m)
(iii-n)

or a salt thereof or a form thereof including a counter ion;
each of $R^{N1}$, $R^{N2}$, $R^{N3}$, $R^{N4}$, $R^{N5}$, $R^{N6}$, $R^{N7}$, $R^{N8}$, $R^{N9}$, $R^{N10}$, and $R^{N11}$ is, independently, H, halo, cyano, nitro, nitroso, azido, sulfo, carboxyaldehyde, carboxyl, hydroxyl, amino, amidino, amido, thioamido, dithiocarboxyamino, optionally substituted $C_{1-12}$ alkyl, optionally substituted $C_{3-12}$ cycloalkyl, optionally substituted $C_{1-12}$ alkanoyl, optionally substituted $C_{1-12}$ alkoxy, optionally substituted heterocyclyl, optionally substituted $C_{4-18}$ aryl, optionally substituted $C_{1-6}$ alk-$C_{4-18}$ aryl, or optionally substituted $C_{4-18}$ aryloxy, and wherein a combination of $R^{N1}$ and $R^{N2}$, a combination of $R^{N1}$ and $R^{N3}$, a combination of $R^{N1}$ and $R^{N4}$, a combination of $R^{N3}$ and $R^{N4}$, or a combination of $R^{N5}$ and $R^{N6}$, taken together with the nitrogen atom to which each are attached, can form a heterocyclyl group;

each of $R^{a5}$, $R^{a6}$, $R^{a7}$, $R^{a8}$, $R^{a9}$, $R^{10}$, $R^{a11}$, and $R^{a12}$ is, independently, absent, a covalent bond, H, or optionally substituted alkyl, wherein a combination of $R^{a6}$ and $R^{a7}$, a combination of $R^{a7}$ and $R^{a8}$, a combination of $R^{a8}$ and $R^{a9}$, a combination of $R^{a9}$ and $R^{a10}$, a combination of $R^{a10}$ and $R^{a11}$, or a combination of $R^{a11}$ and $R^{a12}$, taken together with the parent atom to which each are attached, can form a heterocyclyl group or an aryl group;

each of $a_5$, $a_6$, $a_7$, $a_8$, $a_9$, and $a_{10}$ is, independently, C, N, O, or S, in which at least one of $a_5$, $a_6$, $a_7$, $a_8$, and $a_9$ within a five-membered ring is N, O, or S and at least one of $a_5$, $a_6$, $a_7$, $a_8$, $a_9$, and $a_{10}$ within a six-membered ring is N, O, or S; and each B is, independently, an anionic moiety.

12. The composition of claim 1, wherein at least one $R^A$ is an optionally substituted $C_{4-18}$ aryl, optionally substituted $C_{1-6}$ alk-$C_{4-18}$ aryl, optionally substituted $C_{4-18}$ aryl-$C_{1-6}$ alkoxy, optionally substituted $C_{4-18}$ aryloxy, optionally substituted $C_{5-19}$ aryloxycarbonyl, optionally substituted $C_{7-11}$ aryloyl, optionally substituted $C_{4-18}$ arylcarbonyl-$C_{1-6}$ alkyl, optionally substituted $C_{4-18}$ arylsulfonyl, or optionally substituted $C_{4-18}$ arylsulfonyl-$C_{1-6}$ alkyl.

13. The composition of claim 1, wherein:
$R^S$ is —$SO_2$—$R^{S1}$ or —$SO_2$—$NR^{N1}$—$R^{S2}$ or —$SO_2$—$NR^{N1}$—$SO_2$—$R^{S3}$, wherein each $R^{S1}$ is, independently, H, hydroxyl, optionally substituted $C_{1-12}$ alkyl, optionally substituted $C_{1-12}$ haloalkyl, optionally substituted $C_{1-12}$ perfluoroalkyl, optionally substituted $C_{4-18}$ aryl, or optionally substituted $C_{1-6}$ alk-$C_{4-18}$ aryl; each $R^{N1}$ is, independently, H, optionally substituted $C_{1-12}$ alkyl, optionally substituted $C_{4-18}$ aryl, or optionally substituted $C_{1-6}$ alk-$C_{4-18}$ aryl; each $R^{S2}$ is, independently, H, hydroxyl, optionally substituted $C_{1-12}$ alkyl, optionally substituted $C_{1-12}$ alkylsulfonyl, optionally substituted $C_{4-18}$ aryl, or optionally substituted $C_{1-6}$ alk-$C_{4-18}$ aryl; and each $R^{S3}$ is, independently, H, hydroxyl, optionally substituted $C_{1-12}$ alkyl, optionally substituted $C_{1-12}$ haloalkyl, optionally substituted $C_{1-12}$ perfluoroalkyl, optionally substituted $C_{4-18}$ aryl, or optionally substituted $C_{1-6}$ alk-$C_{4-18}$ aryl;

$R^P$ is —$P(O)(OH)_2$ or —O—$PO(OH)_2$ or —$P(O)$<$R^{P1}R^{P2}$ or —$P(O)$<$R^{Ar}R^{P2}$ or —$P(O)$<$R^{Ar}R^{Ar}$ wherein each of $R^{P1}$ and $R^{P2}$ is, independently, H, hydroxyl, optionally substituted $C_{1-12}$ alkyl, optionally substituted $C_{1-12}$ alkoxy, optionally substituted $C_{4-18}$ aryl, optionally substituted $C_{1-6}$ alk-$C_{4-18}$ aryl, or optionally substituted $C_{4-18}$ aryloxy; and each $R^{Ar}$ is, independently, optionally substituted $C_{4-18}$ aryl, optionally substituted $C_{1-6}$ alk-$C_{4-18}$ aryl, or optionally substituted $C_{4-18}$ aryloxy;

$R^C$ is —$CO_2H$ or —C(O)—$R^{C1}$ or —$R^{CA}$—C(O)—$R^{C1}$, wherein each $R^{C1}$ is, independently, H, hydroxyl, optionally substituted $C_{1-12}$ alkyl, optionally substituted $C_{1-12}$ alkoxy, optionally substituted $C_{4-18}$ aryl, optionally substituted $C_{1-6}$ alk-$C_{4-18}$ aryl, or optionally substituted $C_{4-18}$ aryloxy; and each $R^{CA}$ is, independently, oxy, optionally substituted $C_{1-12}$ alkylene, or optionally substituted $C_{1-12}$ heteroalkylene; and $R^F$ is carboxyaldehyde, optionally substituted $C_{1-12}$ alkyl, optionally substituted $C_{2-13}$ alkanoyl, or optionally substituted $C_{5-19}$ aryloyl.

14. The composition of claim 1, wherein $Ar^L$ and/or $Ar^M$ is optionally substituted phenylene, optionally substituted naphthylene, or optionally substituted phenanthrylene; wherein the optional substitution for $Ar^L$ is $R^A$, $R^S$, $R^P$, $R^C$, or $R^F$; and wherein the optional substitution for $Ar^M$ is $R^A$, $R^S$, $R^P$, $R^C$, $R^F$, or a label.

15. The composition of claim 5, wherein:
at least one $R^A$ is $-L^A$-$Ar^A$ or a salt thereof or a form thereof including a counter ion;
$L^A$ is a covalent bond, carbonyl, oxy, thio, azo, sulfonyl, sulfinyl, sulfonamide, imino, imine, phosphine, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, or optionally substituted $C_{4-18}$ aryleneoxy; and
$Ar^A$ is an optionally substituted aryl comprising one or more cationic functionalities.

16. The composition of claim 15, wherein:
$L^A$ is a covalent bond, carbonyl, sulfonyl, —$NR^{L3}$—, —$CR^{L1}$=N—, —$(CR^{L1}R^{L2})_{La}$—, —$C(O)NR^{L3}$—, —$NR^{L3}C(O)$—, —$PR^{L3}$—, —$SO_2NR^{L3}$—, —$NR^{L3}SO_2$—, —$(CR^{L1}R^{L2})_{La}$—$C(O)$—$(CR^{L1}R^{L2})_{Lb}$—, —$(CR^{L1}R^{L2})_{La}$—$SO_2$—$(CR^{L1}R^{L2})_{Lb}$—, —$(CR^{L1}R^{L2})_{La}$—$C(O)NR^{L3}$—$(CR^{L1}R^{L2})_{Lb}$—, —$(CR^{L1}R^{L2})_{La}$—$NR^{L3}C(O)$—$(CR^{L1}R^{L2})_{Lb}$—, —$(CR^{L1}R^{L2})_{La}$—$SO_2NR^{L3}$—$(CR^{L1}R^{L2})_{Lb}$—, or —$(CR^{L1}R^{L2})_{La}$—$NR^{L3}SO_2$—$(CR^{L1}R^{L2})_{Lb}$—;
each of $R^{L1}$, $R^{L2}$, and $R^{L3}$ is, independently, H, halo, optionally substituted $C_{1-12}$ alkyl, optionally substituted $C_{1-12}$ haloalkyl, optionally substituted $C_{1-12}$ alkoxy, optionally substituted $C_{4-18}$ aryl, or optionally substituted $C_{1-6}$ alk-$C_{4-18}$ aryl; and
each of La and Lb is, independently, an integer of from 0 to 10, wherein at least one of La or Lb is not 0.

17. The composition of claim 5, wherein:
the cationic functionality is selected from the group consisting of:

(ii-a)

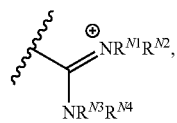

(ii-b)

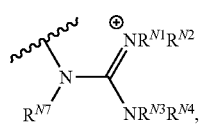

(ii-c)

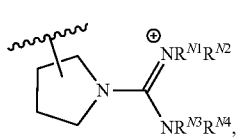

-continued (ii-d)

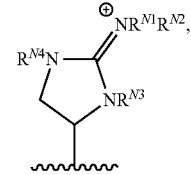

(ii-e)

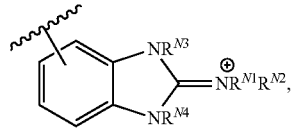

(ii-f)

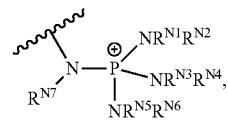

(ii-g)

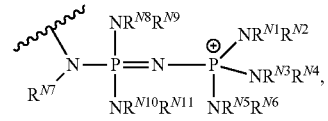

(ii-h)

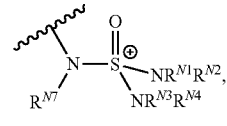

(ii-i)

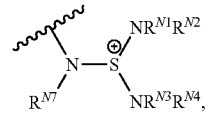

(ii-j)

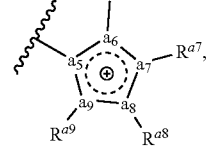

(ii-k)

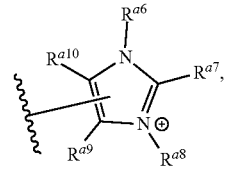

(ii-l)

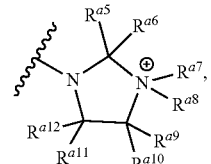

(ii-m)

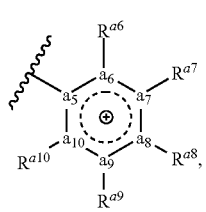

-continued (ii-n)
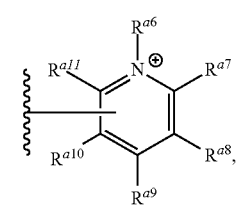

(iii-a)
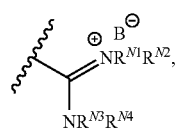

(iii-b)
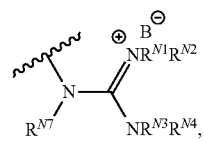

(iii-c)
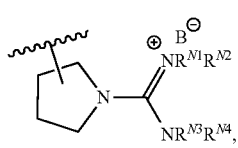

(iii-d)
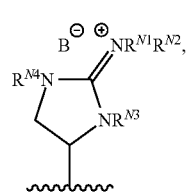

(iii-e)
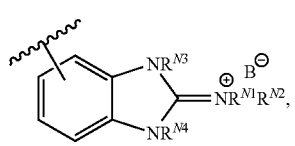

(iii-f)
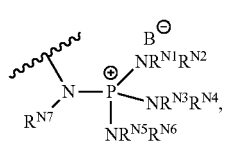

(iii-g)
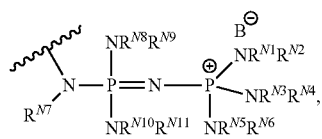

(iii-h)
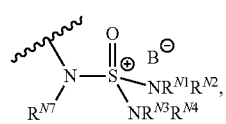

(iii-i)
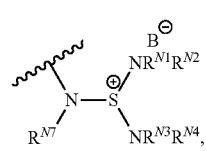

-continued (iii-j)
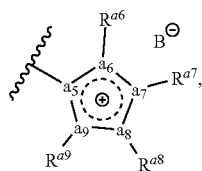

(iii-k)
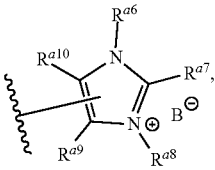

(iii-l)
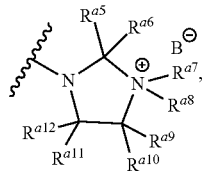

(iii-m)
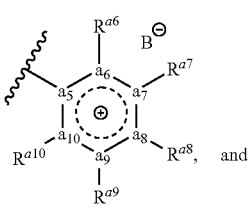

and (iii-n)
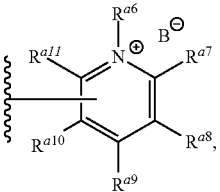

or a salt thereof or a form thereof including a counter ion;
each of $R^{N1}$, $R^{N2}$, $R^{N3}$, $R^{N4}$, $R^{N5}$, $R^{N6}$, $R^{N7}$, $R^{N8}$, $R^{N9}$, $R^{N10}$, and $R^{N11}$ is, independently, H, halo, cyano, nitro, nitroso, azido, sulfo, carboxyaldehyde, carboxyl, hydroxyl, amino, amidino, amido, thioamido, dithiocarboxyamino, optionally substituted $C_{1-12}$ alkyl, optionally substituted $C_{3-12}$ cycloalkyl, optionally substituted $C_{1-12}$ alkanoyl, optionally substituted $C_{1-12}$ alkoxy, optionally substituted heterocyclyl, optionally substituted $C_{4-18}$ aryl, optionally substituted $C_{1-6}$ alk-$C_{4-18}$ aryl, or optionally substituted $C_{4-18}$ aryloxy, and wherein a combination of $R^{N1}$ and $R^{N2}$, a combination of $R^{N1}$ and $R^{N3}$, a combination of $R^{N1}$ and $R^{N4}$, a combination of $R^{N3}$ and $R^{N4}$, or a combination of $R^{N5}$ and $R^{N6}$, taken together with the nitrogen atom to which each are attached, can form a heterocyclyl group;
each of $R^{a5}$, $R^{a6}$, $R^{a7}$, $R^{a8}$, $R^{a9}$, $R^{a10}$, $R^{a11}$, and $R^{a12}$ is, independently, absent, a covalent bond, H, or optionally substituted alkyl, wherein a combination of $R^{a6}$ and $R^{a7}$, a combination of $R^{a7}$ and $R^{a8}$, a combination of $R^{a8}$ and $R^{a9}$, a combination of $R^{a9}$ and $R^{a10}$, a combination of $R^{a10}$ and $R^{a11}$, or a combination of $R^{a11}$ and $R^{a12}$, taken together with the parent atom to which each are attached, can form a heterocyclyl group or an aryl group;
each of $a_5$, $a_6$, $a_7$, $a_8$, $a_9$, and $a_{10}$ is, independently, C, N, O, or S, in which at least one of $a_5$, $a_6$, $a_7$, $a_8$, and $a_9$ within a five-membered ring is N, O, or S and at least one of $a_5$, $a_6$, $a_7$, $a_8$, $a_9$, and $a_{10}$ within a six-membered ring is N, O, or S; and each B is, independently, an anionic moiety.

18. The composition of claim 5, wherein:

$R^S$ is —SO$_2$—R$^{S1}$ or —SO$_2$—NR$^{N1}$—R$^{S2}$ or —SO$_2$—NR$^{N1}$—SO$_2$—R$^{S3}$, wherein each R$^{S1}$ is, independently, H, hydroxyl, optionally substituted $C_{1-12}$ alkyl, optionally substituted $C_{1-12}$ haloalkyl, optionally substituted $C_{1-12}$ perfluoroalkyl, optionally substituted $C_{4-18}$ aryl, or optionally substituted $C_{1-6}$ alk-$C_{4-18}$ aryl; each R$^{N1}$ is, independently, H, optionally substituted $C_{1-12}$ alkyl, optionally substituted $C_{4-18}$ aryl, or optionally substituted $C_{1-6}$ alk-$C_{4-18}$ aryl; each R$^{S2}$ is, independently, H, hydroxyl, optionally substituted $C_{1-12}$ alkyl, optionally substituted $C_{1-12}$ alkylsulfonyl, optionally substituted $C_{4-18}$ aryl, or optionally substituted $C_{1-6}$ alk-$C_{4-18}$ aryl; and each R$^{S3}$ is, independently, H, hydroxyl, optionally substituted $C_{1-12}$ alkyl, optionally substituted $C_{1-12}$ haloalkyl, optionally substituted $C_{1-12}$ perfluoroalkyl, optionally substituted $C_{4-18}$ aryl, or optionally substituted $C_{1-6}$ alk-$C_{4-18}$ aryl;

$R^P$ is —P(O)(OH)$_2$ or —O—PO(OH)$_2$ or —P(O)<R$^{P1}$R$^{P2}$ or —P(O)<R$^{Ar}$R$^{P2}$ or —P(O)<R$^A$R$^{Ar}$, wherein each of R$^1$ and R$^{P2}$ is, independently, H, hydroxyl, optionally substituted $C_{1-12}$ alkyl, optionally substituted $C_{1-12}$ alkoxy, optionally substituted $C_{4-18}$ aryl, optionally substituted $C_{1-6}$ alk-$C_{4-18}$ aryl, or optionally substituted $C_{4-18}$ aryloxy; and each R$^{Ar}$ is, independently, optionally substituted $C_{4-18}$ aryl, optionally substituted $C_{1-6}$ alk-$C_{4-18}$ aryl, or optionally substituted $C_{4-18}$ aryloxy;

$R^C$ is —CO$_2$H or —C(O)—R$^{C1}$ or —R$^{CA}$—C(O)—R$^{C1}$, wherein each R$^{C1}$ is, independently, H, hydroxyl, optionally substituted $C_{1-12}$ alkyl, optionally substituted $C_{1-12}$ alkoxy, optionally substituted $C_{4-18}$ aryl, optionally substituted $C_{1-6}$ alk-$C_{4-18}$ aryl, or optionally substituted $C_{4-18}$ aryloxy; and each R$^{CA}$ is, independently, oxy, optionally substituted $C_{1-12}$ alkylene, or optionally substituted $C_{1-12}$ heteroalkylene; and $R^F$ is carboxyaldehyde, optionally substituted $C_{1-12}$ alkyl, optionally substituted $C_{2-13}$ alkanoyl, or optionally substituted $C_{5-19}$ aryloyl.

19. The composition of claim 5, wherein L comprises a covalent bond, an optionally substituted alkylene, an optionally substituted heteroalkylene, an optionally substituted alkyleneoxy, an optionally substituted heteroalkyleneoxy, an optionally substituted arylene, an optionally substituted aryleneoxy, an Ar* unit, or a structure of formula (II):

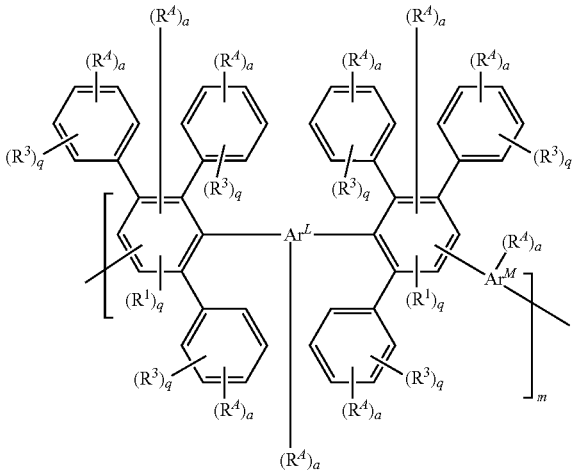

(II)

or a salt thereof or a form thereof including a counter ion.

20. The composition of claim 5, wherein Ar$^L$, Ar$^M$, and/or Ar* is optionally substituted phenylene, optionally substituted naphthylene, or optionally substituted phenanthrylene; wherein the optional substitution for Ar' is R$^A$, R$^S$, R$^P$, R$^C$, or R$^F$; wherein the optional substitution for Ar$^M$ is R$^A$, R$^S$, R$^P$, R$^C$, R$^F$, or a label; and wherein the optional substitution for Ar* is R$^F$.

* * * * *